United States Patent
Fujita et al.

(10) Patent No.: US 11,091,201 B2
(45) Date of Patent: Aug. 17, 2021

(54) ROTATION DETECTING APPARATUS AND ELECTRIC POWER STEERING APPARATUS USING THE SAME

(71) Applicant: DENSO CORPORATION, Kariya (JP)

(72) Inventors: Toshihiro Fujita, Kariya (JP); Katsuhiko Hayashi, Kariya (JP); Takaharu Kozawa, Kariya (JP); Shuhei Miyachi, Kariya (JP); Koichi Nakamura, Kariya (JP); Yuki Watanabe, Kariya (JP); Atsuko Oka, Kariya (JP); Shuji Kuramitsu, Kariya (JP); Toshimitsu Sakai, Kariya (JP); Masaya Taki, Kariya (JP)

(73) Assignee: DENSO CORPORATION, Kariya (JP)

( * ) Notice: Subject to any disclaimer, the term of this patent is extended or adjusted under 35 U.S.C. 154(b) by 389 days.

(21) Appl. No.: 16/091,247

(22) PCT Filed: Apr. 6, 2017

(86) PCT No.: PCT/JP2017/014421
§ 371 (c)(1),
(2) Date: Oct. 4, 2018

(87) PCT Pub. No.: WO2017/175843
PCT Pub. Date: Oct. 12, 2017

(65) Prior Publication Data
US 2019/0152524 A1 May 23, 2019

(30) Foreign Application Priority Data

Apr. 6, 2016 (JP) .............................. JP2016-076677
Feb. 10, 2017 (JP) .............................. JP2017-023442

(51) Int. Cl.
*B62D 15/02* (2006.01)
*G01D 5/14* (2006.01)
*B62D 5/04* (2006.01)

(52) U.S. Cl.
CPC .......... *B62D 15/0215* (2013.01); *B62D 5/046* (2013.01); *G01D 5/14* (2013.01)

(58) Field of Classification Search
CPC ....... B62D 15/0215; B62D 5/046; G01D 5/14
(Continued)

(56) References Cited

U.S. PATENT DOCUMENTS

2009/0315547 A1* 12/2009 Abwa .................... G01R 33/02
324/244
2012/0116717 A1 5/2012 Satou et al.
(Continued)

FOREIGN PATENT DOCUMENTS

JP H07-190803 A 7/1995
JP 2009-520195 A 5/2009
(Continued)

*Primary Examiner* — Muhammad Shafi
(74) *Attorney, Agent, or Firm* — Maschoff Brennan

(57) ABSTRACT

In a rotation detecting apparatus, each of first and second sensor elements measures rotation of a detection target. A circuit module includes first and second rotational angle calculators each calculating, based on a corresponding one of a first measurement value of the first sensor element and a second measurement value of the second sensor element, a rotational angle of the detection target. The circuit module includes first and second rotation number calculators each calculating, based on the corresponding one of the first measurement value and the second measurement value, a rotation number of the detection target. The circuit module includes first and second communicators each outputting, to a controller, a rotational angle signal based on the rotational angle and a rotation number signal based on the rotation (Continued)

number. A package packages the first and second sensor elements, and is mounted to a circuit board separately from the controller.

25 Claims, 28 Drawing Sheets

(58) Field of Classification Search
USPC .......................................................... 701/41
See application file for complete search history.

(56) References Cited

U.S. PATENT DOCUMENTS

| | | |
|---|---|---|
| 2014/0292314 A1 | 10/2014 | Tokida et al. |
| 2015/0175191 A1 | 6/2015 | Harada et al. |
| 2015/0239496 A1* | 8/2015 | Kozawa ............... B62D 5/0481 702/151 |
| 2015/0239501 A1* | 8/2015 | Fujita .................. B62D 15/021 701/41 |
| 2016/0327391 A1 | 11/2016 | Saito |

FOREIGN PATENT DOCUMENTS

| | | |
|---|---|---|
| JP | 2014-199182 A | 10/2014 |
| JP | 2015-161584 A | 9/2015 |
| JP | 2015-179070 A | 10/2015 |
| JP | 2017-191092 A | 10/2017 |
| WO | 2015/111534 A1 | 7/2015 |

* cited by examiner

FIG.25A
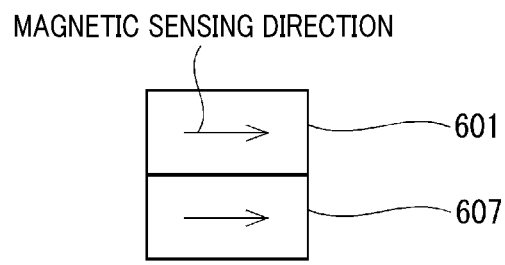
MAGNETIC SENSING DIRECTION
FIG.25B
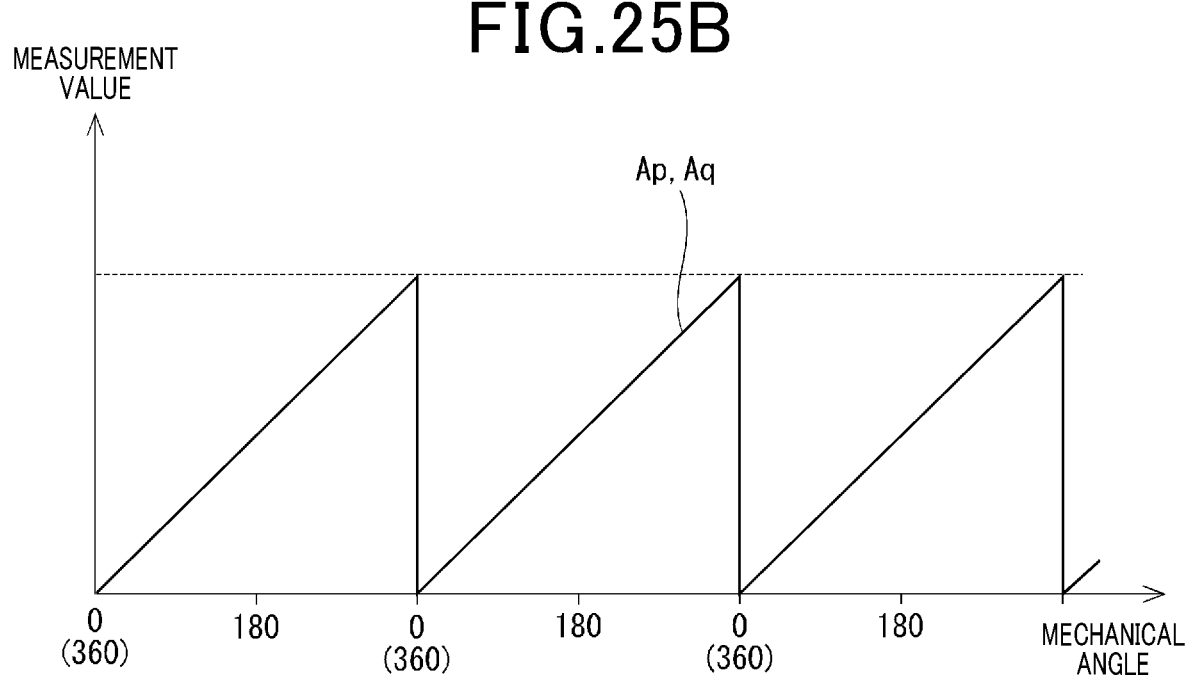
FIG.25C
|  | MECHANICAL ANGLE 0° | FREEZE-FAILURE | FAILURE DETERMINATION |
|---|---|---|---|
| Dp | 00000000000000 | 00000000000000 | × |
| Dq | 00000000000000 | 00000000000000 | |

FIG.26A
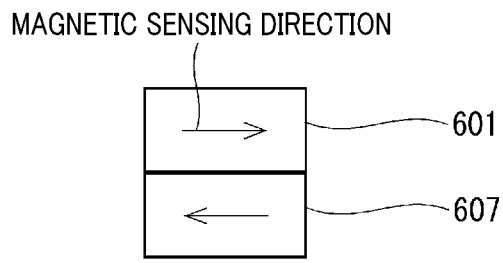
FIG.26B
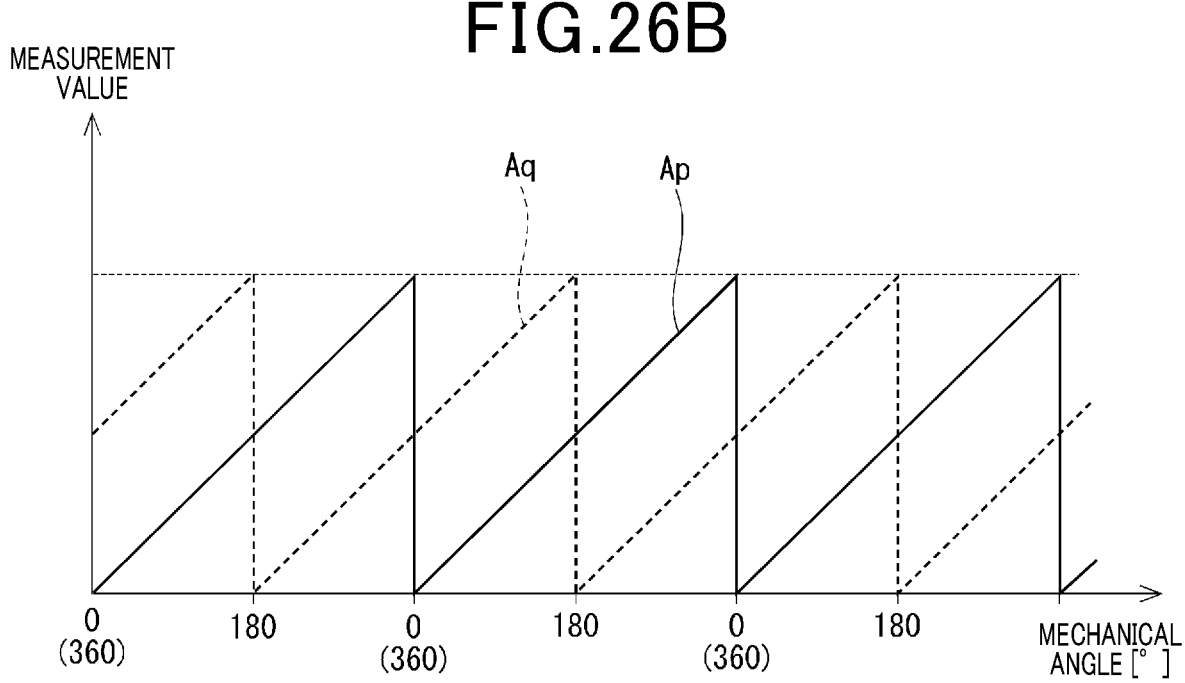
FIG.26C
|  | MECHANICAL ANGLE 0° | FREEZE-FAILURE | FAILURE DETERMINATION |
|---|---|---|---|
| Dp | 00000000000000 | 00000000000000 | ○ |
| Dq | 10000000000000 | 00000000000000 | |

FIG.28
(A)
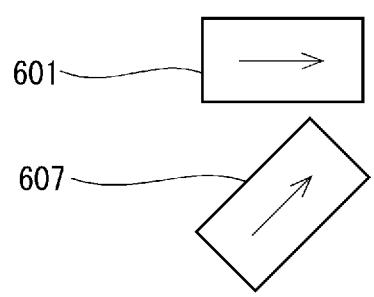
(B)
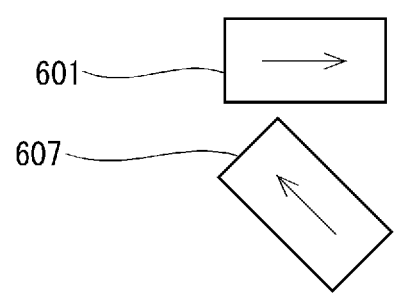
(C)
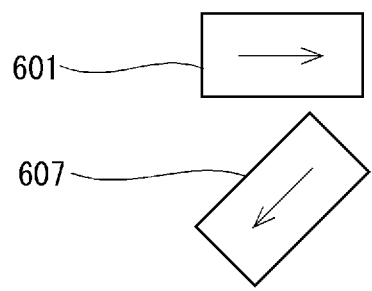
(D)
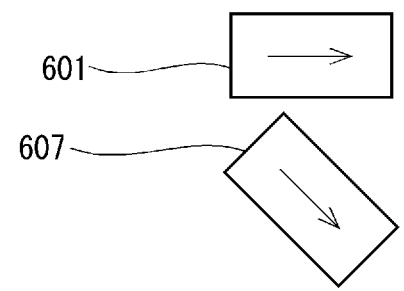

ROTATION DETECTING APPARATUS AND ELECTRIC POWER STEERING APPARATUS USING THE SAME

INCORPORATION BY REFERENCE TO ANY PRIORITY APPLICATIONS

This application is a national stage application under 35 U.S.C. § 371(c) of PCT Application No. PCT/JP2017/014421, filed on Apr. 6, 2017, which claims priority to Japanese Patent Application No. 2016-076677, filed on Apr. 6, 2016, and Japanese Patent Application No 2017-023442, filed on Feb. 10, 2017, the disclosures of which are incorporated herein by reference.

TECHNICAL FIELD

The present disclosure relates to rotation detecting apparatuses, and electric power steering apparatuses using the rotation detecting apparatuses.

BACKGROUND

Various rotation detecting apparatuses are configured to measure magnetic change based on rotation of a motor that serves as a detection target, and generate information indicative of rotation of the motor based on the measured magnetic change.

For example, patent literature 1 discloses a typical one of these known apparatuses. Specifically, this patent literature 1 discloses an electronic control unit for an electric power steering apparatus including a motor that assists a driver's turning effort of a steering wheel.

The electronic control unit includes first and second magnetic sensors, which are an example of first and second rotation sensors.

The first magnetic sensor measures magnetic change based on rotation of a motor, and outputs first rotation information indicative of the measured magnetic change. The second magnetic sensor, which is separately disposed from the first magnetic sensor, measures magnetic change based on rotation of the motor, and outputs second rotation information indicative of the measured magnetic change.

The electronic control unit also includes a single monitor circuit section that calculates, based on the first rotation information and second rotation information, a rotation angle signal indicative of a rotational angle of the motor.

The electronic control unit further includes a control section that generates, based on the rotation signal calculated by the monitor circuit section, the position of the steering wheel.

CITATION LIST

Patent Literature

Patent Literature 1
Japanese Patent Application Publication No. 2015-116964

SUMMARY

Technical Problem

The patent literature is configured such that the single monitor circuit section is provided for the first and second magnetic sensors. A malfunction in a part of the monitor circuit section may make it difficult for the malfunctioning control unit to calculate, based on the first rotation information and second rotation information, the rotation angle signal indicative of the rotational angle of the motor. This may result in difficulty in continuous driving of the electric power steering apparatus.

In view of the problem, the present disclosure aims to provide rotation detecting apparatuses, and electric power steering apparatuses using the rotation detecting apparatuses. Each of these apparatuses is configured such that a portion of the corresponding apparatus calculates, based on information indicative of rotation of a detection target independently measured by at least first and second sensor elements, a rotational angle signal indicative of the rotational angle of the detection target, and a rotation number signal indictive of the number of rotations of the detection target.

In particular each of these apparatuses is capable of continuously calculating the rotational angle signal and the rotation number signal even if the portion of the corresponding apparatus has malfunctioned.

Solution to Problem

A rotation detecting apparatus according to an exemplary aspect of the present disclosure includes at least first and second sensor elements, a circuit module, and a package. Each of the first and second sensor elements is configured to measure rotation of a detection target. The circuit module includes (1) First and second rotational angle calculators each configured to calculate, based on a corresponding one of a first measurement value of the first sensor element and a second measurement value of the second sensor element, a rotational angle of the detection target (2) First and second rotation number calculators each configured to calculate, based on the corresponding one of the first measurement value of the first sensor element and the second measurement value of the second sensor element, a rotation number of the detection target (3) First and second communicators each configured to output, to a controller, a rotational angle signal based on the rotational angle and a rotation number signal based on the rotation number The package is configured to package the first and second sensor elements and the circuit module, and is mounted to a circuit board separately from the controller.

The circuit module of the exemplary aspect includes the first and second rotational angle calculators each calculating the rotational angle of the detection target, and the first and second rotation number calculators each calculating the rotation number of the detection target.

This configuration therefore enables the rotational angle of the rotation number to be continuously calculated even if there is a malfunction in one of the first and second rotational angle calculators or there is a malfunction in one of the first and second rotation number calculators.

BRIEF DESCRIPTION OF DRAWINGS

FIG. 25A is a diagram illustrating how sensor elements are arranged according to a comparison example.

FIG. 25B is a graph diagram illustrating how measurement values of the respective sensor elements are changed according to the comparison example.

FIG. 25C is a diagram illustrating digital conversion values of the respective sensor elements according to the comparison example.

FIG. 26A is a diagram illustrating how sensor elements are arranged according to the fifth embodiment of the present disclosure.

FIG. 26B is a graph diagram illustrating how measurement values of the respective sensor elements are changed according to the tenth embodiment of the present disclosure.

FIG. 26C is a diagram illustrating digital conversion values of the respective sensor elements according to the tenth embodiment of the present disclosure.

FIG. 28 is a view illustrating variations of how the sensor elements are arranged according to the tenth embodiment of the present disclosure.

DESCRIPTION OF EMBODIMENTS

Figure 1:
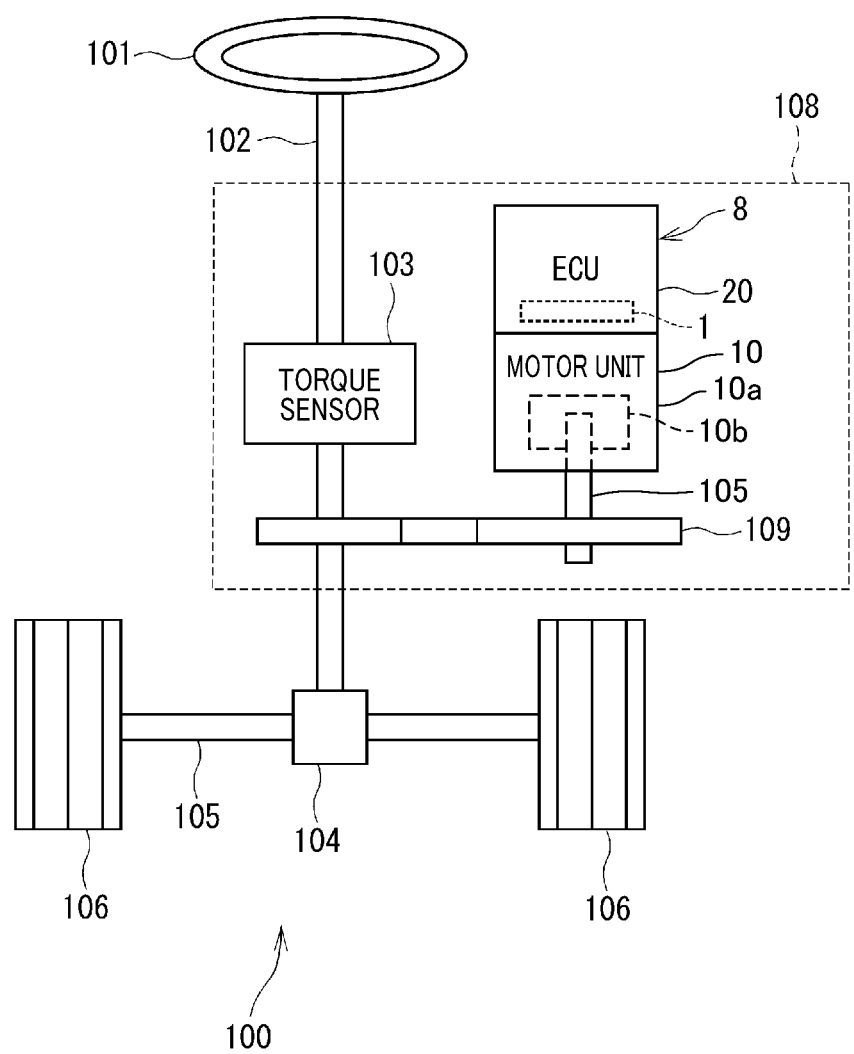
FIG. 1 is a structural diagram schematically illustrating a steering system according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 11.

Referring to FIG. 1, a rotation detecting apparatus 1 according to the first embodiment is installed in, for example, a drive apparatus 8 of a steering system 100 that includes an electronic power steering apparatus 108. The electronic power steering apparatus 108 is installed in a vehicle V. The electronic power steering apparatus 108 is operative to assist a driver's steering operation of a steering wheel of the vehicle V. The drive apparatus 8 includes a motor unit 10 with a shaft 15 and a controller module 20 for drive control of the motor unit 10; the motor unit 10 and the controller module 20 are integrated with each other to constitute a motor module. FIG. 1 can illustrate the controller module 20 as an ECU.

In particular, FIG. 1 schematically illustrates an example of the overall structure of the steering system 100 including the electronic power steering apparatus 108. The steering system 100 is comprised of, for example, the steering wheel 101 as a driver's operation member, a steering shaft 102, a torque sensor 103, a pinion gear 104, a rack axle 105, wheels 106, and the electronic power steering apparatus 108.

The steering shaft 102 is comprised of, for example, first and second end portions. The steering wheel 101 is connected to the first end portion of the steering shaft 102. The torque sensor 103 is mounted to the steering shaft 102; the torque sensor 103 is operative to measure torque based on a driver's steering operation of the steering shaft 102 as steering torque. The pinion gear 104 is mounted to the second end portion of the steering shaft 102.

The rack axle 105 includes a rod-shaped rack with which the pinion gear 104 is engaged. The rack axle 105 also includes, through for example tie rods, the wheels 106 respectively mounted at both ends thereof.

Driver's turning of the steering wheel 101 causes the steering shaft 102 coupled to the steering wheel 101 to turn. This rotary motion of the steering shaft 102 is transformed to linear motion of the rack of the rack axle 105. This linear motion of the rack of the rack axle 105 causes the wheels 106 to steer via the respective tie rods. The steering angle of each of the wheels 106 is determined based on the axial displacement of the rack of the rack axle 105.

The electric power steering apparatus 108 includes, for example, the drive apparatus 8, a deceleration gear mechanism 109 serving as a power transfer mechanism, and the torque sensor 103. The deceleration gear mechanism 109 includes, for example, a first gear coupled to the shaft of the motor unit 10, and a second gear engaged with the first gear and mounted to the steering shaft 102. For example, the deceleration gear mechanism 109 is operative to transfer assist torque generated based on the turning of the shaft 15 of the motor unit 10 to the steering shaft 102 while decelerating, by a predetermined gear ratio between the first gear and the second gear, the rotational speed of the motor unit 10, i.e. increasing the assist torque generated by the motor unit 10 by the predetermined gear ratio between the first gear and the second gear.

Specifically, the electric power steering apparatus 108 is configured such that the controller module 20 causes the motor unit 10 to generate assist torque based on steering torque measured by the torque sensor 103 and/or vehicle operating condition signals. The vehicle operating condition signals, which include, for example, the speed of the vehicle V, represent the operating conditions of the vehicle V, and are sent from another electronic control unit via an in-vehicle network, such as an unillustrated controller area network (CAN).

Specifically, the electric power steering apparatus 108 according to the first embodiment is designed as a shaft assist system for assisting the turning of the steering shaft 102 based on the assist torque generated by the motor unit 10. The electric power steering apparatus 108 according to the first embodiment can be designed as a rack assist system for assisting the axial displacement of the rack of the rack axle 105 based on the assist torque generated by the motor unit 10. That is, the first embodiment is configured such that the steering shaft 102 serves as a target to be assisted, but the rack axle 105 can serve as a target to be assisted.

Figure 2:
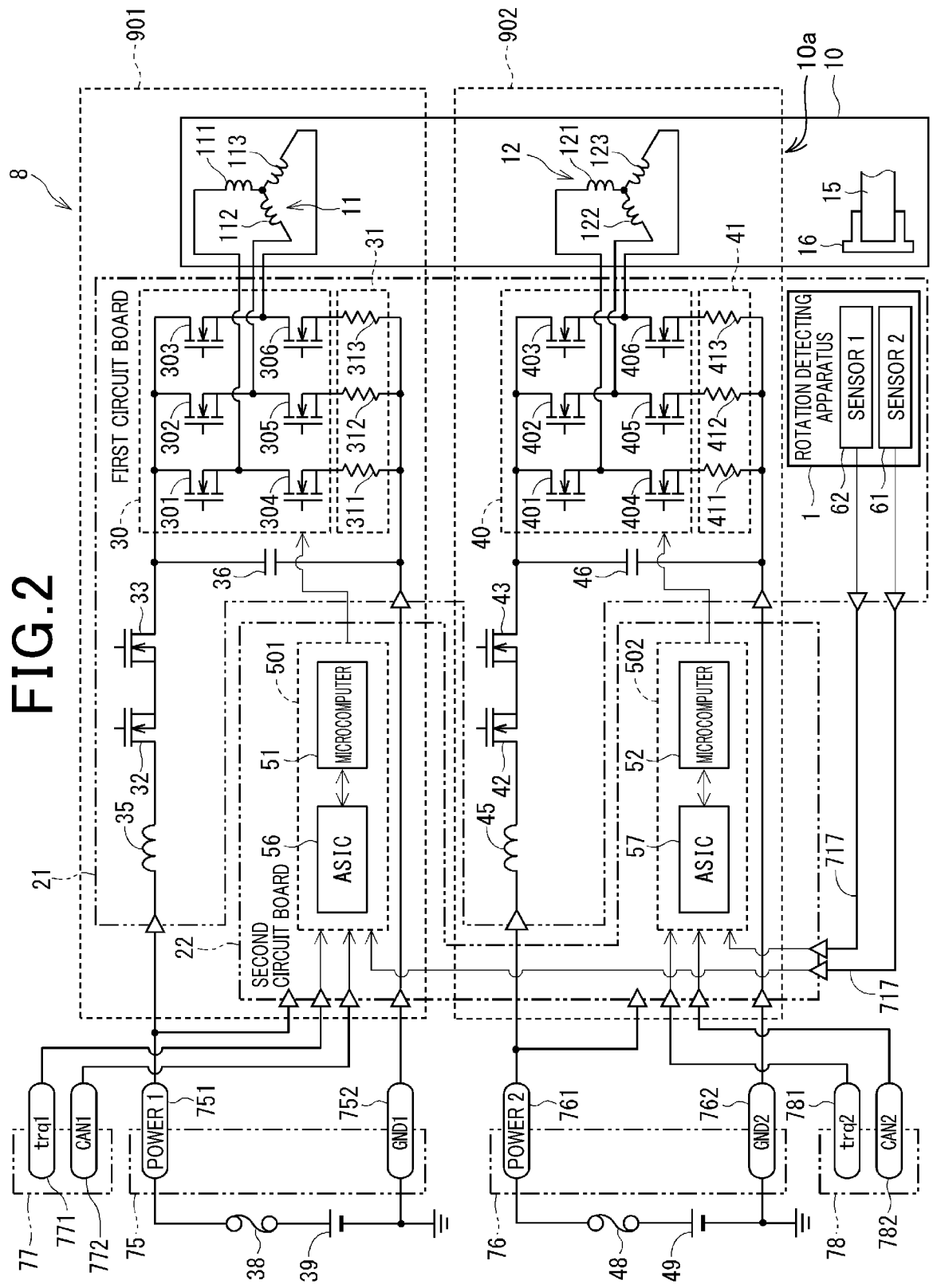
FIG. 2 is a circuit diagram schematically illustrating a drive apparatus illustrated in FIG. 1.

Next, the following describes an example of the electrical configuration of the electric power steering apparatus 108 with reference to FIG. 2. Note that, in FIG. 2, connection wires in each of first and second circuit boards 21 and 22 described later, and correction wires between the first and second circuit boards 21 and 22 are illustrated with thinner lines, and some of the connection wires are omitted to avoid complicated illustration of the electrical configuration of the electric power steering apparatus 108.

The motor unit 10 is designed as, for example, a three-phase brushless motor comprised of, for example, a stator 10a, a rotor 10b, the shaft 15, and an unillustrated magnetic field member, such as permanent magnets, a field coil, and the like. The stator 10a includes, for example, an unillustrated stator core, a first coil set 11 of three-phase coils, i.e. U1, V1, and W1-phase coils, 111, 112, and 113, and a second coil set 12 of three-phase coils, i.e. U2, V2, and W2-phase coils, 121, 122, and 123. The rotor 10b, to which the shaft 15 is mounted, is configured to be rotatable relative to the stator core together with the shaft 15.

The three-phase coils 111, 112, and 113 of the first coil set 11, and the three-phase coils 121, 122, and 123 of the second coil set 12 are wound in, for example, slots of the stator core and around the stator core. The magnetic field member is mounted to the rotor 10b for generating a magnetic field. That is, the motor unit 10 is capable of rotating the rotor 10b based on magnetic interactions between the magnetic field generated by the magnetic field member of the rotor 10b and a rotating magnetic field generated by the three-phase coils 111, 112, and 113 of the first coil set 11 and the three-phase coils 121, 122, and 123 of the second coil set 12 of the stator 10a.

Note that currents flowing through respective U1, V1, and W1 phase coils 111, 112, and 113 will be referred to as phase currents Iu1, Iv1, and Iw1, and similarly currents flowing through respective U2, V2, and W2 phase coils 121, 122, and 123 will be referred to as phase currents Iu2, Iv2, and Iw2.

As illustrated in FIG. 2, the controller module 20 includes the first and second boards 21 and 22, first and second inverters 30 and 40, first and second current sensors 31 and 41, and first and second relays 32 and 42. The controller module 20 also includes first and second reverse-connection protection relays 33 and 43, choke coils 35 and 45, first and second capacitors 36 and 46, and first and second motor control units 501 and 502.

In particular, the rotation detecting apparatus 1 installed in the drive apparatus 8 is comprised of a sensor package 65. The sensor package 65 includes a first sensor 61 and a second sensor 62 each configured to measure rotation of the rotor 10b of the motor unit 10. The first sensor 61 and the second sensor 62 are illustrated respectively as SENSOR 1 and SENSOR 2 in FIG. 2.

Figure 3:
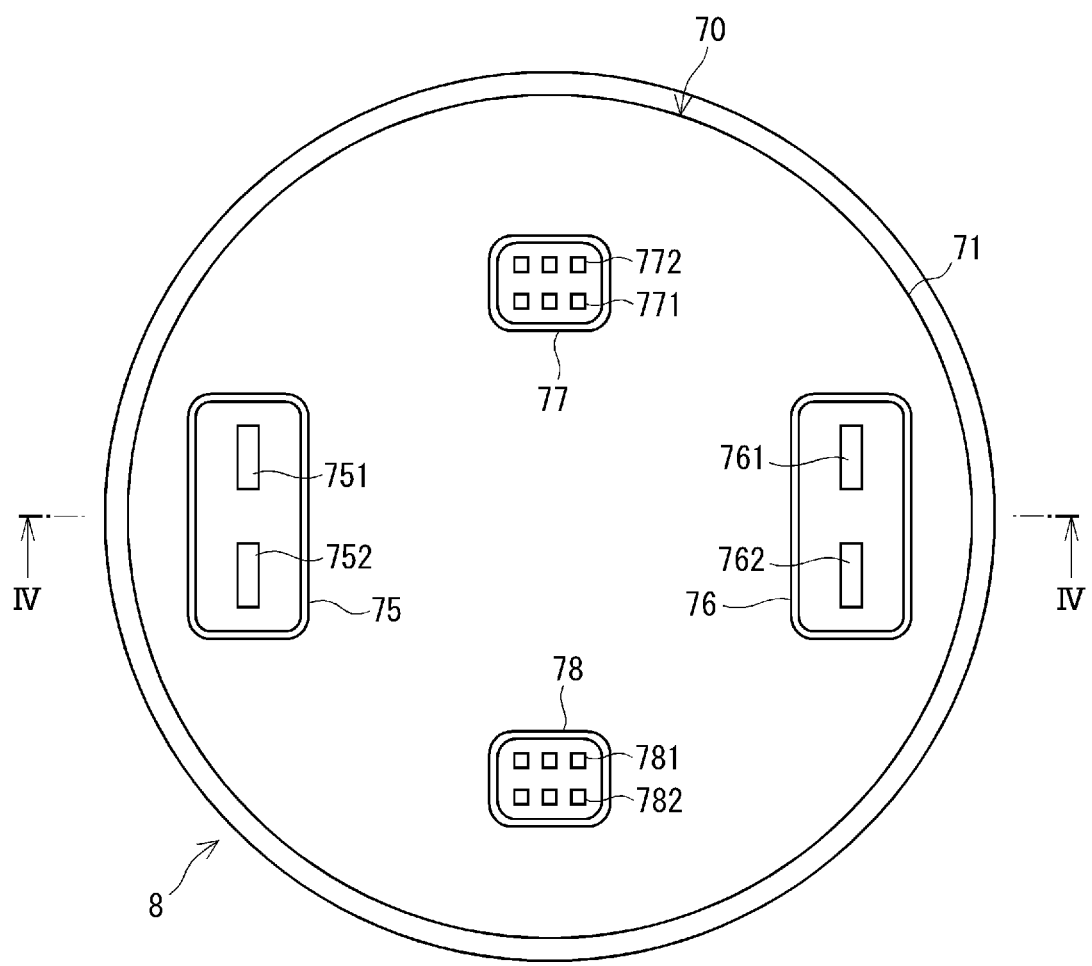
FIG. 3 is a plan view of the drive apparatus illustrated in FIG. 1.
Figure 4:
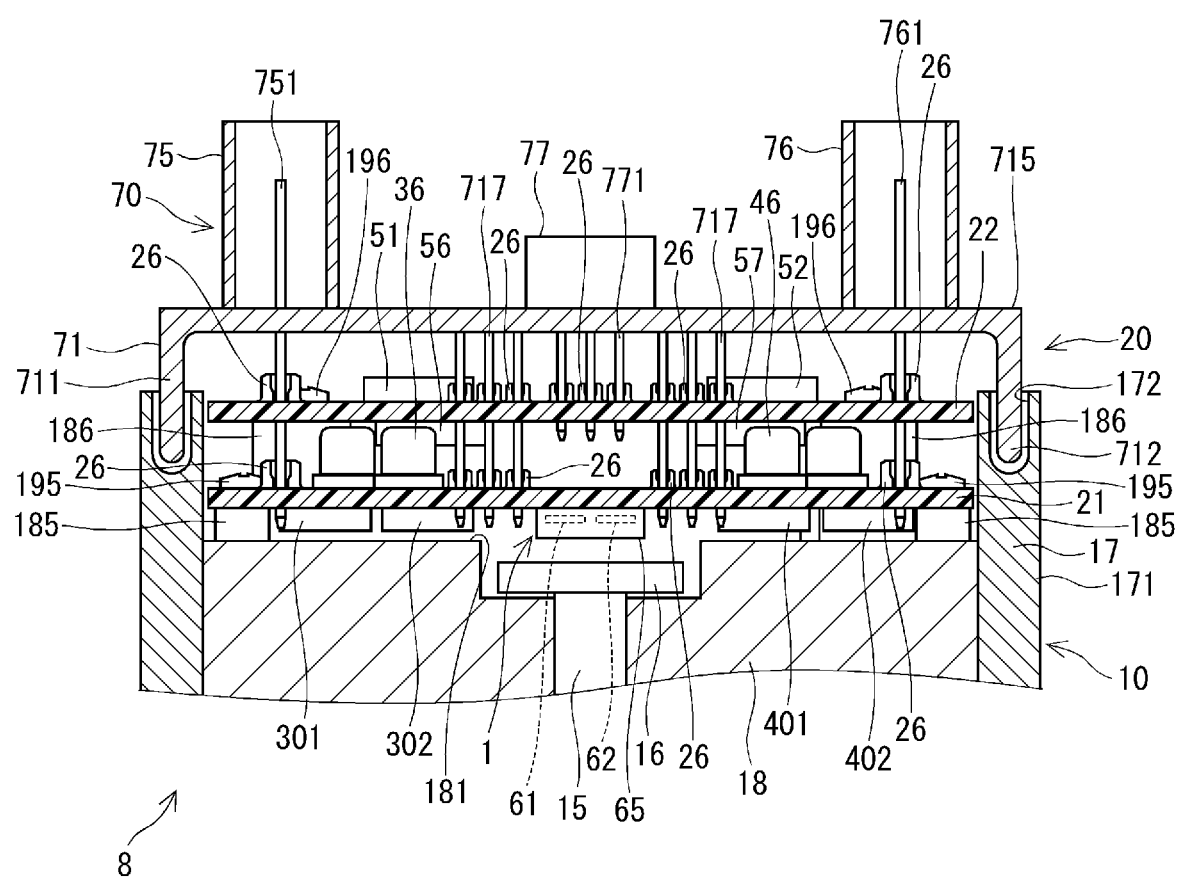
FIG. 4 is a cross sectional view taken on line IV-IV of FIG. 3.

The drive apparatus 8 includes first and second batteries 39 and 49, fuses 38 and 48, and a connector unit 70 (see FIGS. 3 and 4). The connector unit 70 includes first and second power-supply connectors 75 and 76, and first and second signal connectors 77 and 78.

The first battery 39 has a positive terminal and a negative terminal, and the positive terminal of the first battery 39 is connected to the first power-supply connector 75 via the fuse 38, and the negative terminal of the first battery 39 is connected to the first power-supply connector 75. The first battery 39 is connected to the first inverter 30 via the fuse 38, the first power-supply connector 75, the first choke coil 35, the first relay 32, the first reverse-connection protection relay 33, and the first capacitor 36. The first inverter 30 is connected to the three-phase coils 111, 112, and 113 of the first coil set 11.

The first inverter 30 is comprised of six switching elements 301 to 306 connected in bridge configuration.

Specifically, the switching elements 301 and 304 are a pair of U-phase upper- and lower-arm switching elements connected in series to each other, and the switching elements 302 and 305 are a pair of V-phase upper- and lower-arm switching elements connected in series to each other. Additionally, the switching elements 303 and 306 are a pair of W-phase upper- and lower-arm switching elements connected in series to each other. Hereinafter, switching elements will be referred to as SW elements.

The SW elements 301 to 306 are for example semiconductor SW elements, such as metal-oxide-semiconductor field-effect transistors (MOSFETs). The first embodiment uses MOSFETs as the respective SW elements 301 to 306, SW elements 401 to 406 described later, and the relays 32, 33, 42, and 43, but can use other types of SW elements, such as Insulated-gate bipolar transistors (IGBTs), in place of the MOSFETs. That is, one of various types of SW elements, such as MOSFETs or IGBTs, can be used for each of SW elements 301 to 306, SW elements 401 to 406 described later, and the relays 32, 33, 42, and 43.

The intrinsic diode of each of the SW elements 301 to 306 comprised of the MOSFETs 301 to 306 can serve as a flywheel diode connected in antiparallel to the corresponding one of the SW elements 301 to 306. Other flywheel diodes can be connected in antiparallel to the respective SW elements 301 to 306.

Specifically, the SW elements 301 to 303 are located at a high potential side, and the SW elements 304 to 306 are located at a low potential side. The connection point between the U-phase upper- and lower-arm SW elements 301 and 304, i.e. between the source of the SW element 301 and the drain of the SW element 304, is connected to a first end of the U1-phase coil 111. The connection point between the V-phase upper- and lower-arm SW elements 302 and 305, i.e. between the source of the SW element 302 and the drain of the SW element 305, is connected to a first end of the V1-phase coil 112. Additionally, the connection point between the W-phase upper- and lower-arm SW elements 303 and 306, i.e. between the source of the SW element 303 and the drain of the SW element 306, is connected to a first end of the W1-phase coil 113.

The drains of the SW elements 301 to 303 are commonly connected to the positive terminal of the first battery 39 via the first reverse-connection protection relay 33, the first relay 32, the first choke coil 35, the first power-supply connector 75, and the fuse 38.

Second ends of the U1, V1-, and W1-phase coils, which are opposite to the first ends, are connected to a common junction, i.e. a neutral point, in, for example, a star-configuration.

The first current sensor 31 includes current sensing elements 311, 312, and 313. For example, each of the current sensing elements 311, 312, and 313 is comprised of a shunt resistor. Each of the current sensing elements 311 to 313 has opposing first and second ends. The first end of each of the current sensing elements 311 to 313 is connected to the source of a corresponding one of the lower-arm SW elements 304, 305, and 306. The second end of each of the current sensing elements 311 to 313 is connected to the negative terminal of the first battery 39 via a common signal ground and the first power-supply connector 75. This results in the first series connection of the SW elements 301 and 304 and the current sensing element 311, the second series connection of the SW elements 302 and 305 and the current sensing element 312, and the third series connection of the SW elements 303 and 306 and the current sensing element 313 being connected in parallel to the first battery 39.

The current sensing element 311 measures the phase current Iu1 flowing through the U1-phase coil 111, the current sensing element 312 measures the phase current Iv1 flowing through the V1-phase coil 112, and the current sensing element 313 measures the phase current Iw1 flowing through the W1-phase coil 113.

Other types of current sensing elements, such as Hall devices, can be used as the current sensing elements 311 to 313 and 411 to 413 described later.

The first inverter 30 is configured to receive direct-current (DC) power supplied from the first battery 39, and convert the DC power into alternating-current (AC) power. Then, the first inverter 30 is configured to apply the AC power to the three-phase coils 111, 112, and 113 of the first coil set 11.

The first power-supply relay 32, which is a MOSFET as an example, is provided between the first battery 39 and the first inverter 30, and configured to establish an electrical path therebetween, and interrupt the electrical path. The first reverse-connection protection relay 33, which is a MOSFET as an example, is connected between the first relay 32 and the first inverter 30 while the forward direction of the intrinsic diode of the first reverse-connection protection relay 33 is opposite to the forward direction of the intrinsic diode of the first power-supply relay 32. This would prevent a current from flowing from the first inverter 30 to the first battery 39 even if the first battery 39 were reversely connected such that the positive terminal of the first battery 39 were connected to the common signal ground.

The first choke coil 35 is connected between the first power-supply relay 32 and the first battery 39 via the first power-supply connector 75, and the fuse 38. The first capacitor 36 is connected in parallel to each of the first to third series connections of the first inverter 30. The first choke coil 35 and the first capacitor 36 constitute a filter circuit that reduces noise transferred from other devices sharing the first battery 39, and also reduces noise transferred from the drive apparatus 8 to the other devices sharing the first battery 39. The first capacitor 36 is operative to store electrical charge, thus supporting power supply to the first inverter 30.

The second battery 49 has a positive terminal and a negative terminal, and the positive terminal of the second battery 49 is connected to the second power-supply connector 76 via the fuse 48, and the negative terminal of the second battery 49 is connected to the second power-supply connector 76. The second battery 49 is connected to the second inverter via the fuse 48, the second power-supply connector 76, the second choke coil 45, the second relay 42, the second reverse-connection protection relay 43, and the second capacitor 46, and the second inverter 40 is connected to the three-phase coils 121, 122, and 123 of the second coil set 12.

The second inverter 40 is comprised of six SW elements 401 to 406 connected in bridge configuration.

Specifically, the SW elements 401 and 404 are a pair of U-phase upper- and lower-arm SW elements connected in series to each other, and the SW elements 402 and 405 are a pair of V-phase upper- and lower-arm SW elements connected in series to each other. Additionally, the SW elements 403 and 406 are a pair of W-phase upper- and lower-arm SW elements connected in series to each other.

The intrinsic diode of each of the SW elements 401 to 406 comprised of the MOSFETs 401 to 406 can serve as a flywheel diode connected in antiparallel to the corresponding one of the SW elements 401 to 406. Other flywheel diodes can be connected in antiparallel to the respective SW elements 401 to 406.

Specifically, the SW elements 401 to 403 are located at the high potential side, and the SW elements 404 to 406 are located at the low potential side.

The connection point between the U-phase upper- and lower-arm SW elements 401 and 404, i.e. between the source of the SW element 401 and the drain of the SW element 404, is connected to a first end of the U2-phase coil 121, and the connection point between the V-phase upper- and lower-arm SW elements 402 and 405, i.e. between the source of the SW element 402 and the drain of the SW element 405, is connected to a first end of the V2-phase coil 122. Additionally, the connection point between the W-phase upper- and lower-arm SW elements 403 and 406, i.e. between the source of the SW element 403 and the drain of the SW element 406, is connected to a first end of the W2-phase coil 123. T The drains of the SW elements 401 to 403 are commonly connected to the positive terminal of the second battery 49 via the second reverse-connection protection relay 43, the second relay 42, the second choke coil 45, the second power-supply connector 76, and the fuse 48. Second ends of the U2-, V2-, and W2-phase coils, which are opposite to the first ends, are connected to a common junction, i.e. a neutral point, in, for example, a star-configuration.

The second current sensor 41 includes current sensing elements 411, 412, and 413. For example, each of the current sensing elements 411, 412, and 413 is comprised of a shunt resistor. Each of the current sensing elements 411 to 413 has opposing first and second ends. The first end of each of the current sensing elements 411 to 413 is connected to the source of a corresponding one of the lower-arm SW elements 404, 405, and 406. The second end of each of the current sensing elements 411 to 413 is connected to the negative terminal of the second battery 49 via a common signal ground and the second power-supply connector 76. This results in the first series connection of the SW elements 401 and 404 and the current sensing element 411, the second series connection of the SW elements 402 and 405 and the current sensing element 412, and the third series connection of the SW elements 403 and 406 and the current sensing element 413 being connected in parallel to the second battery 49.

The current sensing element 411 measures the phase current Iu2 flowing through the U2-phase coil 121, the current sensing element 412 measures the phase current Iv2 flowing through the V2-phase coil 122, and the current sensing element 413 measures the phase current Iw2 flowing through the W2-phase coil 123.

The second inverter 40 is configured to convert DC power supplied from the second battery 49 into AC power. Then, the second inverter 40 is configured to apply the AC power to the three-phase coils 121, 122, and 123 of the second coil set 12.

The second power-supply relay 42, which is a MOSFET as an example, is provided between the second battery 49 and the second inverter 40. The second reverse-connection protection relay 43, which is a MOSFET as an example, is connected between the second relay 42 and the second inverter 40. The second choke coil 45 is connected between the second power-supply relay 42 and the second battery 49 via the second power-supply connector 76 and the fuse 48. The second capacitor 46 is connected in parallel to each of the first to third series connections of the second inverter 40.

The detailed structure of each of the second power-supply relay 42, the second reverse-connection protection relay 43, the second choke coil 45, and the second capacitor 46 is identical to that of the corresponding one of the first power-supply relay 32, the first reverse-connection protection relay 33, the first choke coil 35, and the first capacitor 36. For this reason, the descriptions of the elements 42, 43, 45, and 46 can be omitted. If mechanical relays are respectively used as the first and second relays 32 and 42, the first and second reverse-connection protection relays 33 and 43 can be omitted.

The first motor control unit 501, which is operative to control how the first coil set 11 is energized, is comprised of a first microcomputer 51 and a first integrated circuit 56 communicably connected to each other. For example, an application specific integrated circuit (ASIC) is used as the first integrated circuit 56 as illustrated in FIG. 2.

The first microcomputer 51, which is comprised of, for example, a CPU and a memory unit including a ROM and a RAM, is communicably connected to the first sensor 61, first current sensor 31, and torque sensor 103 (see FIG. 1). The first microcomputer 51 is configured to generate control signals based on measurement values, i.e. measurement signals, output from the first sensor 61, first current sensor 31, and torque sensor 103; the control signals are to control on-off switching operations of the switching elements 301 to 306 of the first inverter 30 and the relays 32 and 33. For example, the CPU of the first microcomputer 51 can run one or more programs, i.e. program instructions, stored in the memory unit, thus implementing the operations of the first microcomputer 51 as software operations. As another example, the first microcomputer 51 can include a specific hardware electronic circuit to implement the operations of the first microcomputer 51 as hardware operations.

The first integrated circuit 56 is comprised of, for example, a pre-driver, a signal amplifier, and a regulator. The pre-driver is operative to generate gate signals for the respective switching elements 301 to 306 based on the control signals for the respective switching elements 301 to 306. The pre-driver is also operative to output the generated gate signals to the gates of the respective switching elements 301 to 306, thus individually controlling on-off switching operations of the switching elements 301 to 306. The signal amplifier is operative to amplify the measurement signal sent from, for example, the first sensor 61, and output the amplified measurement signal to the first microcomputer 51. The regulator is designed as a stabilization circuit that stabilizes an operating voltage supplied to, for example, the first microcomputer 51 from, for example, an unillustrated power supply.

The second motor control unit 502, which is operative to control how the second coil set 12 is energized, is comprised of a second microcomputer 52 and a second integrated circuit 57 communicably connected to each other.

The second microcomputer 52, which is comprised of, for example, a CPU and a memory unit including a ROM and a RAM, is communicably connected to the rotation detecting apparatus 1, the second current sensor 41, and the torque sensor 103 (see FIG. 1). The second microcomputer 52 is configured to generate control signals based on measurement values, i.e. measurement signals, output from the rotation detecting apparatus 1, second current sensor 41, and torque sensor 103; the control signals are to control on-off switching operations of the SW elements 401 to 406 of the second inverter 40 and the relays 42 and 43. For example, the CPU of the second microcomputer 52 can run one or more programs, i.e. program instructions, stored in the memory unit, thus implementing the operations of the second microcomputer 52 as software operations. As another example, the second microcomputer 52 can include a specific hardware electronic circuit to implement the operations of the second microcomputer 52 as hardware operations.

The second integrated circuit 57 is comprised of, for example, a pre-driver, a signal amplifier, and a regulator. The pre-driver is operative to generate gate signals for the respective SW elements 401 to 406 based on the control signals for the respective SW elements 401 to 406. The pre-driver is also operative to output the generated gate signals to the gates of the respective SW elements 401 to 406, thus individually controlling on-off switching operations of the SW elements 401 to 406. The signal amplifier is operative to amplify the measurement signal sent from, for example, the second sensor 62, and output the amplified measurement signal to the second microcomputer 52. The regulator is designed as a stabilization circuit that stabilizes an operating voltage supplied to, for example, the second microcomputer 52 from, for example, the unillustrated power supply.

As described above, the rotation detecting apparatus 1 installed in the drive apparatus 8 is comprised of the sensor package 65 including the first and second sensors 61 and 62. FIG. 2 illustrates the first and second sensors 61 and 62 respectively as SENSOR 1 and SENSOR 2. The detailed descriptions of the rotation detecting apparatus 1 will be described later.

The first and second microcomputers 51 and 52 according to the first embodiment serve as, for example, a controller.

Hereinafter, at least the first coil set 11, and the first inverter 30 and the first motor control unit 501 provided for the first coil set 11 constitute a first motor drive system, 901. Similarly, at least the second coil set 12, and the second inverter 40 and the second motor control unit 502 provided for the second coil set 12 constitute a second motor drive system, 902. Although the rotation detecting apparatus 1 is not included in each of the first and second motor drive systems 901 and 902 in FIG. 2 for avoiding complexity of FIG. 2, the first motor drive system 901 can include the first sensor 61, and the second motor drive system 902 can include the second sensor 62.

That is, the drive apparatus 8 according to the first embodiment is configured such that (1) The circuit components including the first inverter 30 and the first motor control unit 501, which are needed to control the first coil set 11, are provided for the first coli set 11

(2) The circuit components including the second inverter 40 and the second motor control unit 502, which are needed to control the second coil set 12, are provided for the second coli set 12.

In other words, the drive apparatus 8 is configured as a dual redundant system comprised of at least the first and second inverters 30 and 40, and the first and second motor control units 501 and 502.

This dual-redundant configuration of the drive apparatus 8 enables the motor unit 10 to be continuously driven even if there is a malfunction in one of the first inverter 30 and the second inverter 40, or there is a malfunction in one of the first motor control unit 501 and the second motor control unit 502.

As described above, the drive apparatus 8 includes, as a dual redundant battery system, the first battery 39 for the first coil set 11, and the second battery 40 for the second coil 12. The rated voltage across the first battery 39 can be identical to or different from the rated voltage across the second battery 49. If the rated voltage across the first battery 39 differs from the rated voltage across the second battery 49, a voltage converter can be provided at least one of between the first battery 39 and the first inverter and between the second battery 49 and the second inverter 40.

Figure 5:
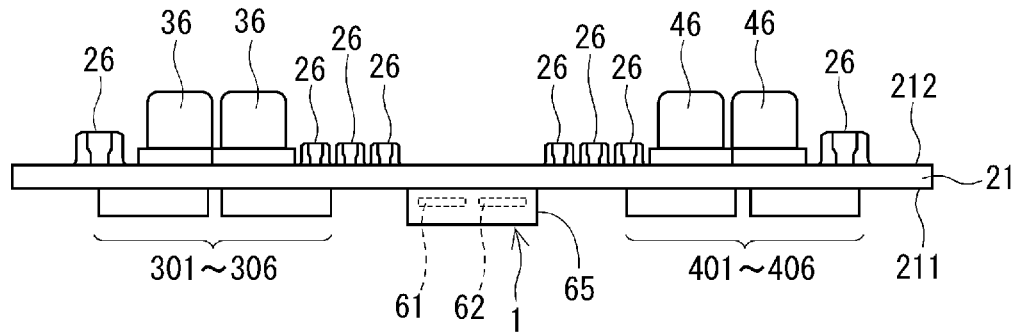
FIG. 5 is a side view of a first circuit board according to the first embodiment of the present disclosure.

Referring to FIGS. 2, 4, and 5, drive components, which include the switching elements 301 to 306 and 401 to 406, the current sensing elements 311 to 313 and 411 to 413, the relays 32, 33, 42, and 43, the choke coils 35 and 45, and the capacitors 36 and 46, are mounted to the first circuit board 21. In addition, referring to FIGS. 2, 4, and 5, control components, which include the microcomputers 51 and 52 and the integrated circuits 56 and 57, are mounted to the second circuit board 22.

That is, the drive components are electronic components through which a relatively large current, which is similar to motor currents flowing through the coils 111 to 113 and 121 to 123, flows. The control components are electronic components through which no motor currents flow.

The rotation detecting apparatus 1 is mounted to the first circuit board 21.

The first power supply connector 75 has a power supply terminal 751 and a ground terminal 752, and the second power supply connector 76 has a power supply terminal 761 and a ground terminal 762. The first signal connector 77 has a torque signal terminal 771 and a vehicle signal terminal 772, and the second signal connector 78 has a torque signal terminal 781 and a vehicle signal terminal 782. The drive apparatus 8 has internal signal terminals 717.

Triangular outline marks represent where these terminals are connected to the first circuit board 21 and/or the second circuit board 22. For example, the power supply terminals 751 and 761, the ground terminals 752 and 762, and the internal signal terminals 717 are connected to each of the first and second circuit boards 21 and 22. The torque signal terminals 771 and 781 and the vehicle signal terminals 772 and 782 are connected to the second circuit board 22 without connected to the first circuit board 21.

Note that, in FIG. 2, the power supply terminals are respectively labeled as POWER 1 and POWER 2, and the ground terminals are respectively labeled as GND1 and GND2. The torque signal terminals are respectively labeled as trq1 and trq2, and the vehicle signal terminals are respectively labeled as CAN1 and CAN2.

Even if at least one of lines, each of which connects between a corresponding one of the terminals and at least one of the first and second circuit boards 21 and 22, is branched, this does not necessarily mean that the corresponding at least one actual terminal is actually branched.

Figure 6:
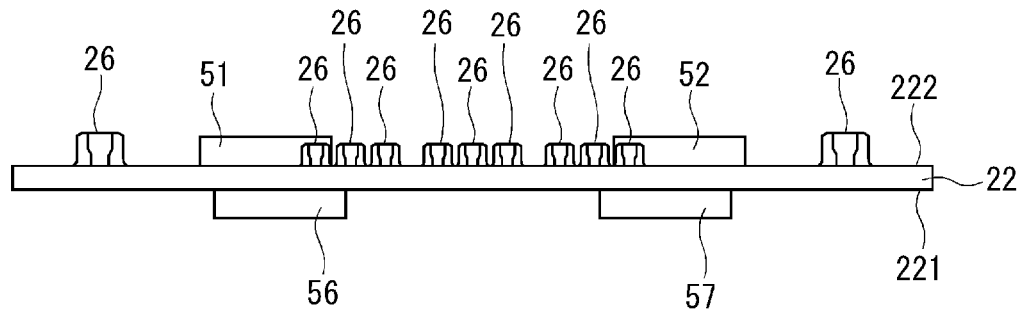
FIG. 6 is a side view of a second circuit board according to the first embodiment of the present disclosure.

The following describes an example of the structure of the drive apparatus 8 with reference to FIGS. 3 to 6. Specifically, FIG. 3 is a plan view of the drive apparatus 8, and FIG. 4 is a cross sectional view taken on line IV-IV of FIG. 3. FIG. 5 is a schematic side view of the first circuit board 21, and FIG. 6 is a schematic side view of the second circuit board 22.

As illustrated in FIG. 4, the motor unit 10 includes the stator 10a (see FIG. 2), the rotor 10b (see FIG. 1), and the shaft 15 mounted to the rotor 10b. The motor unit 10 includes a motor case 17 comprised of a substantially cylindrical housing 171, and the stator 10a is installed in the cylindrical housing 171 of the motor case 17 to be mounted to the inner peripheral surface of the cylindrical housing 171 of the motor case 17. As described above, the rotor 10b is installed in the stator 10a to be rotatable relative to the stator 10a, and the rotor 10b includes a substantially cylindrical rotor core, and the shaft 15 is fixedly mounted to a center axial portion of the rotor core. This enables the shaft 15 and the rotor 10b to be integrally rotated.

The cylindrical housing 171 of the motor case 17 has opposing first and second ends in its axial direction. The first axial end of the cylindrical housing 171 has an opening therethrough, and the controller module 20 is mounted in the opening of the first axial end of the motor case 17. The cylindrical housing 171 has a ring recess 172 formed in the first axial end thereof.

The shaft 15 has opposing first and second ends in its axial direction. The first end of the shaft 15 is located to face the controller module 20. The second end of the shaft 15, which is not illustrated in FIG. 4, serves as an output terminal coupled to the deceleration gear 109 (see FIG. 1). This enables torque generated based on rotation of the rotor assembly, which is comprised of the rotor 10b and the shaft 15, to be transferred to the steering shaft 10 via the deceleration gear 109. This specification also describes rotation, i.e. turning, of the rotor assembly of the motor unit 10 as "rotation, i.e. turning, of the motor unit 10" or other similar expressions.

The motor unit 10 includes a substantially circular plate-like magnet 16 coaxially mounted to an end surface of the first end of the shaft 15. A virtual line extending from the center axis of the shaft 15 and passing through the center of the magnet 16 is defined as a rotation center line Ac (see, for example, FIG. 8).

The motor unit 10 also includes a substantially cylindrical frame 18 mounted to the inner peripheral surface of the cylindrical housing 171 so as to be closer to the first axial end of the cylindrical housing 171 while the shaft 15 rotatably penetrates through the frame 18. For example, the frame 18 is pressed to be fit in the cylindrical housing 171 of the motor case 17. The motor case 17 and the frame 18 constitute an enclosure member for enclosing the components of the motor unit 10. The frame 18 has an end surface 181 facing the controller module 20, and a concave recess is formed in the center portion of the end surface 181. The magnet 16 is installed in the recess to be exposed toward the controller module 20.

The frame 18 includes first board securing members 185 each having a predetermined first height, and also includes second board securing members 186 each having a predetermined second height; the first and second board securing members 185 and 186 are mounted on the end surface 181 of the frame 18 with their height directions being substantially perpendicular to the end surface 181. The second height of each of the second board securing members 186 is larger than the first height of each of the first board securing members 185. The first circuit board 21, which has formed through holes therethrough, is mounted on the first board securing members 185 to be fastened to the first board securing members 185 with screws 19. The second circuit board 22 is mounted on the second board securing members 186 to be fastened to the second board securing members 186 with screws 196. The first and second circuit boards 21 and 22 can be fastened to the frame 18 with one of fastening members other than the screws.

The three-phase coils 111, 112, and 113 of the first coil set 11 and the three-phase coils 121, 122, and 123 are connected to unillustrated respective phase motor lines; the motor lines are penetrated through unillustrated axial through holes formed through the frame 18 to be drawn out from the frame 18 toward the controller module 20. The drawn-out motor lines are extended to be connected to the first circuit board 21.

The controller module 20, which is mounted to the first axial end of the cylindrical housing 171 of the motor case 17, is mounted in the opening of the first axial end of the cylindrical housing 171 such that the controller module 20 is located within a motor silhouette. Note that the motor silhouette represents a virtual region formed by virtually extending the first axial end of the motor case 17 toward the axial direction away from the frame 18.

Note that the axial direction and radial direction of the motor unit serve as the respective axial direction and radial direction of the drive apparatus 8, and the axial direction and the radial direction of the drive apparatus 8 can be described simply as an axial direction and a radial direction hereinafter.

As described above, the controller module 20 includes, for example, the first circuit board 21, the second circuit board 22, and the connector unit 70. Each of the first and second circuit boards 21 and 22 is arranged in substantially parallel to the end surface 181 of the frame 18. The first and second circuit boards 21 and 22 are also arranged in the order of the first circuit board 21 and the second circuit board 22 from the side of the motor unit 10.

The first circuit board 21 has opposing first and second major surfaces 211 and 212; the first major surface 211 is closer to the motor unit than the second major surface 212 thereto (see FIGS. 5 and 6). The second circuit board 22 has opposing first and second major surfaces 221 and 222; the first major surface 221 is closer to the motor unit 10 than the second major surface 222 thereto (see FIGS. 5 and 6).

Referring to FIGS. 4 and 5, the SW elements 301 to 306 and 401 to 406, the current sensing elements 311 to 313 and 411 to 413, and the sensor package 65 are for example mounted on the first major surface 211 of the first circuit board 21. The choke coils 35 and 45 and the capacitors 36 and 46 are for example mounted on the second major surface 212 of the first circuit board 21.

Note that, from the viewpoint of FIG. 4, the SW elements 301, 302, 401, and 402 are illustrated. For the sake of representation simplicity, the current sensing elements 311 to 313 and 411 to 413, and the choke coils 35 and 45 are omitted from FIGS. 4 and 5.

The frame 18 is made of a heatsink material, such as a metal, and the SW elements 301 to 306 and 401 to 406 are arranged to be thermally linked to the frame 18, so that heat generated by the SW elements 301 to 306 and 401 to 406 are absorbed by the frame 18, and the absorbed heat is released from the drive apparatus 8 via the frame 18 and the motor case 17.

Note that the expression "A is thermally linked to B" includes that (1) A is directly contacted to B (2) A is indirectly contacted to B via a heatsink member, such as a heatsink gel.

In FIG. 4, such heatsink members are omitted from FIG. 4, and therefore the SW elements 301 to 306 and 401 to 406 are illustrated to be separated from the frame 18. The current sensing elements 311 to 313 and 411 to 413, which are other than the SW elements, can be thermally linked to the frame 18.

That is, the frame 18 serves as a heatsink, in other words, serves as both an enclosure member of the motor unit 10 and a heat sink. This enables the drive system 800 to be downsized and the number of components of the drive system 800 to be reduced as compared with a case where an additional heatsink is provided in the drive apparatus 8. The first embodiment, which uses the frame 18 as a heatsink, results in the heat transfer path of the drive apparatus 8 to the atmosphere being shortened, making it possible to dissipate heat from the drive apparatus 8 with higher efficiency.

Referring to FIGS. 4 and 6, the first and second integrated circuits 56 and 57 are mounted on the first major surface 221 of the second circuit board 22, and the first and second microcomputers 51 and 52 are mounted on the second major surface 222 of the second circuit board 22.

Specifically, the drive components through which currents to be supplied to the motor unit 10 flow are mounted to the first substrate 21, and the control components for controlling, for example, the SW elements mounted to the first circuit board 21 are mounted to the second substrate 22. In other words, the drive apparatus 8 is configured such that the first circuit board 21 serving as a power circuit board and the second circuit board serving as a control circuit board are electrically and physically separated from each other. This prevents large currents to be supplied to the motor unit 10 from flowing through the second circuit board 22, thus reducing the adverse effects of noise, which is caused by the large currents, on the control components mounted to the second circuit board 22.

Each of the first and second circuit boards 21 and 22 also has spring terminals 26.

Referring to FIGS. 3 and 4, the connector unit 70 includes a cover 71, the first and second power supply connectors 75 and 76, and the first and second signal connectors 77 and 78.

The cover 71 has a substantially cylindrical portion 711 having an opening top and a closed bottom. The bottom of the cylindrical portion 711 serves as a connector base 715. The cylindrical portion 711 has an edge 712 of the opening top, and the edge 712 is filled in the ring recess 172 formed in the first axial end of the cylindrical housing 171, and fixed thereto with, for example, adhesive.

The connector base 715 has opposing first and second major surfaces; the first major surface faces the motor unit 10. On the second major surface of the connector base 715, the first and second power supply connectors 75 and 76 and the first and second signal connectors 77 and 78 are mounted. The connectors 75 to 78 are disposed in the motor silhouette. Each of the connectors 75 to 78 has a hollow tubular shape with an opening top, i.e. a hollow frontage, into which an unillustrated wire harness can be inserted to be electrically connected to the connector.

Referring to FIGS. 2 to 4, the first power supply connector 75 includes the power supply terminal 751 that connects between the positive terminal of the first battery 39 and the first motor drive system 901, and includes the ground terminal 752 that connects between the negative terminal of the first battery 39 and the common signal ground of the first motor drive system 901. The second power supply connector 76 includes the power supply terminal 761 that connects between the positive terminal of the second battery 49 and the second motor drive system 902, and includes the ground terminal 762 that connects between the negative terminal of the second battery 49 and the common signal ground of the second motor drive system 902.

The first signal connector 77 serves to connect between the first motor drive system 901 and the torque sensor 103, and to connect between the first motor drive system 901 and the in-vehicle network. Specifically, the torque signal terminal 771 of the first signal connector 77 serves to receive the measurement signal, which represents the measured torque, sent from the torque sensor 103 to the first motor drive system 901. The vehicle signal terminal 772 of the first signal connector 77 serves to receive the vehicle operating condition signals externally sent via the in-vehicle network to the first motor drive system 901.

Similarly, the torque signal terminal 772 of the second signal connector 78 serves to receive the measurement signal, which represents the measured torque, sent from the torque sensor 103 to the second motor drive system 902. The vehicle signal terminal 782 of the second signal connector 78 serves to receive the vehicle operating condition signals externally sent via the in-vehicle network to the second motor drive system 902.

The duplication of the power supply connectors 75 and 76 provided for the respective first and second motor drive systems 901 and 902 could enable the motor unit 10 to be continuously driven even if one of wires connected between the first power supply connector 75 and the first motor drive system 901 and wires connected between the second power supply connector 76 and the second motor drive system 902 were disconnected or broken. Similarly, the motor unit 10 could be continuously driven even if one of wires connected between the second signal connector 76 and the second motor drive system 902 were disconnected or broken.

On the first major surface of the connector base 715, the internal signal terminals 717 are mounted. The internal signal terminals 717 are connected between the first and second circuit boards 21 and 22, and enable signals to be transmitted between the first and second circuit boards 21 and 22. The internal signal terminals 717 are disposed separately from the terminals 751, 752, 761, 762, 771, 772, 781, and 782 of the connectors 75 to 78, and are unconnected to the external devices of the drive apparatus 8, such as the batteries 39 and 49, the torque sensor 103, and the in-vehicle network. The internal signal terminals 717 according to the first embodiment are adapted to (1) Transfer values measured by the rotation detecting apparatus 1 to the electronic components, which include the first and second microcomputers 51 and 52, mounted on the second circuit board 22

(2) Transfer command signals sent from the first and second microcomputers 51 and 52 to the electronic components mounted on the first circuit board 21.

The number of the terminals in each of the connectors 75 to 78 can be changed, and how the terminals are arranged in each of the connectors 75 to 78 can also be changed. How terminals are assigned to the connectors 75 to 78 can further be changed. The internal signal terminals 717 can be freely disposed to any portions where the internal signal terminals 717 do not interfere with the terminals of the connectors 75 to 78. The number of the internal signal terminals 717 can be freely determined.

Each of the terminals 751, 752, 761, 762, 771, 772, 781, 782, and 717 is fitted through a corresponding one of the spring terminals 26 of the first circuit board 21 and/or the second circuit board 22. Each of the spring terminals 26 is configured to be elastically deformed to abut on a corresponding one of the terminals 751, 752, 761, 762, 771, 772, 781, 782, and 717 when a corresponding one of the terminals 751, 752, 761, 762, 771, 772, 781, 782, and 717 is fitted in the spring terminal 26. This enables each of the terminals 751, 752, 761, 762, 771, 772, 781, 782, and 717 to be electrically connected to the first circuit board 21 and/or the second circuit board 22.

Each of the terminals 751, 752, 761, 762, and 717, which connects the first and second circuit boards 21 and 22, penetrates through the second circuit board 22 to extend to the first circuit board 21 through a space between the first and second circuit boards 21 and 22 upon being projected along the axial direction. Each of the terminals 751, 752, 761, 762, and 717 is fitted through a corresponding one of the spring terminals 26 of the first circuit board 21 and a corresponding one of the spring terminals 26 of the second circuit board 22 so as to be connected to the first and second circuit boards 21 and 22.

This reduces the length of each of the terminals 751, 752, 761, 762, and 717, thus preventing the space required to arrange the terminals 751, 752, 761, 762, and 717 from increasing due to the redundancy. Each of the terminals 751, 752, 761, 762, and 717 is configured to substantially linearly penetrate through the second circuit board 22 to extend to the first circuit board 21. This configuration results in each of the terminals 751, 752, 761, 762, and 717 being shorter, resulting in reduction of the corresponding wiring impedance.

Next, the following describes the rotation detecting apparatus 1.

Referring to FIGS. 4, 5, and 7 to 9, the rotation detecting apparatus 1, which aims to detect rotation of the motor unit 10, includes the first sensor 61, the second sensor 62, the first microcomputer 51, and the second microcomputer 52.

The first and second sensors 61 and 62 are installed in the single sensor package 65 mounted on the first circuit board 21. This reduces the area on which the single sensor package 65 is mounted as compared with a case where individual packages each including a corresponding one of the first and second sensors 61 and 62 are mounted on the first circuit board 21.

Figure 9:
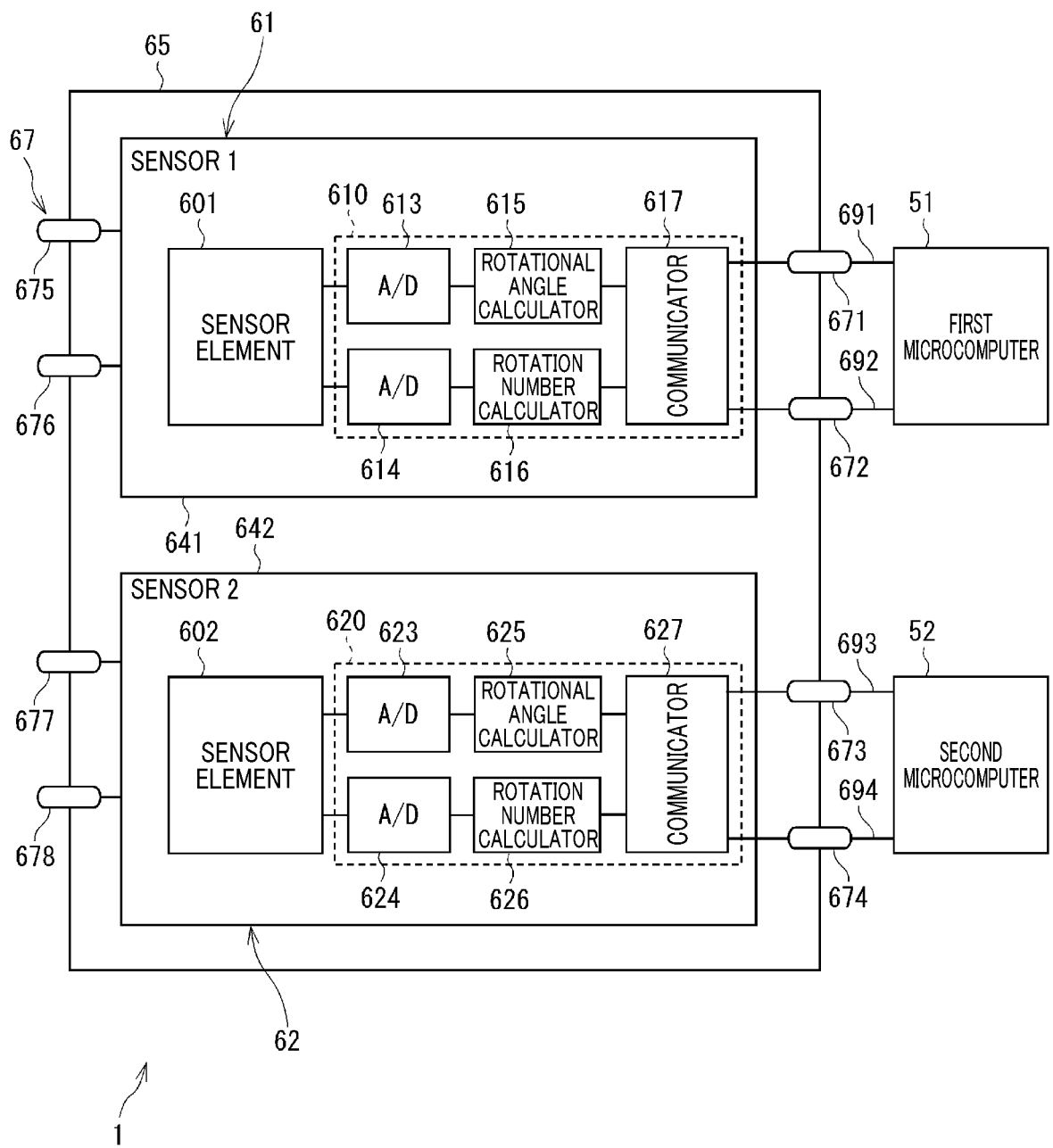
FIG. 9 is a block diagram schematically illustrating the rotation detecting apparatus according to the first embodiment of the present disclosure.

Referring to FIG. 9, the first sensor 61 includes a sensor element 601 and a circuit module 610, and the sensor element 601 and the circuit module 610 are integrated in a single chip 641. In other words, the chip 641 constituting the circuit module 610 incorporates therein the sensor element 601. The second sensor 62 includes a sensor element 602 and a circuit module 620, and the sensor element 602 and the circuit module 620 are integrated in a single chip 642. In other words, the chip 642 constituting the circuit module 620 incorporates therein the sensor element 602.

Figure 7A:
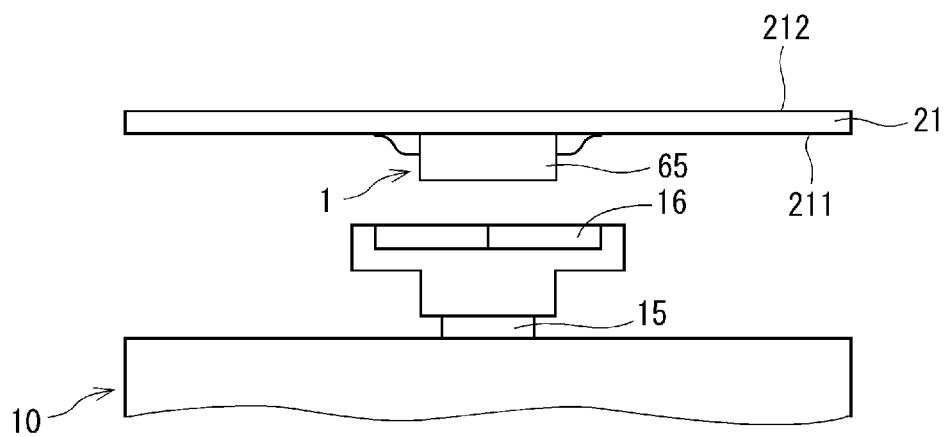
FIG. 7A is a side view of a rotation detecting apparatus according to the first embodiment.
Figure 7B:
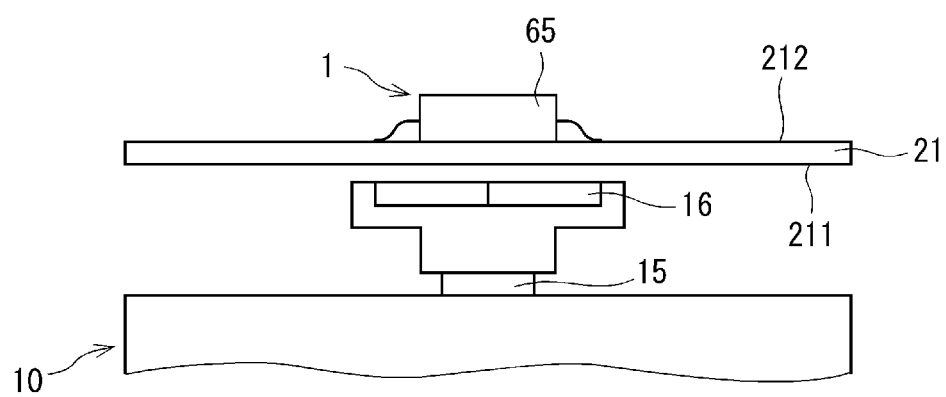
FIG. 7B is a side view of a rotation detecting apparatus according to a modification of the first embodiment.

Referring to FIGS. 4 and 7A, the sensor package 65 of the rotation detecting apparatus 1 is mounted on the first major surface 211 of the first circuit board 21. Mounting the sensor package 65 on the first major surface 211 of the first circuit board 21 results in a shorter distance between the sensor package 65 and the magnet 16, resulting in the sensor package 65 having higher accuracy of detecting rotation of the motor unit and in the magnet 16 having a lower thickness and a lower radius. In addition, referring to FIG. 7B, the sensor package 65 can be mounted on the second major surface 212 of the first circuit board 21. Mounting the sensor package 65 on the second major surface 212 of the first circuit board 21 enables the first major surface 211 of the first circuit board 21 to be efficiently used. For example, mounting the sensor package 65 on the second major surface 212 of the first circuit board 21 enables electronic components, which are other than the SW elements 301 to 306 and 401 to 406, to be mounted on the first major surface 211 while being thermally linked to the frame 18. For the sake of representation simplicity, electronic components, which are other than the sensor package 65, mounted on the first circuit board 21 are omitted from FIGS. 7A and 7B. Similarly, electronic components, which are other than the sensor package 65, mounted on the first circuit board 21 are also omitted from FIGS. 27, 28A and 28B.

Figure 8:
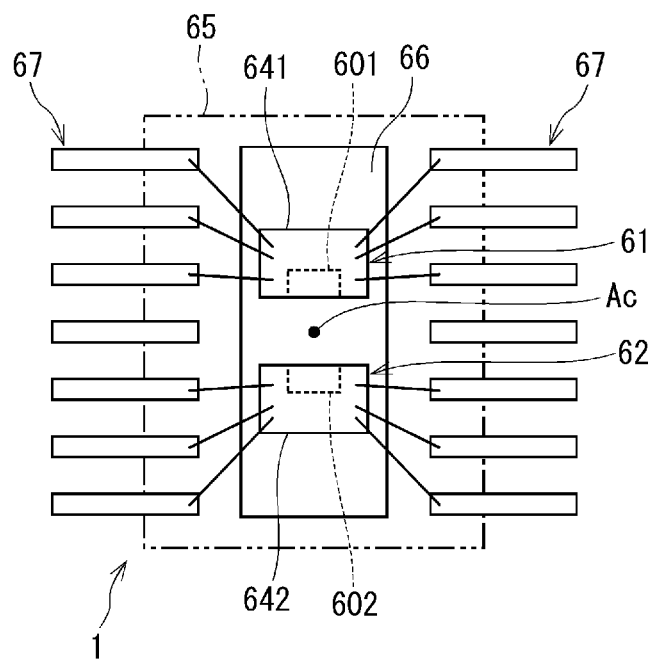
FIG. 8 is a plan view schematically illustrating the internal structure of the rotation detecting apparatus according to the first embodiment of the present disclosure.

Referring to FIGS. 8 and 9, the sensor package 65 has a substantially rectangular parallelepiped shape. The sensor package 65 has a pair of longer sides, and has sensor terminals 67 mounted to the respective longer sides. The sensor terminals 67 include command terminals 671 and 673, output terminals 672 and 674, power supply terminals 675 and 677, and ground terminals 676 and 678.

The rotation detecting apparatus 1 is configured such that electrical power is supplied thereto from each of the first and second batteries 39 and 49 via an unillustrated regulator and a corresponding one of the power supply terminals 675 and 677.

Specifically, the first battery 39 according to the first embodiment supplies electrical power to the first sensor 61 via, for example, the power supply terminal 675, and the second battery 49 according to the first embodiment supplies electrical power to the second sensor 62 via, for example, the power supply terminal 676.

Each of the first embodiment and the other embodiments described later can be configured such that only one of the first and second batteries 39 and 49 supplies electrical power to both the first and second sensors 61 and 62.

The rotation detecting apparatus 10 is connected to the common signal ground via the ground terminals 676 and 678.

Referring to FIG. 8, each of the chip 641, which constitutes the first sensor 61, and the chip 642, which constitutes the second sensor 62, is mounted to a substantially rectangular plate-like lead frame 66 installed in the sensor package 65. Each of the chips 641 and 642 is connected to the sensor terminals 67 by, for example, wires. The first major surface 211 of the first circuit board 21 has formed thereon a previously designed wiring pattern to which the sensor terminals 67 are connected. This enables the first and second sensors 61 and 62 to be connected to the first circuit board 21.

Each of the first and second sensors 61 and 62 is a magnetic sensor for measuring magnetic change, i.e. magnetic flux change, based on rotation of the magnet 16 of the motor unit 10 together with the shaft 15. Each of the first and second sensors 61 and 62 according to the first embodiment can be comprised of a Hall device or a magnetoresistive (MR) sensor device, such as an anisotropic magnetoresistive (AMR) sensor device, a giant magnetoresistive (GMR) sensor device, or a tunneling magnetoresistive (TMR) sensor device. The motor unit 10, i.e. the magnet 16, which turns together with the shaft 15, serves as a detection target.

The first and second sensors 61 and 62, i.e. the chips 641 and 642, are arranged to be symmetric with respect to the point where the rotation center line Ac and the first circuit board 21 intersect with each other. Hereinafter, the description that A and B are arranged to be symmetric with respect to the point where the rotation center line Ac and the first circuit board 21 intersect with each other will be simply described as "A and B are arranged to be symmetric with respect to the rotation center line Ac". Locating the first and second sensors 61 and 62 to be symmetric with respect to the rotation center line Ac enables measurement errors between the first and second sensors 61 and 62 to be reduced.

Referring to FIG. 9, the circuit module 610 includes analog-digital (A/D) converters 613 and 614, a rotational angle calculator 615, a rotation number calculator 616, and a communicator 617. The circuit module 620 also includes A/D converters 623 and 624, a rotational angle calculator 625, a rotation number calculator 626, and a communicator 627.

The following mainly describes the circuit module 610, because the structures and functions of the components 623, 624, 625, and 627 of the circuit module 620 are substantially identical to the structures and functions of the respective components 613, 614, 615, and 617 of the circuit module 610.

The A/D converter 613 converts a measurement value of the sensor element 601, i.e. measurement information indicative of magnetic change of the magnet 16, into a digital measurement value, thus outputting it to the rotational angle calculator 615. The A/D converter 614 converts the measurement value of the sensor element 601, i.e. measurement information indicative of magnetic change of the magnet 16, into a digital measurement value, thus outputting it to the rotation number calculator 615. Hereinafter, a digital measurement value after A/D conversion will be simply referred to as a measurement value of a sensor element. Note that the A/D converters 613 and 614 can be omitted as necessary.

The rotational angle calculator 615 calculates a rotational angle θm based on the measurement value of the sensor element 601. A value calculated by the rotational angle calculator 615 is not limited to the rotational angle θm itself, but information associated with the rotational angle θm can be calculated as the rotational angle θm; this information enables the first microcomputer 51 to calculate the rotational angle θm based on the information. Calculation of the rotational angle θm can include the above modified calculations. Note that a mechanical angle is used as the rotational angle θm, but an electrical rotational angle can be used.

The rotation number calculator 616 calculates a rotation number TC based on the measurement value of the sensor element 601. A value calculated by the rotation number calculator 616 is not limited to the rotation number TC itself, but information associated with the rotation number TC can be calculated as the rotation number TC; this information enables the first microcomputer 51 to calculate the rotation number TC based on the information. Calculation of the rotation number TC can include the above modified calculations.

For example, the first embodiment is configured to divide one rotation, i.e. 360-degree rotational angle, of the motor unit 10 into three partial rotations, i.e. three 120-degree rotational angular ranges, and determine a predetermined first rotational direction as a count-up direction, and a predetermined second rotational direction, which is opposite to the first rotational direction, as a count-down direction.

For example, the rotation number calculator 616 includes, for example, a hardware counter or a software counter. That is, the rotation number calculator 616 is configured to (1) Increment the current counted value of the counter each time the rotational angle θm of the motor unit 10 changes from a current rotational angular range to an adjacent rotational angular range in the count-up direction (2) Decrement the current counted value of the counter each time the rotational angle θm of the motor unit 10 changes from a current rotational angular range to an adjacent rotational angular range in the count-down direction (3) Calculate the rotation number TC of the motor unit 10 based on the current counted value of the counter.

The counted value of the counter itself is contained in the concept of the rotation number TC.

Dividing one rotation of the motor unit 10 into three or more partial rotations enables the rotational direction of the motor unit 10 to be identified. Dividing one rotation of the motor unit 10 into five partial rotations enables the rotational direction of the motor unit 10 to be identified even if change of the rotational angle θm of the motor unit 10 from a current rotational angular range to an adjacent rotational angular range is skipped. The rotation number calculator 616 can be configured to calculate the rotation number TC based on the rotational angle θm of the motor unit 10.

Note that the number of rotations of the motor unit 10 in the present specification does not represent the rotational speed, i.e. revolutions per minute in rpm, of the motor unit 10 but represents how many times the motor unit 10 turns. The number of rotations of the motor unit 10 expressed in, for example, rpm is represented as a rotational speed.

The communicator 617 is configured to (1) Generate an output signal, which includes a rotational angle signal containing the rotational angle θm and a rotation number signal containing the rotation number TC (2) Output, as a frame, the output signal to the first microcomputer 51 using a predetermined digital communication interface, such as a serial peripheral interface (SPI).

Specifically, the first microcomputer 51 according to the first embodiment sends an instruction to the first sensor 61 via a communication line 691 and the command terminal 671. The first sensor 61 outputs, as a frame, the output signal to the first microcomputer 51 via the output terminal 672 and a communication line 692 upon receiving the instruction from the first microcomputer 51.

Each frame of the output signal to be sent to the first microcomputer 51 includes, in addition to the rotational angle signal associated with the rotational angle θm and the rotation number signal associated with the rotation number TC, a run counter signal and a cyclic redundancy check (CRC) code, i.e. CRC signal, serving as an error detection signal. From FIG. 10, the run counter signal is omitted. Another error detection signal, such as a checksum signal, can be used in place of the CRC code.

The communicator 617 of the second sensor 62 is configured to (1) Generate an output signal, which includes a rotational angle signal containing the rotational angle θm calculated by the rotational angle calculator 625 and a rotation number signal containing the rotation number TC calculated by the rotation number calculator 626

(2) Output the output signal to the second microcomputer 52

Specifically, the second microcomputer 52 according to the first embodiment sends an instruction to the second sensor 62 via a communication line 693 and the command terminal 673. The second sensor 62 outputs the output signal to the second microcomputer 52 via the output terminal 674 and a communication line 694 upon receiving the instruction.

Because the first and second microcomputers 51 and 52 are mounted on the second circuit board 22, traces of a previously designed wiring pattern and the internal signal terminals 717 serve as the communication lines 691 to 694.

Note that each of the first and second microcomputers 51 and 52 includes a run counter with an initial count value of zero, and is configured to increment the count value by 1 each time the run counter signal is sent thereto from the corresponding one of the first and second sensors 61 and 62. This enables each of the first and second microcomputers 51 and 52 to diagnose whether communications from the corresponding one of the first and second sensors 61 and 62 to the corresponding microcomputer is normally carried out.

The first microcomputer 51 calculates, based on the rotational angle signal contained in the output signal captured from the first sensor 61, the rotational angle θm of the motor unit 10. The first microcomputer 51 controls, based on the rotational angle θm of the motor unit 10, on-off switching operations of the SW elements 301 to 306 of the first inverter 30 and the relays 32 and 33 to control how the motor unit 10 is driven.

In addition, the first microcomputer 51 calculates, based on the rotational angle signal and the rotation number signal contained in the output signal, a steering angle θs of the steering shaft 102. Because the steering shaft 102 is coupled to the shaft 15 of the motor unit 10 via the deceleration gear mechanism 109, the first microcomputer 51 calculates the steering angle θs of the steering shaft 102 as a function of the rotational angle θm, the rotation number TC, and the gear ratio of the deceleration gear mechanism 109.

The second microcomputer 52 is configured to perform, based on the rotational angle signal contained in the output signal captured from the second sensor 62, the same calculations as the above calculations performed by the first microcomputer 51.

Note that the neutral position of the steering wheel 101 is defined as the position of the steering wheel 101 when the vehicle V incorporating therein the electronic power steering apparatus 108 is travelling in a straight line.

For example, each of the first and second microcomputers 51 and 52 is capable of learning the neutral position of the steering wheel 101 while the vehicle V is travelling in a straight line at a constant speed for a predetermined time. Each of the first and second microcomputers 51 and 52 stores the learned neutral position of the steering wheel 101 therein. That is, each of the first and second microcomputers 51 and 52 calculates the steering angle θs of the steering shaft 102 relative to the neutral position of the steering wheel 101 as a function of the rotational angle θm, the rotation number TC, and the gear ratio of the deceleration gear mechanism 109. This configuration to calculate the steering angle θs of the steering shaft 102 enables steering sensors to be eliminated.

Figure 10:
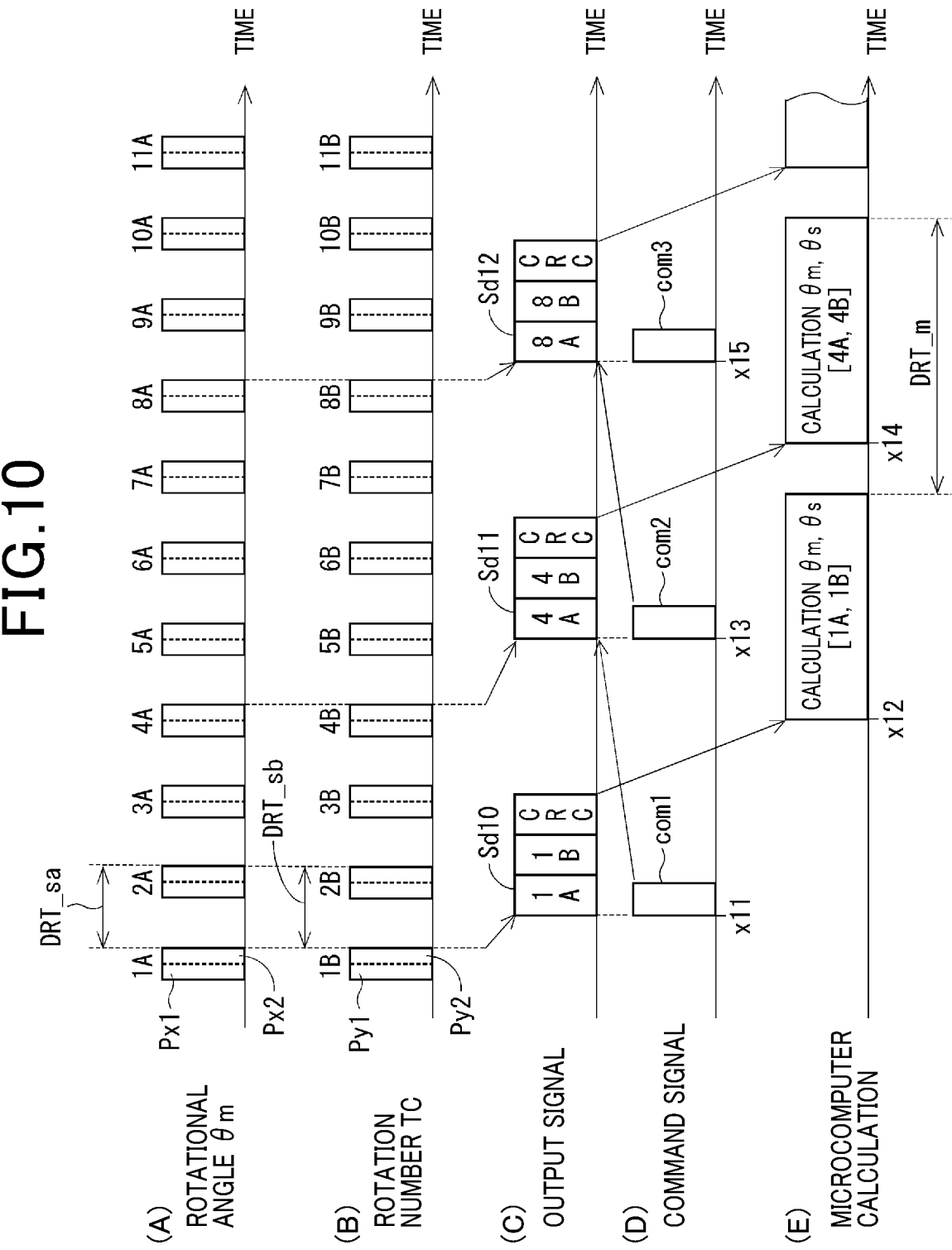
FIG. 10 is a timing chart schematically illustrating an example of how a sensor and a corresponding microcomputer according to the first embodiment of the present disclosure communicate with each other.
Figure 11:
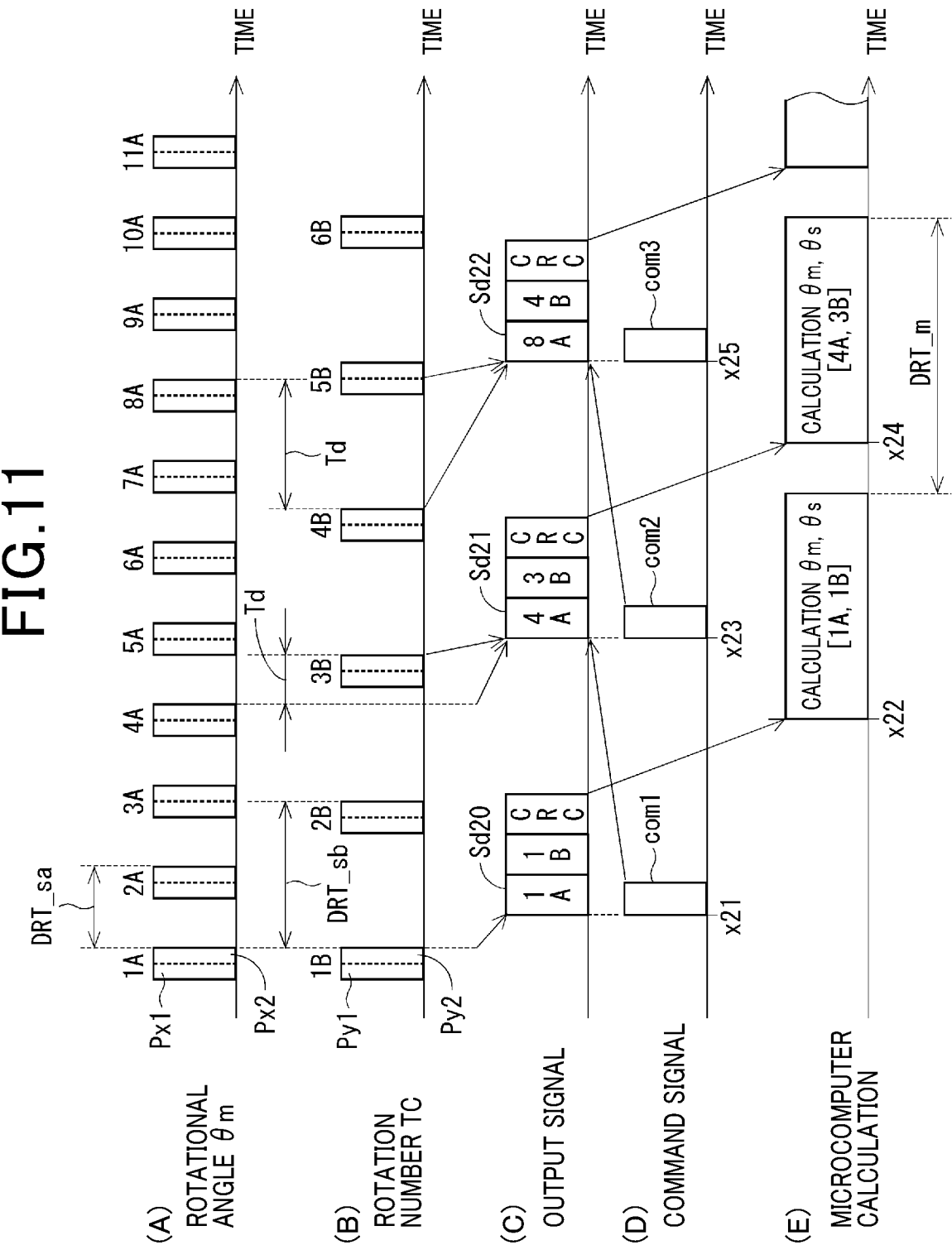
FIG. 11 is a timing chart schematically illustrating another example of how the sensor and the corresponding microcomputer according to the first embodiment of the present disclosure communicate with each other.

The following describes how each of the first and second sensors 61 and 62 communicates with a corresponding one of the first and second microcomputers 51 and 52 with reference to reference characters (A) to (E) in FIG. 10. Hereinafter, reference character (Y) in FIG. X will be referred to as FIG. XY.

FIG. 10A illustrates the rotational angle θm of the motor unit 10, which is periodically detected by the first sensor 61, and FIG. 10B illustrates the rotation number TC of the motor unit 10, which is periodically detected by the first sensor 61. FIG. 10C illustrates the output signal periodically output from the first sensor 61 to the first microcomputer 51, and FIG. 10D illustrates the command signal periodically transmitted from the first microcomputer 51 to the first sensor 61. FIG. 10E illustrates how the first microcomputer 51 calculates the rotational angle θm and the steering angle θs.

As illustrated in FIGS. 10A to 10E, the following describes only how the first sensor 61 communicates with the first microcomputer 51 with reference to FIGS. 10A to 10E, and eliminates how the second sensor 62 communicates with the second microcomputer 52. This is because how the second sensor 62 communicates with the second microcomputer 52 is substantially identical to how the first sensor 61 communicates with the first microcomputer 51.

Referring to FIG. 10A, the first microcomputer 51 updates the rotational angle θm in a predetermined update period DRT_sa. FIG. 10A illustrates pulses at constant intervals each corresponding to the update period DRT_sa; the width of each pulse in FIG. 10A represents the calculation period required for the rotational angle calculator 615 to perform one update of the rotational angle θm.

Specifically, the width, i.e. the period, of each pulse in FIG. 10A includes a first half period Px1 and a second half period Px2. The A/D converter 613 converts a value measured by the sensor element 601 into a digital measurement value during the first half period Px1, and the rotational angle calculator 615 calculates a value of the rotational angle θm based on the digital measurement value, thus updating the measurement data for the rotational angle θm during the second half period Px2. FIG. 10A illustrates that the measurement data for the rotational angle θm is updated in the following order of values 1A, 2A, . . . , and 11A. Note that FIG. 10A illustrates the first and second half periods Px1 and Px2 as the calculation period of the data 1A, but they can be applied to each of the other pieces of data 2A to 11A.

Referring to FIG. 10B, the first microcomputer 51 updates the rotation number TC of the motor unit 10 in a predetermined update period DRT_sb. The width of each pulse illustrated in FIG. 10B represents the calculation period required for the rotation number calculator 616 to perform one update of the rotation number TC.

Specifically, the width, i.e. the period, of each pulse in FIG. 10B includes a first half period Py1 and a second half period Py2. The A/D converter 614 converts a value measured by the sensor element 601 into a digital measurement value during the first half period Py1, and the rotation number calculator 616 calculates a value of the rotation number TC based on the digital measurement value, thus updating the measurement data for the rotation number TC during the second half period Py2. FIG. 10B illustrates that the measurement data for the rotation number TC is updated in the order of values 1B, 2B, . . . , and 11B. Note that FIG. 10B illustrates the first and second half periods Py1 and Py2 as the calculation period of the data 1B, but they can be applied to each of the other pieces of data 2B to 11B.

That is, in each of FIGS. 10A, 11A, 15A, and 29A, each pulse nA (n is any natural number) represents the corresponding measurement data for the rotational angle θm, and the corresponding rotational angle signal, and, in each of FIGS. 10B, 11B, 15B, and 29B, each pulse nB (n is any natural number) represents the corresponding measurement data for the rotation number TC, and the corresponding rotation number signal.

FIGS. 10A and 10B illustrate that the update period DRT_sa of the rotational angle θm is equal to the update period DRT_sb of the rotation number TC, and is shorter than a calculation period DRT_m of the first microcomputer 51 described below.

Referring to FIGS. 10C and 10D, the first microcomputer 51 sends a command signal com1 to the first sensor 61 at time x11. The command signal com1 requests transmission of the output signal at the next transmission timing of the next command signal. The communicator 617 transmits, at the time x11, the output signal Sd10 requested by the immediately previous command signal com0 (not shown) to the first microcomputer 51; the time x11 represents the timing of receiving the command signal com1.

That is, the output signal Sd10 includes the rotational angle θm based on the newest measurement data, and the rotation number TC based on the newest measurement data, and the CRC signal.

In detail, the output signal Sd10 includes (1) The newest measurement data, i.e. rotational angular signal, 1A for the rotational angle θm, which is comprised of a predetermined number of bits (2) The newest measurement data, i.e. rotation number signal, 1B for the rotation number TC, which is comprised of a predetermined number of bits (3) The CRC code that is comprised of a predetermined number of bits calculated based on the newest rotational angular signal 1A of the rotational angle θm and the newest rotation number signal 1B of the rotation number TC The first microcomputer 51 starts to calculate, at time x12, the rotational angle θm and the steering angle θs based on the rotational angular signal and the rotation number signal included in the output signal Sd10. In FIG. 10E, reference character [1A, 1B] represents that the measurement data 1A and the measurement data 1B are used to calculate the rotational angle θm and the steering angle θs. Note that there is no need for the first microcomputer 51 to calculate the steering angle θs each time the output signal is sent to the first microcomputer 51. That is, the first microcomputer 51 calculates the steering angle θs in a predetermined calculation period DRT_m that is longer than the update periods DRT_sa and DRT_sb, but can calculate the steering angle θs at the rate of one calculation per the predetermined number of the calculation periods DRT_m.

When the first microcomputer 51 sends a command signal com2 to the first sensor 61 at time x13, the first sensor 61 sends, to the first microcomputer 51, the output signal Sd11 including the rotational angle signal based on the measurement data 4A including the rotational angle nm, the rotation number signal based on the measurement data 4B including the rotation number TC, and the CRC signal. The first microcomputer 51 starts to calculate, at time x14, the rotational angle θm and the steering angle θs based on the rotational angular signal 4A and the rotation number signal 4B included in the output signal Sd11.

When the first microcomputer 51 sends a command signal com3 to the first sensor 61 at time x15, the first sensor 61 sends, to the first microcomputer 51, the output signal Sd12 including the rotational angle signal based on the measurement data 8A including the rotational angle θm, the rotation number signal based on the measurement data 8B including the rotation number TC, and the CRC signal.

FIGS. 11A to 11E, which correspond to respective FIGS. 10A to 10E, illustrate how the first and second sensors 61 and 62 communicate with the respective first and second microcomputers 51 and 52 when the update periods DRT_sa and DRT_sb are set to be different from each other.

Specifically, the update period DRT_sb of the rotation number TC can be set to be longer than the update period DRT_sa of the rotational angle θm. The update period DRT_sa of the rotational angle θm need be sufficiently shorter than the calculation period DRT_m of the first microcomputer 51. In contrast, the update period DRT_sb of the rotation umber TC can be set to a suitable period depending on a predetermined rotational speed of the motor unit 10; the proper period is capable of preventing skipping of detection of each of the divided three rotational angular ranges. This is because reliably detecting each of the divided three rotational angular ranges enables the rotation number of the motor unit 10 to be detected, resulting in preventing erroneous detection of the rotation number of the motor unit 10. Note that the predetermined rotational speed of the motor unit 10 can be set to the maximum rotational speed of the motor unit 10 or to a predetermined value required to count the rotation number TC.

Referring to FIGS. 11C and 11D, like the operation of the first sensor 61 at the time x11, the first sensor 61 transmits, at time x21, the output signal Sd20, which includes the rotational angle signal based on the measurement data 1A and the rotation number signal based on the measurement data 1B, to the first microcomputer 51. Similar to the operation of the first microcomputer 51 at the time x12, the first microcomputer 51 starts to calculate, at time x22, the rotational angle θm and the steering angle θs based on the output signal Sd20.

When the first microcomputer 51 sends the command signal com2 to the first sensor 61 at time x23, the first sensor 61 transmits, at the time x23, the output signal Sd21, which includes the rotational angle signal based on the measurement data 4A and the rotation number signal based on the measurement data 4B, at the time x23, to the first microcomputer 51.

Similar to the operation of the first microcomputer 51 at the time x14, the first microcomputer 51 starts to calculate, at time x24, the rotational angle θm and the steering angle θs based on the output signal Sd22.

When the first microcomputer 51 sends the command signal com3 to the first sensor 61 at time x25, the first sensor 61 transmits, at the time x25, the output signal Sd22, which includes the rotational angle signal based on the measurement data 8A and the rotation number signal based on the measurement data 4B for the rotation number TC to the first microcomputer 51.

In contrast, FIGS. 29A to 29E, which correspond to respective FIGS. 10A to 10E, illustrate how a rotational angle sensor for detecting the rotation angle of a motor and a rotation number sensor for detecting the rotation number of the motor, which are respectively provided in separated first and second chips, communicate with a microcomputer in a comparative example. That is, in this comparative example, the rotational angle sensor, i.e. the first chip, and the rotation number sensor, i.e. the second chip, alternatively output the rotational angle signal and the rotation number signal. Note that the update period DRT_sa and the update period DRT_sb are set to be identical to those illustrated in FIG. 11.

Figure 29:
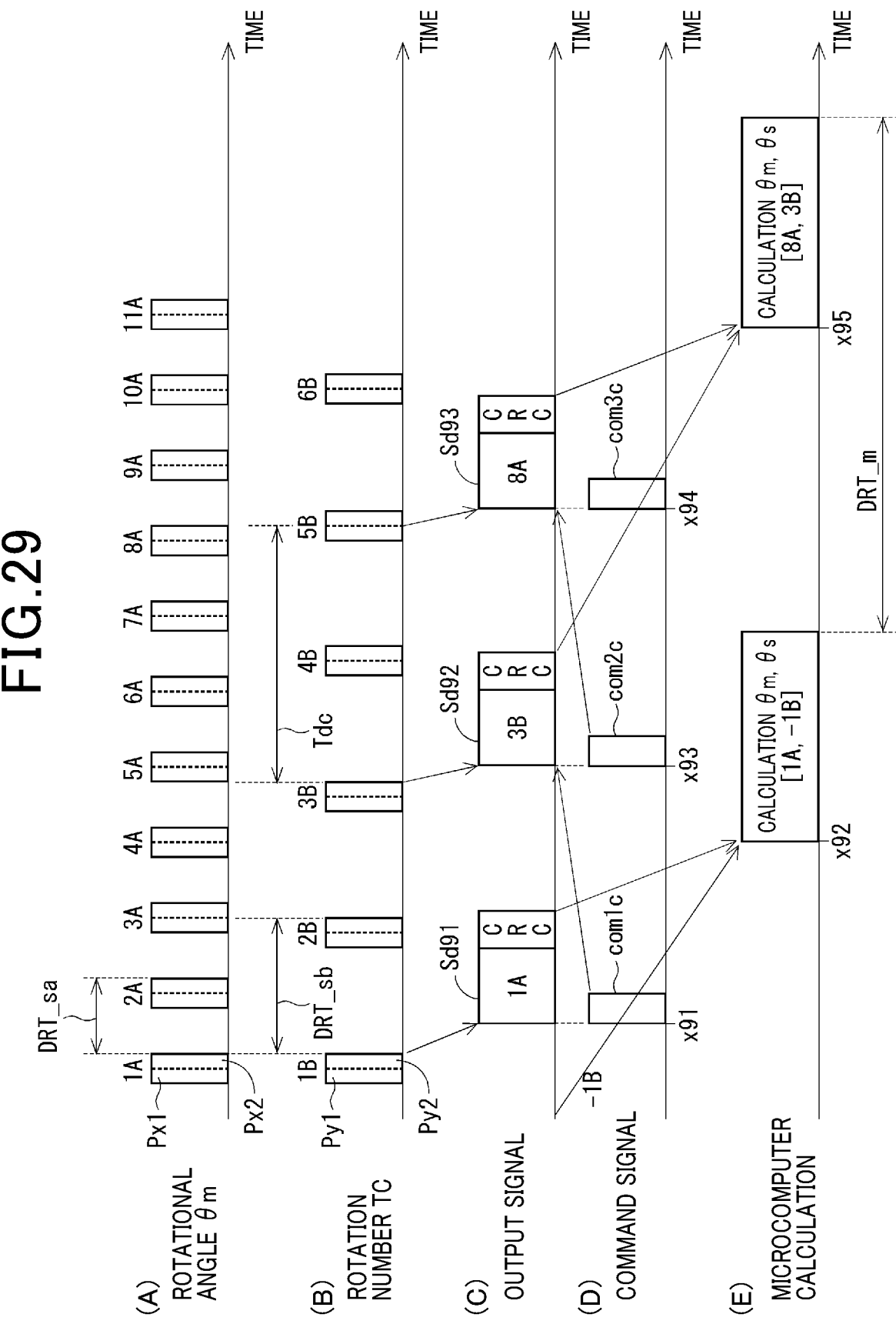
FIG. 29 is a timing chart illustrating how a sensor and a corresponding microcomputer communicate with each other according to the comparison example.

Referring to FIGS. 29C and 29D, the rotational angle sensor transmits, at the time x91, the output signal Sd91, which includes the rotational angle signal based on the measurement data 1A without including the rotation number signal in response to an unillustrated command signal com0c immediately before the command signal comic sent from the microcomputer.

The microcomputer calculates, at time x92, the rotational angle θm and the steering angle θs based on the measurement data 1A included in the output signal Sd91 and the measurement data 1B included in the immediately previous output signal Sd90 (not illustrated) transmitted at the transmitting timing of the command signal com0c.

When the microcomputer sends a command signal com2c to the rotation number sensor at time x93, the rotation number sensor transmits the output signal Sd92, which includes the rotation number signal based on the measurement data 3B. When the microcomputer also sends a command signal com3c to the rotational angle sensor at time x94, the rotational angle sensor transmits the output signal Sd93, which includes the rotational angle signal based on the measurement data 8A.

The microcomputer calculates, at time x95, the rotational angle θm and the steering angle θs based on the measurement data 8A included in the output signal Sd93 and the measurement data 3B included in the output signal Sd92.

As described above, this comparative example is configured such that the rotational angle sensor used to detect the rotational angle θm and the rotation number sensor used to detect the rotation number TC are respectively provided to be separated from each other. This results in the rotational angle signal and the rotation number signal being individually output to the microcomputer. For this reason, the length Tdc of the gap between the detection timing of the rotational angle signal and the detection timing of the rotation number signal used by the calculation at the time x95 as an example may become longer than the sending period of the command signals from the microcomputer.

That is, this comparative example, which has the longer gap between each detection timing of the rotational angle θm and a corresponding detection timing of the rotation number signal TC, may result in the steering angle θs being incorrectly calculated.

In contrast, the rotation detecting apparatus 1 according to the first embodiment is configured such that the rotation angle calculator 614 and the rotational angle calculator 615 are integrated in the single chip 641, and is configured to transmit, to the first microcomputer 51, the output signal set including a series of the rotational angle signal and the rotation number signal from the communicator 617.

For this reason, as illustrated in FIGS. 10A to 10E, if the measurement data for the rotational angle nm and the measurement data for the rotation number TC are periodically detected in synchronization with each other, the first microcomputer 51 is capable of calculating the rotational angle θm, the rotation number TC, and the steering angle θs based on the measurement data for the rotational angle θm and the measurement data for the rotation number TC in accordance with the simultaneously, i.e. synchronously, measured measurement values.

In addition, as illustrated in FIGS. 11A to 11E, even if the update period DRT_sa and the update period DRT_sb are different from each other, the rotation detecting apparatus 1 is configured to transmit, to the first microcomputer 51, the output signal set, which includes a series of the newest measurement data and the newest measurement data. This configuration enables the length Td of the gap between the detection timing of the measurement data for the rotational angle θm and the detection timing of the measurement data for the rotation number TC to be shorter than the command period of the first microcomputer 51. This configuration therefore reduces the gap between the detection timing of the measurement data for the rotational angle θm and the detection timing of the measurement data for the rotation number TC as compared with the comparative example that individually outputs the rotational angle signal based on the rotational angle θm and the rotation number signal based on the rotation number TC.

The rotation detecting apparatus 1 according to the first embodiment is configured to transmit, to the first microcomputer 51, the output signal set, which includes a series of the rotational angle signal and the rotation number signal, via the single communication line 692. This configuration enables the number of communication lines connecting between the first microcomputer 51 and the rotation detecting apparatus 1 to be reduced in comparison to a case where the rotational angle signal and the rotation number signal are individually transmitted to the first microcomputer 51 via separate communication lines.

As described above, the drive apparatus 8, which is configured as the dual redundant system set forth above, according to the first embodiment is installed in the electronic power steering apparatus 108. Because the electronic power steering apparatus 108 controls the turning function of the vehicle V as one of basic functions included the vehicle V, the dual redundant configuration of the drive apparatus 8 enables the driver's operation of the steering wheel 101 to be continuously assisted even if one of the dual redundant portions of the drive apparatus 8 has malfunctioned.

In particular, the rotation detecting apparatus 1 includes the duplicated circuit modules 610 and 620 each configured to calculate the rotational angle θm and the rotation number TC. This configuration enables the assist operations of the electronic power steering apparatus 108 to be continuously performed even if one of the duplicated circuit modules 610 and 620 has malfunctioned.

In addition, the rotation detecting apparatus 1 is configured such that each of the duplicated circuit modules 610 and 620 is integrated in a corresponding one of the single chips 641 and 642, resulting in the rotation detecting apparatus 1 being downsized. This contributes to downsizing of the drive apparatus 8, resulting in an increase of the passenger's space in the passenger compartment of the vehicle V and an improvement of the fuel economy of the vehicle V.

As described in detail above, the rotation detecting apparatus 1 of the first embodiment includes the first sensor 61, the second sensor 62, the first microcomputer 51, and the second microcomputer 52.

The first sensor 61 includes the sensor element 601 and the circuit module 610, and the second sensor 62 includes the sensor element 602 and the circuit module 620.

Each of the sensor elements 601 and 602 is configured to detect rotation of the motor unit 10.

The circuit module 610 includes the rotational angle calculator 615, the rotation number calculator 616, and the communicator 617. The rotational angle calculator 615 calculates the rotational angle θm of the motor unit 10 based on the measurement value of the sensor element 601. The rotation number calculator 615 calculates the rotation number TC of the motor based on the measurement value of the sensor element 601. The communicator 617 generates an output signal set including a series of the rotational angle signal, which is a signal associated with the rotational angle θm, and the rotation number signal, which is a signal associated with the rotation number TC. Then, the communicator 617 transmits the output signal set to the first microcomputer 51.

The circuit module 620 includes the rotational angle calculator 625, the rotation number calculator 626, and the communicator 627. The rotational angle calculator 625 calculates the rotational angle θm of the motor unit 10 based on the measurement value of the sensor element 602. The rotation number calculator 625 calculates the rotation number TC of the motor based on the measurement value of the sensor element 602. The communicator 627 generates an output signal set including a series of the rotational angle signal, which is a signal associated with the rotational angle θm, and the rotation number signal, which is a signal associated with the rotation number TC. Then, the communicator 627 transmits the output signal set to the second microcomputer 52.

The sensor package 65 is configured such that the sensor elements 601 and 602 and the circuit modules 610 and 620 are sealed therein, i.e. packaged therein. The sensor package 65 is mounted to the first circuit board 21 separately from the first and second microcomputers 51 and 52.

Specifically, the first embodiment provides the circuit modules 610 and 620 each including the function of calculating the rotational angle θm and the function of calculating the rotation number TC. This makes it possible to, even if one of the circuit modules 610 and 620 has malfunctioned, the other of the circuit modules 610 and 620 to continuously calculate the rotational angle θm and the rotation number TC. The sensor package 65 is configured such that the sensor elements 601 and 602 and the circuit modules 610 and 620 are packaged therein separately from the package of the first and second microcomputers 51 and 52. This makes it possible to mount, for example, the first and second microcomputers 51 and 52 on the second circuit board 22, which is separated from the first circuit board 21 on which the rotation detecting apparatus 1 is mounted, resulting in an increase of the flexibility of arrangement of elements on each of the first and second circuit board 21 and 22.

Figure 30:
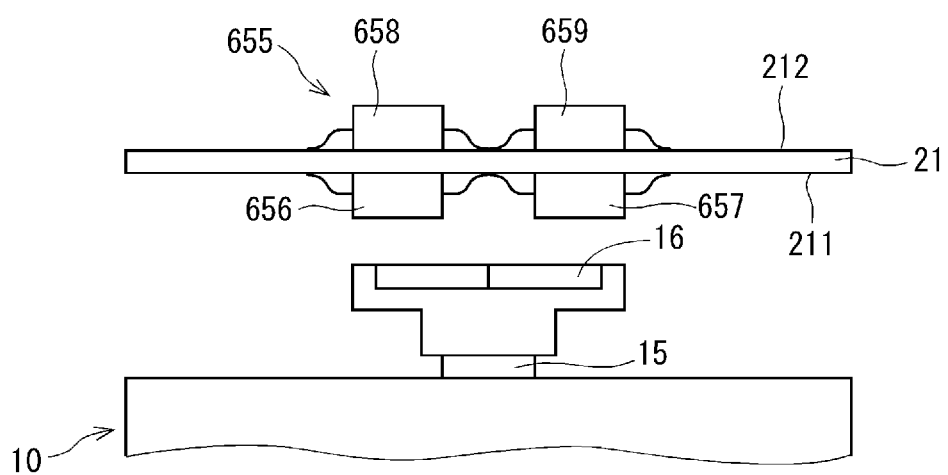
FIG. 30 is a side view of a rotation detecting apparatus according to a reference example.

FIG. 30 schematically illustrates a rotation detecting apparatus 655 as a reference example. The rotation detecting apparatus 655 includes packages 656 and 657 that calculate the rotational angle θm, and packages 658 and 659 that calculate the rotation number TC; the packages 656 to 659 are mounted on the first circuit board 21 while the packages 656 and 657 are separated from the packages 658 and 659.

As compared with the structure of the rotation detecting apparatus 655, the rotation detecting apparatus 1 according to the first embodiment is configured to reduce the footprint of the sensor package 65 on the first substrate 21. This configuration enables a mounting area of, for example, the first major surface 211 of the first circuit board 21, on which components are to be mounted, to be ensured; these components, such as the SW elements 301 to 306 and 401 to 406, have a need for heat dissipation. In addition, this configuration also enables the first and second sensor elements 601 and 602 to be disposed close to the rotation center line Ac. This arrangement results in the magnet 16 being downsized, and prevents the detection accuracy of the rotation detecting apparatus 1 from deteriorating.

All of the sensor elements 601 and 602 and the circuit modules 610 and 620 are installed in the single package 65, resulting in the rotation detecting apparatus 1 being downsized.

The first and second sensor elements 601 and 602 are arranged to be symmetric with respect to the rotation center line Ac. This arrangement enables measurement errors between the first and second sensor elements 601 and 602 to be reduced.

The sensor element 601 and the circuit module 610 are incorporated in the same chip 641. Packaging the sensor element 601 and the circuit module 610 in the same single chip enables the rotation detecting apparatus 1 being further downsized. This can be established for the package of the sensor element 602 and the circuit module 620.

The first circuit board 21 on which the sensor package 65 is mounted and the second circuit board 22 located across the first circuit board 21 from the motor unit 10 are connected to each other by the internal connection terminals 717 provided in the connector unit 70. The first and second microcomputers 51 and 52 are mounted on the second circuit board 22. The rotational angle signal and the rotation number signal measured by each of the first and second sensors 61 and 62 are transmitted to the corresponding one of the first and second microcomputers 51 and 52 via the corresponding internal connection terminals 717. This enables the rotational angle signal and the rotation number signal measured by each of the first and second sensors 61 and 62 to be properly transmitted to the corresponding one of the first and second microcomputers 51 and 52.

The communicator 617 transmits, to the first microcomputer 51, an output signal including a series of the corresponding rotational angle signal and the corresponding rotation number signal using the single communication line 692. Similarly, the communicator 617 transmits, to the first microcomputer 51, an output signal including the series of the corresponding rotational angle signal and the corresponding rotation number signal using the single communication line 693.

Because the rotational angle signal and the rotation number signal are included in the output signal, it is possible to output the rotational angle signal and the rotation number signal calculated by each of the first and second sensors 61 and 62 by one communication to the corresponding one of the first and second microcomputers 51 and 52. This results in a reduction in the deviation between the measurement value of the rotational angle θm and the measurement value of the rotation number TC. The single communication line 692 enables the rotational angle signal and the rotation number signal to be transmitted from the communicator 617 to the first microcomputer 51. Similarly, the single communication line 694 enables the rotational angle signal and the rotation number signal to be transmitted from the communicator 627 to the second microcomputer 52.

These configurations result in a lower number of communication lines as compared with a case where communication lines are provided for the respective rotational angle signal and rotation number signal.

The electronic power steering apparatus 108 includes the motor unit 10, the rotation detecting apparatus 1, and the first and second microcomputers 51 and 52. The motor unit 10 is configured to generate assist torque for assisting the driver's operation of the steering wheel 101. Each of the first and second microcomputers 51 and 52 is configured to control the motor unit 10 based on each of the transmitted sets of the rotational angle signal and the rotation number signal. Each of the sensor elements 601 and 602 detects rotation of the motor unit 10 as a detection target.

The first embodiment provides a single chip incorporating therein the calculation function of the rotational angle θm and the calculation function of the rotation number TC, thus downsizing the rotation detecting apparatus 1. This contributes to downsizing of the electronic power steering apparatus 108.

Each of the first and second microcomputers 51 and 52 is configured to calculate the steering angle θs of the steering shaft 102 based on the rotational angle θm and the rotation number TC included in the corresponding output signal. This configuration enables a steering sensor for measuring the steering angle θs using, for example, a gear mounted on the steering shaft 102 to be eliminated.

Second Embodiment

Figure 12:
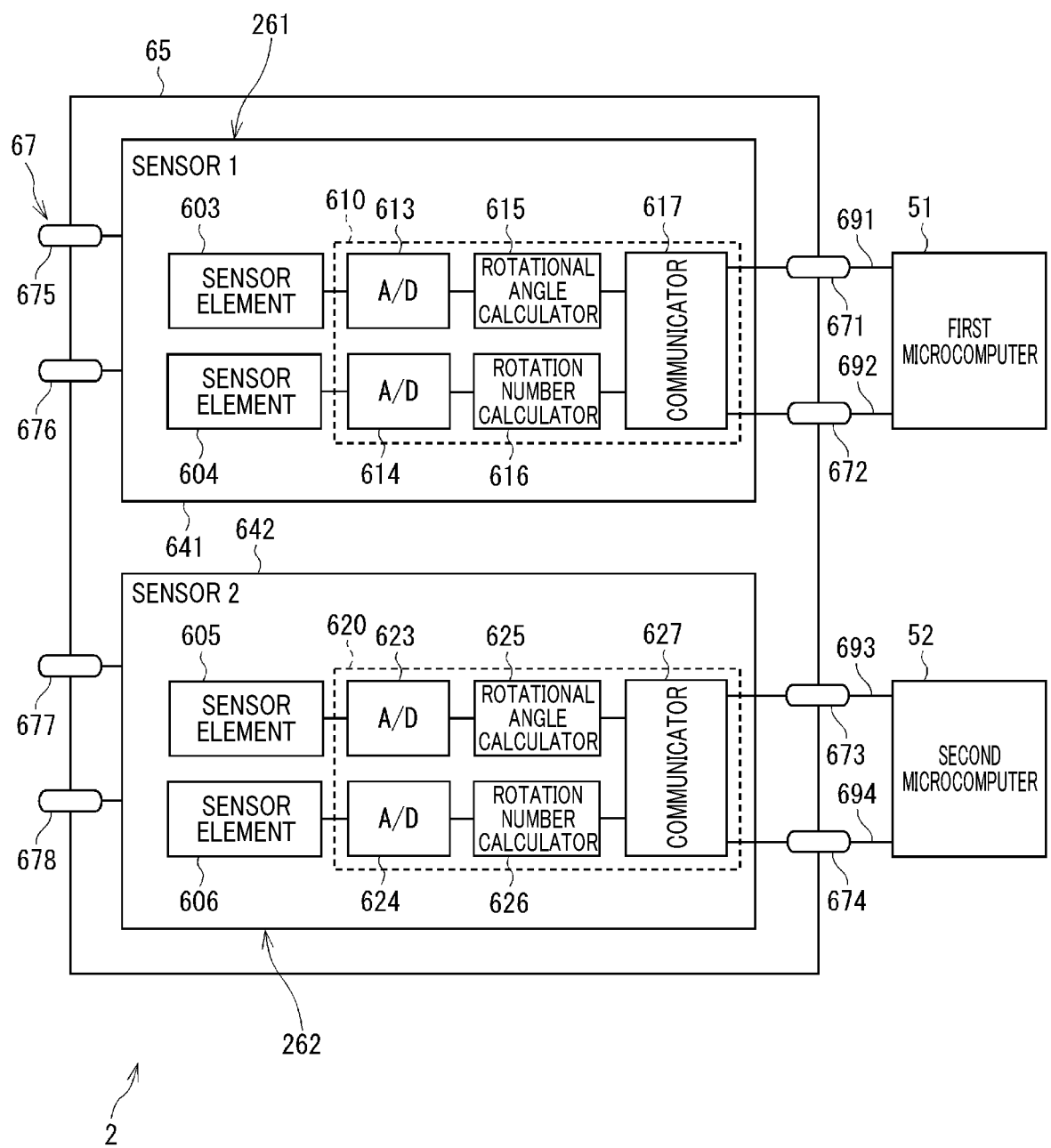
FIG. 12 is a block diagram schematically illustrating a rotation detecting apparatus according to the second embodiment of the present disclosure.

The following describes the second embodiment of the present disclosure with reference to FIGS. 12 and 13. The second embodiment includes a rotation detecting apparatus 2 that differs from the rotation detecting apparatus 1 according to the first embodiment in the following points. So, the following mainly describes the different points, and omits or simplifies descriptions of like parts between the first and second embodiments.

Referring to FIG. 12, the rotation detecting apparatus 2 includes a first sensor 261 and a second sensor 262.

The first sensor 261 includes a sensor element 603 for measuring the rotational angle of the motor unit 10, a sensor element 604 for measuring the rotation number of the motor unit 10, and the circuit module 610. The sensor elements 603 and 604 and the circuit module 610 are integrated in the single chip 641.

The second sensor 262 includes a sensor element 605 for measuring the rotational angle of the motor unit 10, a sensor element 606 for measuring the rotation number of the motor unit 10, and the circuit module 620. The sensor elements 605 and 606 and the circuit module 620 are integrated in the single chip 642. Similar to the third to sixth embodiments described later, the first and second chips 641 and 642 are installed in the single sensor package 65.

Each of the sensor elements 603 to 606 is a magnetic measurement device, such as a Hall device, designed to measure magnetic change, i.e. magnetic flux change, caused by rotation of the magnet 16.

The A/D converter 613 converts a measurement value of the sensor element 603 into a digital measurement value, thus outputting it to the rotational angle calculator 615. The A/D converter 614 converts the measurement value of the sensor element 604 into a digital measurement value, thus outputting it to the rotation number calculator 616.

Similarly, the A/D converter 623 of the second sensor 262 converts a measurement value of the sensor element 605 into a digital measurement value, thus outputting it to the rotational angle calculator 625. The A/D converter 624 converts the measurement value of the sensor element 606 into a digital measurement value, thus outputting it to the rotation number calculator 616.

Communications between the first sensor 261 and the first microcomputer 51 are carried out in the same manner as the communications between the first sensor 61 and the first microcomputer 51 according to the first embodiment. Communications between the second sensor 262 and the second microcomputer 52 are carried out in the same manner as the communications between the second sensor 62 and the second microcomputer 52 according to the first embodiment.

That is, the sensor elements 603 and 605 for detecting the rotational angle θm and the sensor elements 604 and 606 for detecting the rotation number TC are separately provided. This enables a sensor element suitable for measuring the rotational angle θm and a sensor element suitable for measuring the rotation number TC to be selected. For example, a sensor element, which has higher measurement accuracy, can be used as each of the sensor elements 603 and 605 for measuring the rotational angle θm. In contrast, a sensor element, which requires less electrical power, can be used as each of the sensor elements 604 and 606 for measuring the rotation number TC.

Figure 13A:
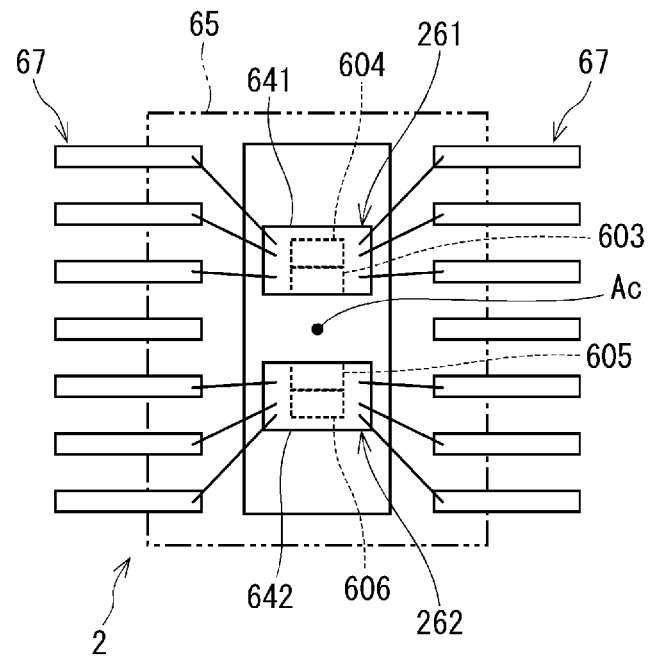
FIG. 13A is a plan view schematically illustrating an example of the internal structure of the rotation detecting apparatus according to the second embodiment of the present disclosure.
Figure 13B:
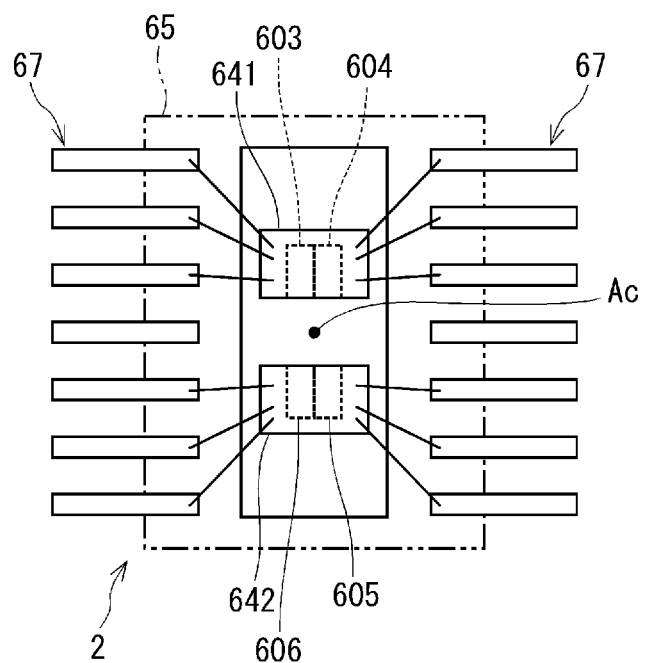
FIG. 13B is a plan view schematically illustrating another example of the internal structure of the rotation detecting apparatus according to the second embodiment of the present disclosure.

Each of FIGS. 13A and 13B illustrates an example of how the sensor elements 603 to 606 are arranged in the package 65.

Referring to FIGS. 13A and 13B, the sensor elements 603 and 605 are arranged to be symmetric with respect to the rotation center line Ac. Similarly, the sensor elements 604 and 606 are arranged to be symmetric with respect to the rotation center line Ac.

Specifically, as illustrated in FIG. 13A, the sensor element 603 is disposed to be closer to the rotation center line Ac than the sensor element 604. That is, the sensor element 603 is disposed on the inner side of the chip 641 and the sensor element 604 is disposed on the outer side of the chip 641 with respect to the rotation center line Ac. Similarly, as illustrated in FIG. 13A, the sensor element 605 is disposed to be closer to the rotation center line Ac than the sensor element 606. That is, the sensor element 605 is disposed on the inner side of the chip 642 and the sensor element 606 is disposed on the outer side of the chip 642 with respect to the rotation center line Ac.

That is, the sensor elements 603 and 605 for measuring the rotational angle θm, which require higher measurement accuracy, are disposed to be closer to the rotation center line Ac, resulting in reduction of measurement errors. In contrast, the sensor elements 604 and 606 for measuring the rotation number TC, whose measurement accuracy is not so much high as the sensor elements 603 and 605, are disposed to be farther to the rotation center line Ac.

In addition, as illustrated in FIG. 13B, the sensor elements 603 and 604 can be disposed in parallel to the lateral width direction of the lead frame 66 to face the rotation center line Ac in the chip 641. Similarly, the sensor elements 605 and 606 can be disposed in parallel to the lateral width direction of the lead frame 66 to face the rotation center line Ac in the chip 642. This results in the sensor elements 603 and 605 for measuring the rotational angle θm being arranged to be symmetric with respect to the rotation center line Ac, and the sensor elements 604 and 604 for measuring the rotation number TC being arranged to be symmetric with respect to the rotation center line Ac.

Similar to the first embodiment, the rotational angle calculator 615 calculates the rotational angle θm based on a measurement value measured by the sensor element 603. The rotation number calculator 616 calculates the rotation number TC based on a measurement value measured by the sensor element 606. In other words, the rotational angle θm and the rotation number TC are calculated based on the measurement values respectively measured by the different sensor elements. This enables the second embodiment to achieve the same advantageous effects as those achieved by the first embodiment.

Third Embodiment

Figure 14:
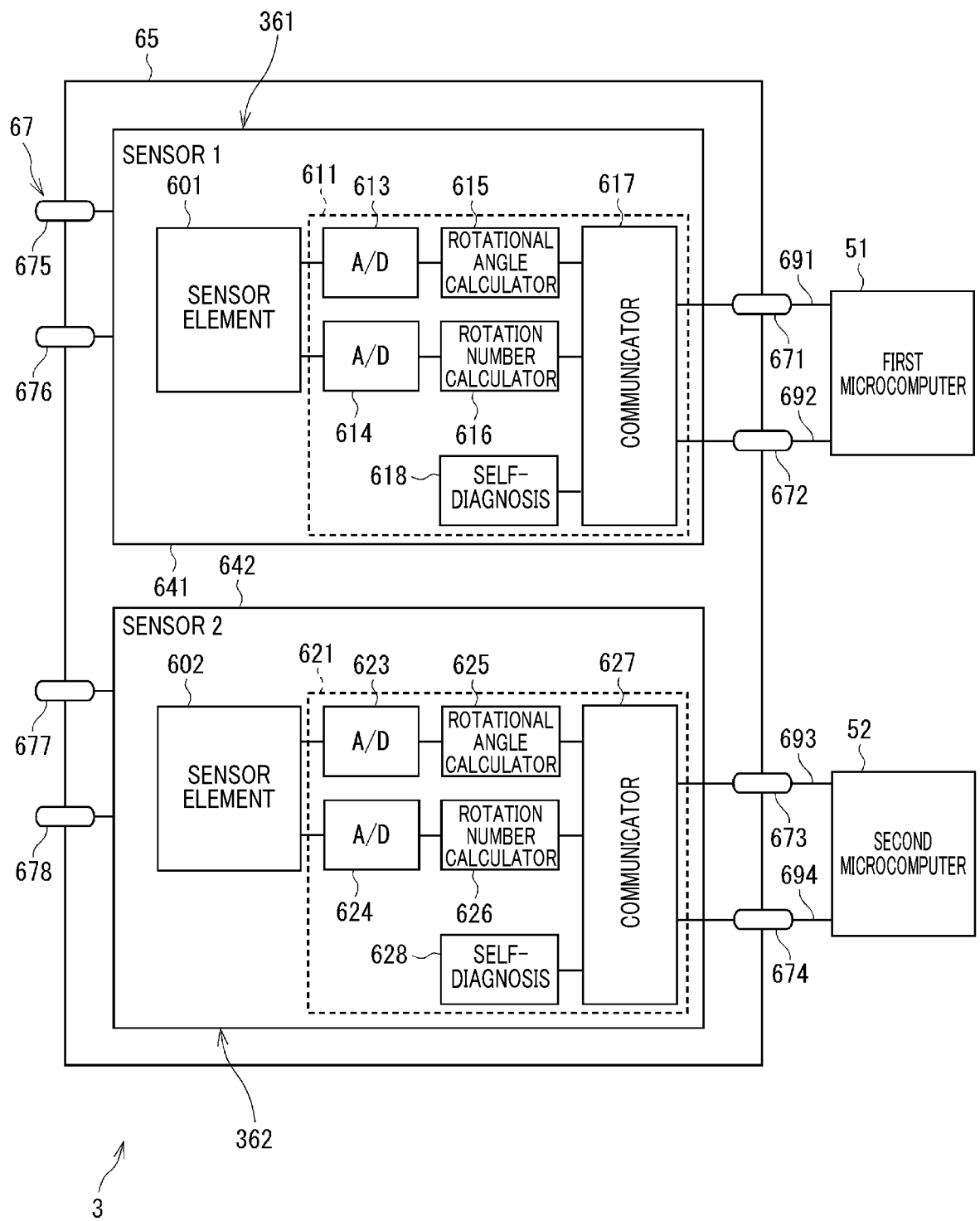
FIG. 14 is a block diagram schematically illustrating a rotation detecting apparatus according to the third embodiment of the present disclosure.
Figure 15:
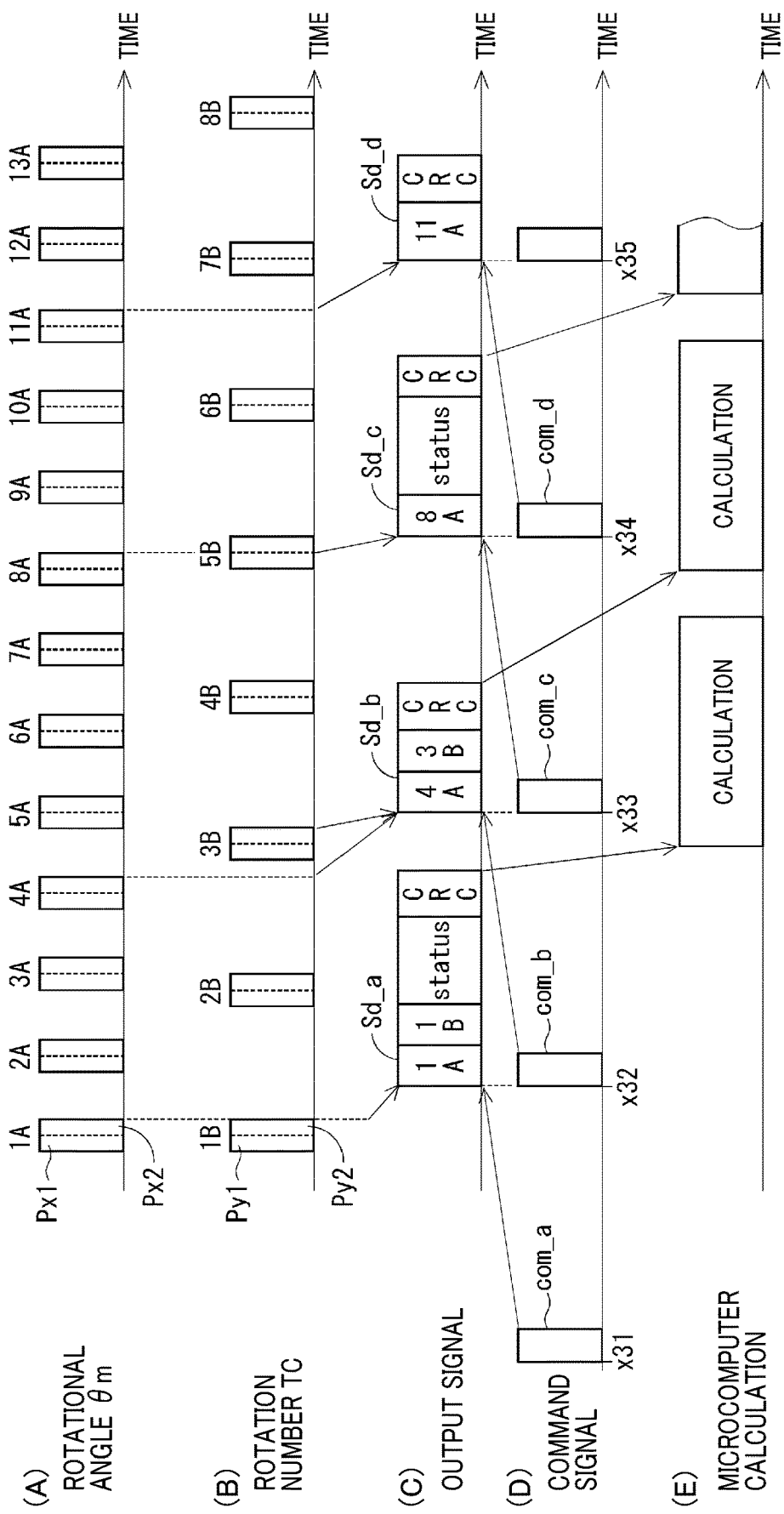
FIG. 15 is a timing chart schematically illustrating how a sensor and a corresponding microcomputer communicate with each other.

The following describes the third embodiment of the present disclosure with reference to FIGS. 14 and 15.

Referring to FIG. 14, a rotation detecting apparatus 3 includes a first sensor 361 and a second sensor 362.

The first sensor 361 includes a circuit module 611. The circuit module 611 includes a self-diagnostic unit 618 in addition to the components of the circuit module 610 of the first embodiment. The second sensor 362 includes a circuit module 621. The circuit module 621 includes a self-diagnostic unit 628 in addition to the components of the circuit module 620 of the first embodiment. The sensor element 601 and the circuit module 611 are integrated in the single chip 641, and the sensor element 602 and the circuit module 621 are integrated in the single chip 642. Similar to the second embodiment, different sensor elements for respectively measuring the rotational angle θm and the rotation number TC can be used.

The self-diagnostic unit 618 is configured to diagnose whether there is a malfunction in the first sensor 361. Specifically, the self-diagnostic unit 618 is configured to monitor whether there is a power failure including a power supply fault and a ground fault in each of the sensor element 601, the A/D converters 613 and 614, the rotational angle calculator 615, and the rotation number calculator 616. Similarly, the self-diagnostic unit 628 is configured to diagnose whether there is a malfunction in the second sensor 362. Specifically, the self-diagnostic unit 628 is configured to monitor whether there is a power failure including power supply fault and ground fault in each of the sensor element 602, the A/D converters 623 and 624, the rotational angle calculator 625, and the rotation number calculator 626.

Each of the self-diagnostic units 618 and 628 is configured to include, as a status signal, the self-diagnostic result in the corresponding output signal, and output the output signal to the corresponding one of the first and second microcomputers 51 and 52. The status signal according to the first embodiment corresponds to a malfunction signal.

FIGS. 15A to 15E, which correspond to respective FIGS. 11A to 11E, illustrate how the first sensor 361 communicates with the first microcomputer 51. Because communication timings illustrated in FIGS. 15A to 15E are substantially identical to the communication timings illustrated in FIGS. 11A to 11E, the following describes how the first sensor 361 changes the output signal that should be transmitted therefrom in response to a command signal sent from the first microcomputer 51.

Similar to the first embodiment, the following describes only how the first sensor 361 communicates with the first microcomputer 51, and eliminates how the second sensor 362 communicates with the second microcomputer 52. This is because how the second sensor 362 communicates with the second microcomputer 52 is substantially identical to how the first sensor 361 communicates with the first microcomputer 51.

The first sensor 361 according to the first embodiment is configured to change the types of information included in the output signal depending on the type of the command signal sent from the first microcomputer 51.

When the first microcomputer 51 sends a command signal com_a at time x31, the communicator 617 transmits, to the first microcomputer 51, an output signal Sd_a at time x32 that is the receiving timing of a next command signal S_b; the output signal Sd_a includes information corresponding to the command signal com_a, i.e., the rotational angle signal, the rotation number signal, the status signal, and the CRC signal. Note that the command signal sent at the output timing of the output signal Sd_a can indicate output of any type of signals.

When the first microcomputer 51 sends a command signal com_b at the time x32, the communicator 617 transmits, at time x33 that is the receiving timing of a next command signal, the output signal Sd_b corresponding to the command signal com_b to the first microcomputer 51; the output signal Sd_b includes the rotational angle signal, the rotation number signal, and the CRC signal without including the status signal.

When the first microcomputer 51 sends a command signal com_c at the time x33, the communicator 617 transmits, at time x34 that is the receiving timing of a next command signal, the output signal Sd_c corresponding to the command signal com_c to the first microcomputer 51; the output signal Sd_c includes the rotational angle signal, the status signal, and the CRC signal without including the rotation number signal and the status signal.

When the first microcomputer 51 sends a command signal com_d at the time x34, the communicator 617 transmits, at time x35 that is the receiving timing of a next command signal, the output signal Sd_d corresponding to the command signal com_d to the first microcomputer 51; the output signal Sd_d includes the rotational angle signal and the CRC signal without including the rotation number signal and the status signal.

FIGS. 15A to 15E illustrates an example that the command signals com_a, com_b, com_c, and com_d are sent from the first microcomputer 51 in this order, and the output signals Sd_a, Sd_b, Sd_c, and Sd_d are sent from the first sensor 361 in this order. The order of transmitting the command signals com_a, com_b, com_c, and com_d can be changed, so that the corresponding order of the output signals Sd_a, Sd_b, Sd_c, and Sd_d can also be changed.

The first microcomputer 51 can be configured to (1) Send the command signals com_a, com_b, and com_c in each of the rotation-number transmission periods and in each of the status-signal transmission periods to thereby obtain the rotation number signal for each of the rotation-number transmission periods and obtain the status signa for each of the status-signal transmission periods (2) Respectively send the command signals com_d at other timings The rotation-number transmission period and the status-signal transmission period can be set to be identical to each other or different from each other. The first microcomputer 51 cannot use the command signals com_b and com_c if the rotation-number transmission period and the status-signal transmission period are set to be identical to each other.

The first microcomputer 51 can be configured to send any one of the command signals com_a, com_b, and com_c in place of the command signal com_d non-periodically each time the first microcomputer 51 requires the obtaining of the rotation number TC or the self-diagnostic result in the first sensor 361.

Upon obtaining the output signal, the first microcomputer 51 performs a calculation task defined based on the obtained output signal. FIG. 15E illustrates the periods required to perform the calculation tasks are set to be equal to each other, but can be set to be different from each other.

The third embodiment has described an example where the self-diagnostic unit 618 is provided, but it is possible to change the types of signals included in the output signal depending on the type of the command signal.

Specifically, the first sensor 61, which does not include the self-diagnostic unit 618, is configured to transmit the output signal Sd_b including the rotational angle signal and the rotation number signal in response to the command signal com_b, and transmit the output signal Sd_d including the rotational angle signal in response to the command signal com_d.

This enables each of the communicators 617 and 627 to transmit an output signal that satisfies a request from a corresponding one of the first and second microcomputers 51 and 52. The third embodiment is also provided with the self-diagnostic units 618 and 628. Each of the self-diagnostic units 618 and 628 is configured to output, to a corresponding one of the first and second microcomputers 51 and 52, the malfunction diagnostic result. This configuration enables the first microcomputer 51 to prevent calculation based on the output signal if the output signal includes an abnormal self-diagnostic result Fourth Embodiment The following describes the fourth embodiment of the present disclosure with reference to FIG. 16.

Figure 16:
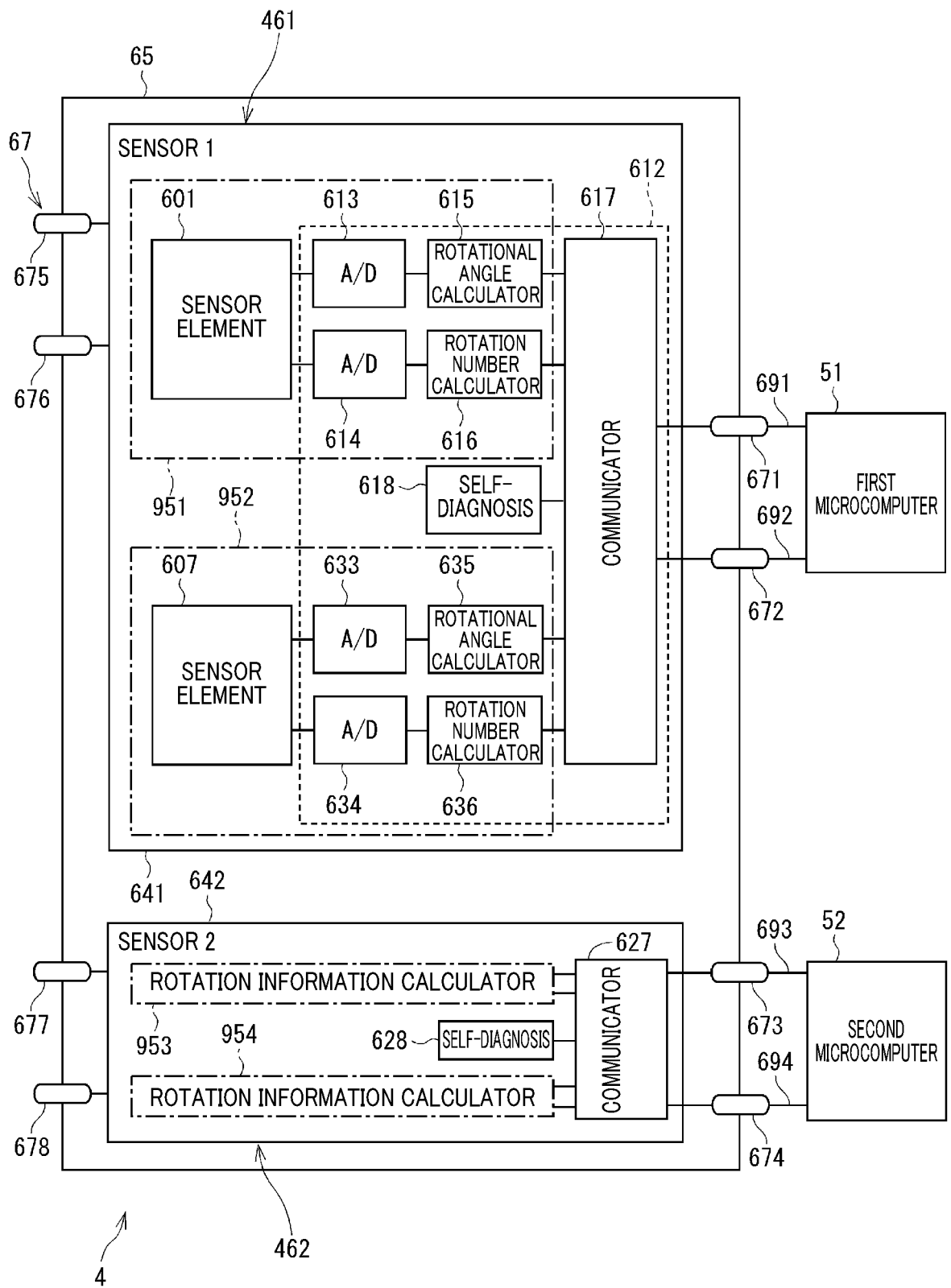
FIG. 16 is a block diagram schematically illustrating a rotation detecting apparatus according to the fourth embodiment of the present disclosure.

Referring to FIG. 16, a rotation detecting apparatus 4 includes a first sensor 461 and a second sensor 462. The sensor element 601, the sensor element 607, and the circuit module 612 are installed to the single chip 641. Like the first sensor 461, the two sensor elements and the circuit module are installed to the single chip 642.

The circuit module 612 of the first sensor 461 includes the sensor element 607, A/D converters 633 and 634, a rotational angle calculator 635, and a rotation number calculator 636 in addition to the components of the circuit module 611 of the third embodiment.

The sensor element 601, the A/D converters 613 and 614, the rotational angle calculator 615, and the rotation number calculator 616 constitute a rotation information calculator 951. The sensor element 607, the A/D converters 633 and 634, the rotational angle calculator 635, and the rotation number calculator 636 constitute a rotation information calculator 952.

That is, the first sensor 461 includes a pair of the rotation information calculator 951 and the rotation information calculator 952.

Similarly, the second sensor 462 includes a pair of a rotation information calculator 953 and a rotation information calculator 954. In contrast, each of the first and second sensors 61 and 62 according to, for example, the first embodiment includes a single rotation information calculator.

The self-diagnostic unit 618 is configured to (1) Detect, in addition to power failures including power supply faults and ground faults (2) Compare first calculation results, i.e. first calculated values, obtained by the rotation information calculator 951 with the corresponding second calculation results, i.e. the second calculated values, obtained by the rotation information calculator 952 to thereby determine whether there is an internal fault in the first sensor 461. Such an internal fault represents a fault occurred although each of the first and second calculation results is within a normal range. For example, an offset fault, which represents the difference between each of the first calculated values and a corresponding one of the second calculated values exceeds a predetermined range, is a typical example of such an internal fault.

The self-diagnostic unit 618 is configured to include, in the output signal, an internal fault as the status signal, and thereafter transmit the output signal to the first microcomputer 51.

Note that, in place of the comparison between the first and second calculated values obtained by the respective rotation information calculators 951 and 952, the rotational angle signal and the rotation number signal obtained by each of the rotation information calculators 951 and 952 can be transmitted to the first microcomputer 1, Then, the first microcomputer 51 can be configured to compare the first calculated values obtained by the rotation information calculator 951 with the corresponding calculated values obtained by the rotation information calculator 952 to thereby determine whether there is an internal fault in the first sensor 461.

Similar to the second embodiment, a sensor element for detecting the rotational angle θm of the motor unit 10 and a sensor element for detecting the rotation number TC of the motor unit 10 can be separately provided. In this modification, the number of sensor elements in each of the first and second sensors 461 and 462 becomes four, resulting in eight sensor elements being provided in the rotation detecting apparatus 4.

As described above, the rotation detecting apparatus 4 includes the rotation information calculators 951 and 952 for the single communicator 617. This enables an internal fault, such as an offset fault, to be detected.

The fourth embodiment also achieves the same advantageous effects as those achieved by the first embodiment.

Fifth Embodiment

Figure 17:
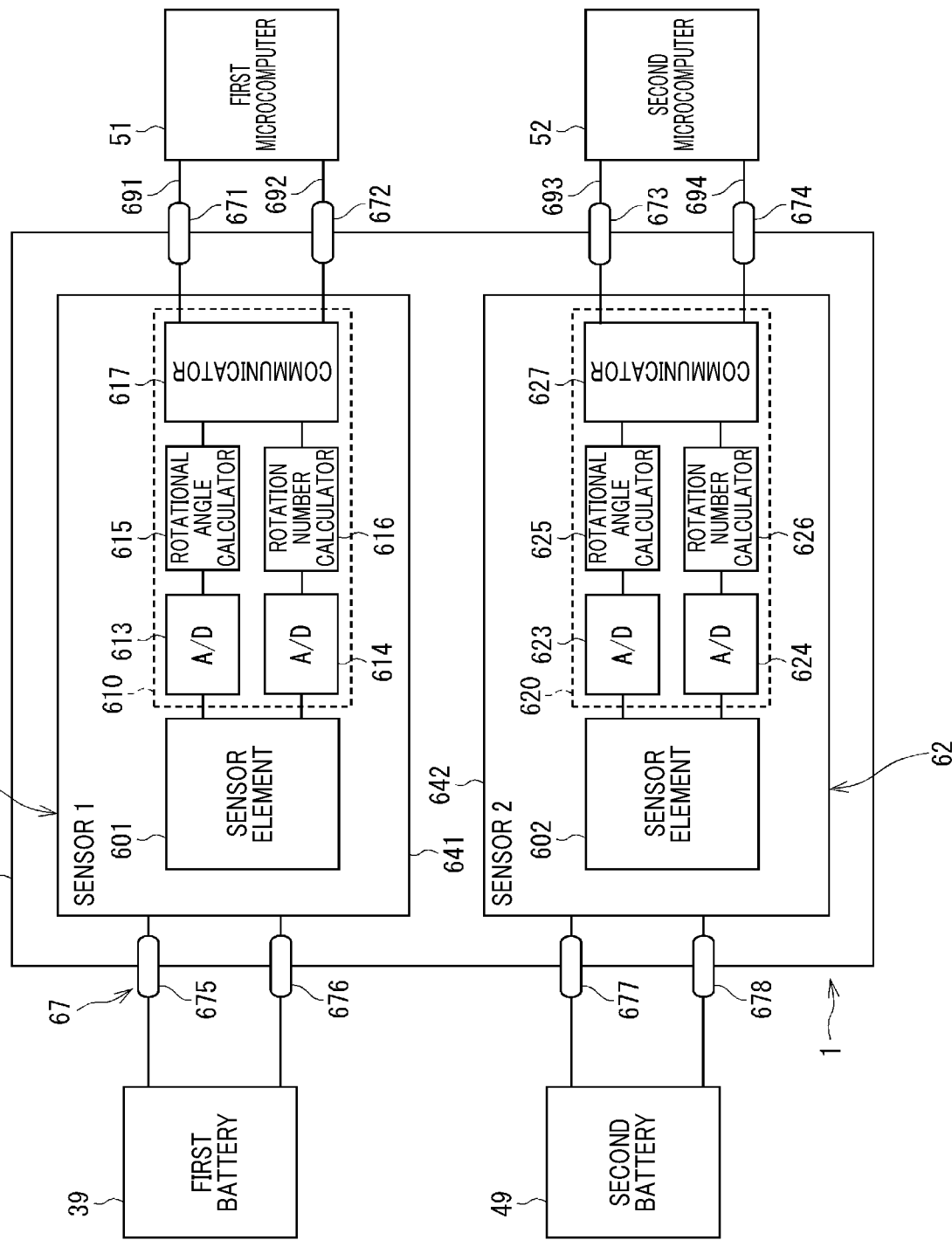
FIG. 17 is a block diagram schematically illustrating a rotation detecting apparatus according to the fifth embodiment of the present disclosure.
Figure 18:
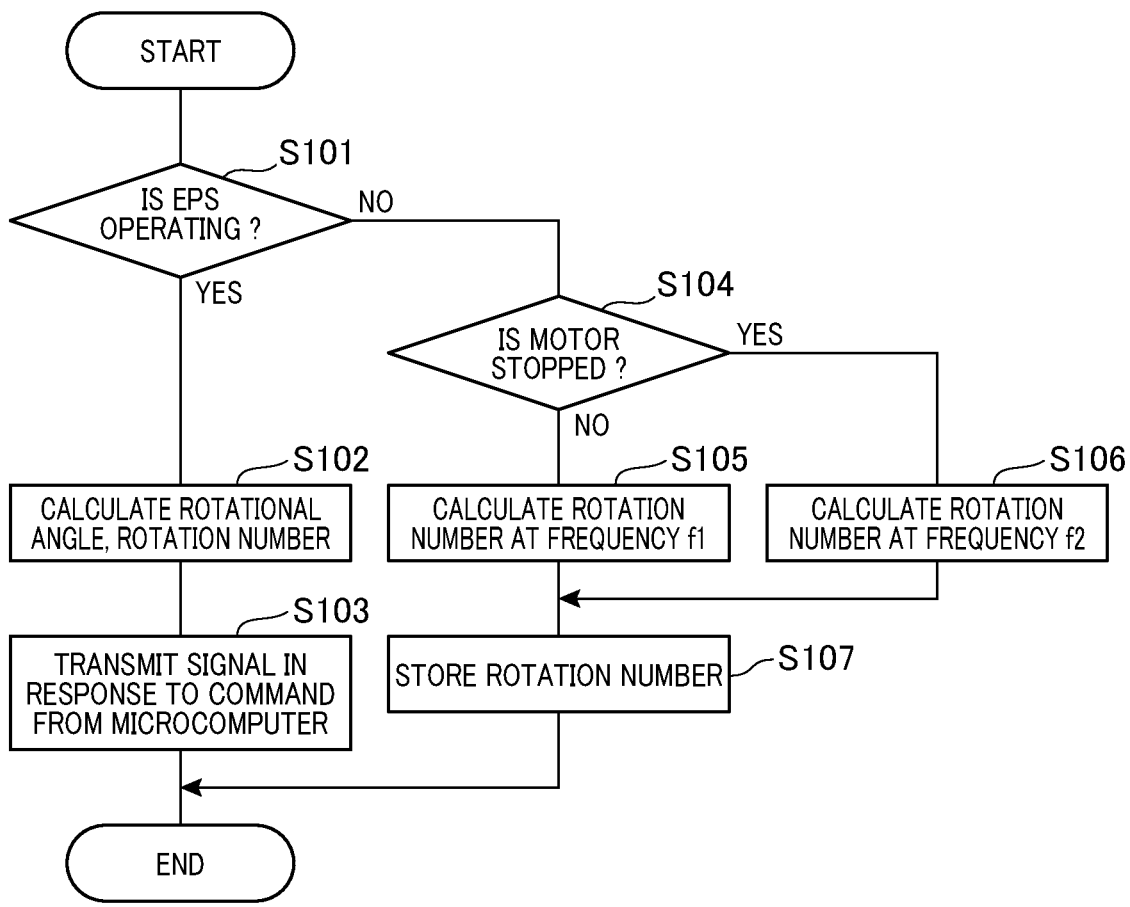
FIG. 18 is a flowchart schematically illustrating a rotational information calculating task according to the fifth embodiment of the present disclosure.

The following describes the fifth embodiment of the present disclosure with reference to FIGS. 17 and 18.

The electronic power steering apparatus 108 is shut down while a starting switch, that is, an ignition switch, is off. This results in power not being supplied to the first and second microcomputers 51 and 52, so that the first and second microcomputers 51 and 52 perform no calculations or communication with other devices.

The rotation detecting apparatus 1 according to the fifth embodiment is configured such that the first and second batteries 39 and 49 directly supply electrical power thereto even if the electronic power steering apparatus 108 is shut down.

Specifically, the first battery 39 is configured to directly supply electrical power to the first sensor 61, and the second battery 49 is configured to directly supply electrical power to the second sensor 62 while the electronic power steering apparatus 108 is deactivated.

This enables the rotation detecting apparatus 1 to continuously perform the above calculations even if the electronic power steering apparatus 108 is stopped.

The following describes, for example, how the first microcomputer 51 calculates the steering angle θs.

As described above, the steering angle θs is calculated as a function of the rotational angle θm, the rotation number TC, and the gear ratio of the deceleration gear mechanism 109. While the electronic power steering apparatus 108 is deactivated, driver's operation of the steering wheel 101 causes the steering shaft 102 to turn, so that the motor unit 10 is rotated via the deceleration gear mechanism 109. At that time, if the rotation number TC were not counted, the steering angle θs could not be calculated until relearning of the neutral position of the steering wheel 101 is completed. Note that calculation of the steering angle θs requires information about the rotational position of the motor unit 10 that corresponds to the rotational angle θm based on the number of rotation of the motor unit 10, so that calculation of the steering angle θs requires an instantaneous value of the rotational angle θm at the restarting of the electronic power steering apparatus 108. For this reason, it is unnecessary to continuously calculate the rotational angle θm while the electronic power steering apparatus 108 is deactivated.

In view of these circumstances, the rotation detecting apparatus 1 according to the fifth embodiment is configured such that the first and second batteries 39 and 49 directly supply electrical power to the rotation detecting apparatus. This enables the rotation detecting apparatus 1 to continuously perform at least calculation of the rotation number TC while the electronic power steering apparatus 108 is deactivated. Note that the fifth embodiment can also be configured such that the rotation detecting apparatus 1 can continuously perform calculation of the rotational angle θm of the motor unit 10 while the electronic power steering apparatus 108 is deactivated. Preferably, the rotation detecting apparatus 1 is configured not to continuously perform calculation of the rotational angle θm while the electronic power steering apparatus 108 is deactivated in view of power consumption.

Note that the rotation detecting apparatus 1 stores the counted rotation number TC therein without communications with the first and second microcomputers 51 and 52, because the first and second microcomputers 51 and 52 are deactivated. Then, after restarting of the electronic power steering apparatus 108, the rotation detecting apparatus 1 sends, to each of the first and second microcomputers 51 and 52, the output signal including the rotational angle signal and the counted rotation number TC stored therein in response to the command signal transmitted from the corresponding microcomputer. This enables each of the first and second microcomputers 51 and 52 to properly calculate the steering angle θs of the steering wheel 101 at the restarting of the electronic power steering apparatus 108 without performing relearning of the neutral position of the steering wheel 101.

Note that FIG. 17 describes the fifth embodiment based on the rotation detecting apparatus 1 according to the first embodiment as an example, but can describe it based on any one of the rotation detecting apparatuses 2 to 4 according to the second to fourth embodiments. This can be applied to the following sixth embodiment.

The following describes in detail the rotational information calculating task according to the fifth embodiment with reference to the flowchart of FIG. 18. Although the following describes only the rotational information calculating task carried out by the first sensor 61, the same rotational information calculating task can be carried out by the second sensor 62.

In the first step S101, the first sensor 61 determines whether the electronic power steering apparatus 108 is operating. In FIG. 18, the electronic power steering apparatus is abbreviated as "EPS". For example, it is possible to determine that the electronic power steering apparatus 108 is not operating when no clock signals and/or command signals have been sent thereto from the first microcomputer 51 for a predetermined period.

When it is determined that the electronic power steering apparatus 108 is not operating (NO in step S101), the rotational information calculating task proceeds to step S104. Otherwise, when it is determined that the electronic power steering apparatus 108 is operating (YES in step S101), the rotational information calculating task proceeds to step S102.

In step S102, the first sensor 61 calculates the rotational angle θm and the rotation number TC.

In step S103, the circuit module 610 outputs, to the first microcomputer 51, the output signal in response to the command signal sent from the first microcomputer 51. This results in the first microcomputer 51 calculating, for example, the rotational angle θm and the steering angle θs based on the signals included in the output signal.

Otherwise, upon determining that the electronic power steering apparatus 108 is not operating (NO in step S101), the first sensor 61 determines whether the motor unit 10 is stopped in step S104. For example, it is possible to determine that the motor unit 10 is stopped when, for example, the rotational speed of the motor unit 10 is lower than a predetermined threshold. It is also possible to determine that the motor unit 10 is stopped when the rotational angle θm is not calculated. It is further possible to determine that the motor unit 10 is stopped when the amount of change of values output from the A/D converter 614, such as the deviation between the current measured value and the immediately previous measured value or the differential value of the deviation, is lower than a predetermined threshold. In addition, if it is configured to increment a counted value indicative of the number of rotations of the motor unit 10 each time the motor unit 10 turns one of the three or more divided rotational angular ranges, it is possible to determine that the motor unit 10 is stopped when the same counted value is continued for a predetermined period.

When it is determined that the motor unit 10 is operating (NO in step S104), the rotational information calculating task proceeds to step S105. Otherwise, when it is determined that the motor unit 10 is stopped (YES in step S104), the rotational information calculating task proceeds to step S106.

In step S105, the rotation number calculator 616 calculates the rotation number TC at a first frequency f1. The first frequency f1 can be set to prevent skipping of detection of the motor's rotation.

In step S106, the rotation number calculator 616 calculates the rotation number TC at a second frequency f2 lower than the first frequency f1, which is expressed as f1>f2. Because the rotation number TC is unchanged while the motor unit 10 is stopped, lower frequency of calculating the rotation number TC while the motor unit 10 is stopped to, for example, intermittently calculate the rotation number Tc enables power consumption to be reduced.

Setting the calculation frequency to be equal to or higher than the first frequency f1 while the electronic power steering apparatus 108 is operating prevents skipping of detecting rotation of the motor unit 10. While the electronic power steering apparatus 108 is operating, the first microcomputer 51 is capable of calculating, based on the rotational angle θm, the rotation number TC, because the rotational angle θm is sent to the first microcomputer 51. This enables the calculation frequency of the rotation number TC while the electronic power steering apparatus 108 is operating to be set to be lower than the first frequency f1.

Following the operation in step S105 or S106, the first sensor 61 stores the rotation number TC therein in step S107. Note that the first sensor 61 can store a newest value of the rotation number TC each time the newest value of the rotation number TC is calculated without storing all the already calculated values of the rotation number TC.

The first sensor 61 sends, to first microcomputer 51, the rotation number signal including the rotation number TC stored therein and the rotational signal including the rotational angle θm when the electronic power steering apparatus 108 is restarted.

The fifth embodiment is configured to change the frequency of updating, i.e. calculating, the rotation number TC by each of the rotation number calculators 616 and 626 in accordance with whether the motor unit 10 is operating. Specifically, the fifth embodiment is configured to reduce the frequency of updating the rotation number TC while the motor unit 10 is stopped as compared with the frequency of updating the rotation number TC while the electronic power steering apparatus 108 is deactivated.

The fifth embodiment is configured such that the first battery 39 directly supplies electrical power to the sensor elements 601 and 602 and the circuit modules 610 and 620 while the electronic power steering apparatus 108 including the motor unit 10 is deactivated. This continuously supplies electrical power to the rotation detecting apparatus while the electronic power steering apparatus 108 is deactivated, making it possible to continuously perform calculation of the rotation number TC while the electronic power steering apparatus 108 is deactivated. This enables the steering angle θs at the restarting of the electronic power steering apparatus 108 to be reliably calculated without performing relearning of the neutral position of the steering wheel 101.

In addition to the specific advantageous effect, the fifth embodiment achieves the same advantageous effects as those achieved by the first embodiment.

Sixth Embodiment

Figure 19:
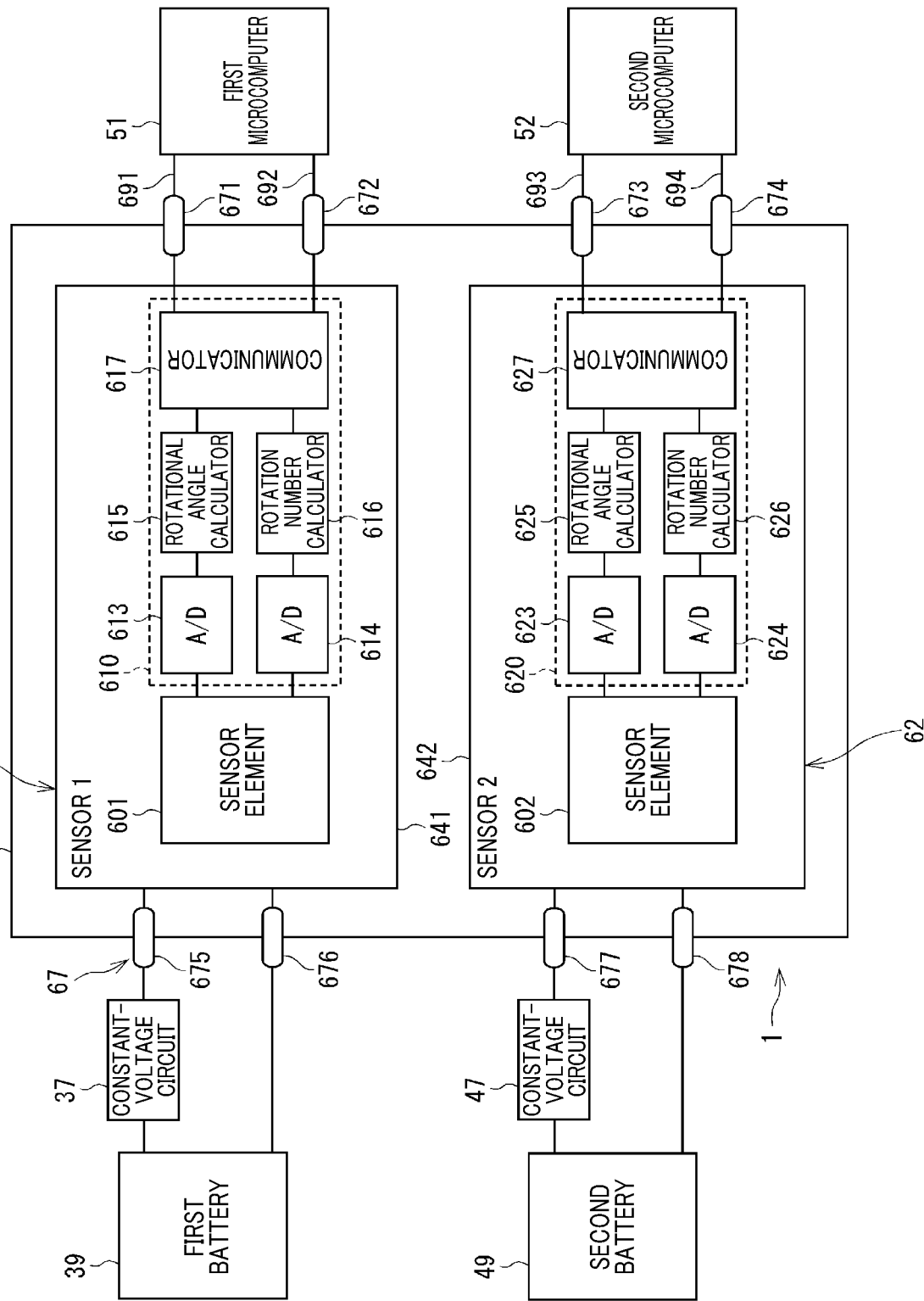
FIG. 19 is a block diagram schematically illustrating a rotation detecting apparatus according to the sixth embodiment of the present disclosure.

The following describes the sixth embodiment of the present disclosure with reference to FIG. 19.

The sixth embodiment is configured as a modification of the fifth embodiment. A constant-voltage circuit 37 is mounted on a power supply path extending from the first battery 39 to the first sensor 61. A constant-voltage circuit 47 is also mounted on a power supply path extending from the second battery 39 to the second sensor 62. If one of the first and second batteries 39 and 49 is configured to supply electrical power to the first and second sensors 61 and 62, a common constant-voltage regulator can be provided or constant-voltage regulators can be provided for the respective first and second sensors 61 and 62.

Each of the constant-voltage circuits 37 and 47 is comprised of, for example, a regulator having small power consumption, such as the order of several mA, which can drive the rotation detecting apparatus 1. That is, each of the constant-voltage circuits 37 and 47 is provided separately from the regulators of the first and second integrated circuits 56 and 57, and is capable of supplying electrical power to the sensor package 65 even if the drive apparatus 8 is deactivated.

Mounting the constant-voltage circuit 37 between the first battery 39 and the rotation detecting apparatus 1 and the constant-voltage circuit 47 between the second battery 49 and the rotation detecting apparatus 1 eliminates the need of changing a withstand voltage design of the rotation detecting apparatus 1 independently of the voltage of each of the first and second batteries 39 and 49.

The sixth embodiment also achieves the same advantageous effects as those achieved by the first embodiment.

Seventh Embodiment

The following describes the seventh embodiment of the present disclosure with reference to FIG. 20. Each of FIG. 20 is a schematic view corresponding to FIG. 8.

The rotation detecting apparatus 1 according to the first embodiment is configured such that the sensor element 601 and the circuit module 610 are integrated in the single chip 641, and the sensor element 602 and the circuit module 620 are integrated in the single chip 642.

In contrast, a rotation detecting apparatus 5 according to the seventh embodiment is configured such that (1) A chip 643 incorporating therein the circuit module 610 is a separate chip from a chip 644 incorporating therein the sensor element 601

(2) A chip 645 incorporating therein the circuit module 620 is a separate chip from a chip 646 incorporating therein the sensor element 602

The reference numerals of the sensor element and circuit included in each of the chips are omitted in FIG. 20.

In place of the circuit module 610, the circuit modules 611 and 612 can be used, and in place of the circuit module 620, the circuit modules 621 and 622 can be used. Like the second embodiment, two sensor elements can be used.

Figure 20A:
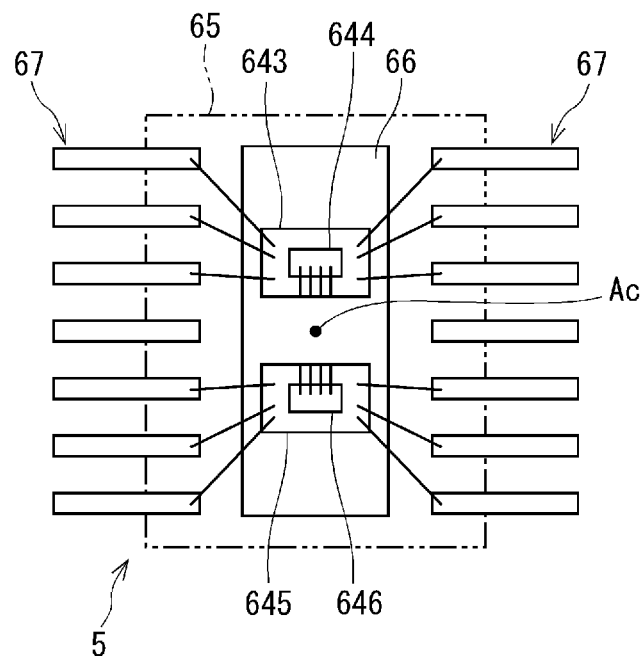
FIG. 20A is a plan view schematically illustrating an example of the internal structure of the rotation detecting apparatus according to the seventh embodiment of the present disclosure.

Referring to FIG. 20A, the chip 643, which includes the circuit module 610, is mounted on the lead frame 66, and the chip 644, which includes the sensor element 601, is mounted on an upper surface of the chip 643. The upper surface of the chip 643 is a surface opposite to the lead frame 66.

Similarly, the chip 645, which includes the circuit module 620, is mounted on the lead frame 66, and the chip 646, which includes the sensor element 602, is mounted on an upper surface of the chip 645.

Mounting each of the chips 644 and 646 including the corresponding sensor element on the corresponding one of the chips 643 and 645, which includes the corresponding circuit module, enables the mounting area on the lead frame 66 to be reduced, resulting in the rotation detecting apparatus 5 being downsized.

Figure 20B:
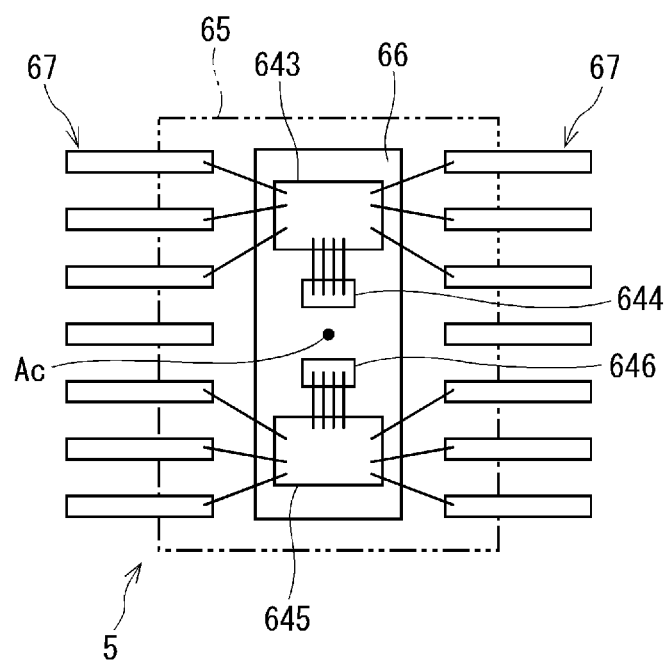
FIG. 20B is a plan view schematically illustrating another example of the internal structure of the rotation detecting apparatus according to the seventh embodiment of the present disclosure.

As another example, as illustrated in FIG. 20B, the chips 644 and 646, each of which includes the corresponding sensor element, are disposed to be closer to the rotation center line Ac than the chips 643 and 645, each of which includes the corresponding circuit module. In other words, the chips 644 and 646 are disposed on the inner side of the lead frame 66 with respect to the rotation center line Ac, and the chips 643 and 645 are disposed on the outer side on the lead frame 66 with respect to the rotation center line Ac. The chips 644 and 646 are also arranged to be symmetric with respect to the rotation center line Ac.

Note that the control configuration of the seventh embodiment can be combined with the control configuration of any one of the other embodiments.

In the seventh embodiment, the sensor element 601 is provided as a separate chip from the chip 643 including the circuit module 610, and the sensor element 602 is provided as a separate chip from the chip 645 including the circuit module 620. This enables magnetoresistive (MR) sensor elements, which cannot be integrated with the respective circuit modules 610 and 620, to be used as the respective sensor elements 601 and 602.

The sensor element 601 is mounted on the upper surface of the chip 643 incorporating therein the circuit module 610, and the sensor element 602 is mounted on the upper surface of the chip 645 incorporating therein the circuit module 620. Mounting the sensor elements 601 and 602 on the upper surfaces of the respective chips 643 and 645 enables the rotation detecting apparatus 1 to be downsized.

The sensor elements 601 and 602 are arranged to be closer to the rotation center line Ac of the motor unit 10 than the chips 643 and 645, each of which includes the corresponding circuit module. This enables the sensor elements 601 and 602 to be located to be closer to the rotation center line Ac, resulting in an increase of the measurement accuracy.

The seventh embodiment also achieves the same advantageous effects as those achieved by the first embodiment.

Eighth Embodiment

Figure 21:
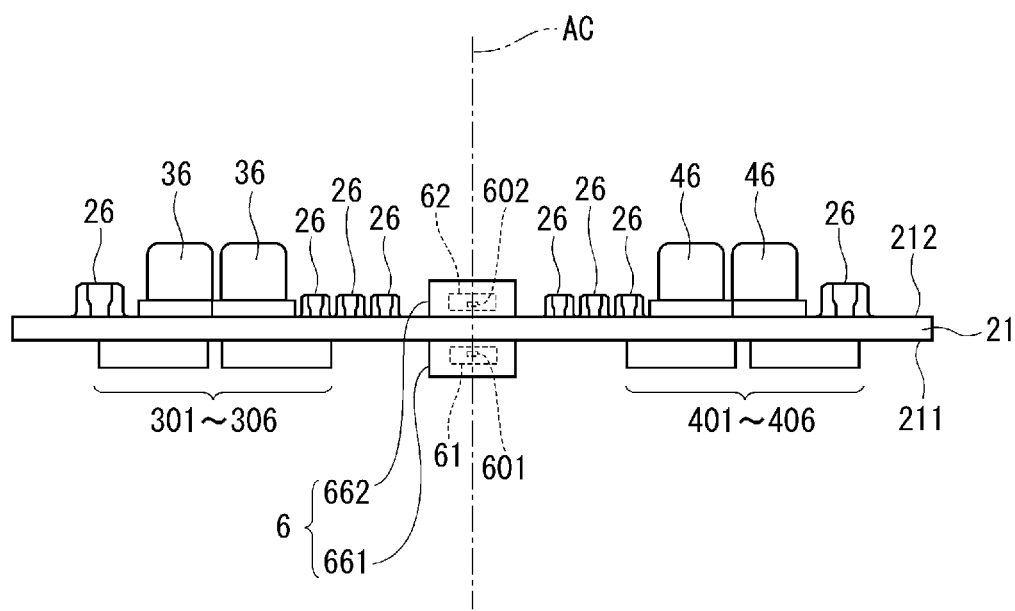
FIG. 21 is a side view of a first circuit board according to the eighth embodiment of the present disclosure.
Figure 22:
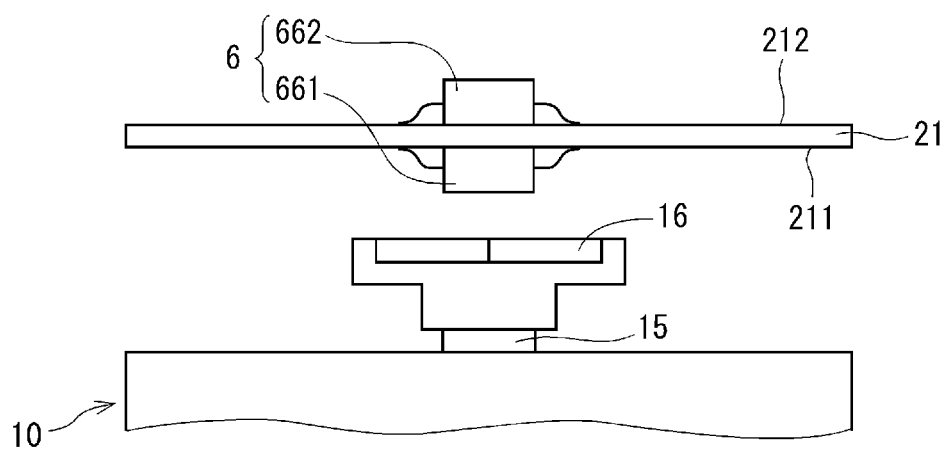
FIG. 22 is a side view illustrating a rotation detecting apparatus according to the eighth embodiment of the present disclosure.

The following describes the eleventh embodiment of the present disclosure with reference to FIGS. 21 to 23.

Each of the other embodiment described above is configured such that the corresponding two sensors are installed in the single package 65.

In contrast, a rotation detecting apparatus 6 according to the eighth embodiment is configured such that the first sensor 61 is installed in a first package 661, and the second sensor 62 is installed in a second package 662. Specifically, the first and second packages 661 and 662 are separately provided for the respective first and second sensors 61 and 62. For example, the configuration of each of the first and second sensors 61 and 62 can be identical to the corresponding sensor of the first embodiment or a selected one of the second to seventh embodiments.

Referring to FIGS. 21 and 22, the first package 661 is mounted on the first major surface 211 of the first circuit board 21, and the second package 662 is mounted on the second major surface 212 of the first circuit board 21. Mounting the first and second packages 661 and 662 as the respective first and second sensors 61 and 62 on the respective first and second major surfaces 211 and 212 of the first circuit board 21 enables the mounting areas required for the rotation detecting apparatus 6 in the first circuit board 21 to be reduced. The first and second packages 661 and 662 are arranged such that the sensor element 601 of the first sensor 61 and the sensor element 602 of the second sensor 62 are disposed on the rotation center line Ac, resulting in higher detection accuracy of rotation of the motor unit 10.

Figure 23A:
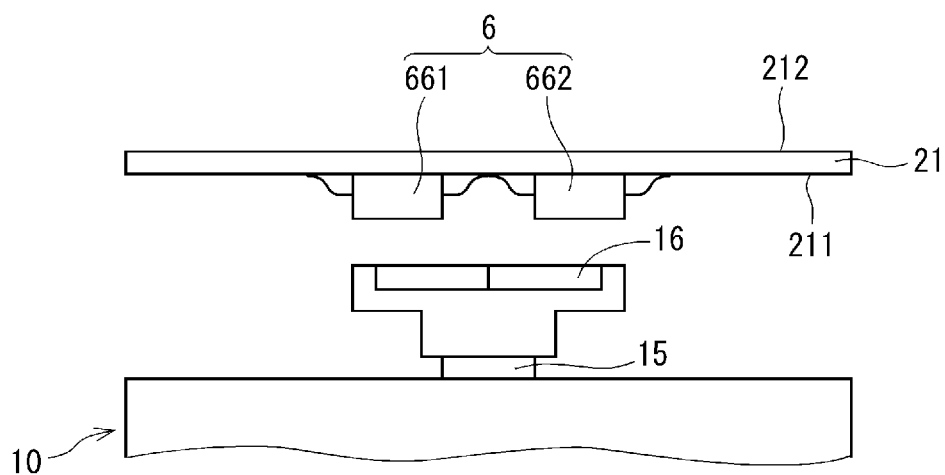
FIG. 23A is a side view illustrating an example of the rotation detecting apparatus according to the eighth embodiment of the present disclosure.
Figure 23B:
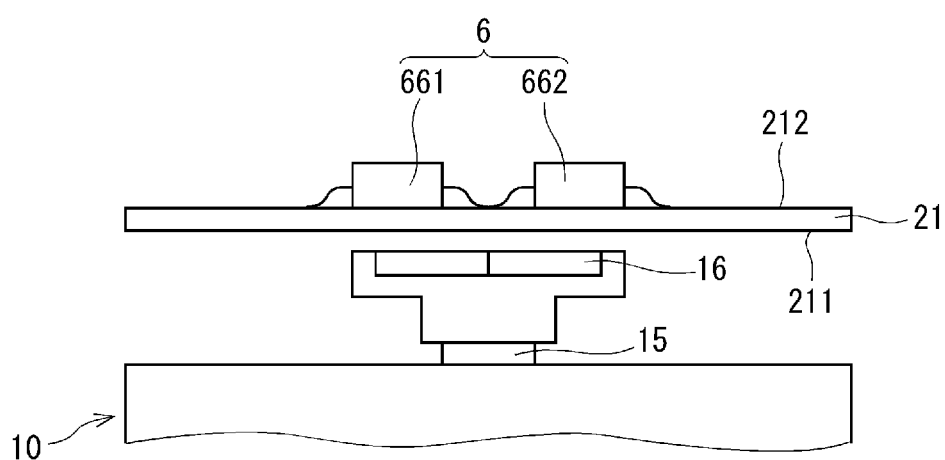
FIG. 23B is a side view illustrating another example of the rotation detecting apparatus according to the eighth embodiment of the present disclosure.

As another example, the first and second packages 661 and 662 are mounted on the first major surface 211 of the first circuit board 21 (see FIG. 23A). As a further example, the first and second packages 661 and 662 are mounted on the second major surface 212 of the first circuit board 21 (see FIG. 23B).

The package 661 according to the eighth embodiment is provided for the sensor element 601 and the circuit module 610 using the measurement values of the sensor element 601. Similarly, the package 662 according to the eighth embodiment is provided for the sensor element 602 and the circuit module 620 using the measurement values of the sensor element 602. In other words, the packages 661 and 662 are provided for the respective first and second sensors 61 and 62. Providing the packages 661 and 662 for the respective first and second sensors 61 and 62 results in (1) Higher flexibility of arranging the rotation detecting apparatus 6

(2) Avoidance of simultaneous failures of the above plural systems

That is, even if there is a failure in one of the first and second packages 661 and 662, the components of the other of the first and second packages 661 and 662 enable the rotational angle θm and the rotation number TC to be continuously calculated.

The package 661 in the two packages 661 and 662 is mounted on the first major surface 211 of the first circuit board 21; the first major surface 211 is closer to the motor unit 10. The other package 662 is mounted on the second major surface 212 of the first circuit board 21; the second major surface 212 is opposite to the motor unit 10 of the first circuit board 21. This results in the smaller mount surface, contributing to downsizing of the rotation detecting apparatus 1 in its radial direction.

The sensor elements 601 and 602 are located on the rotation center line Ac of the motor unit 10, resulting in higher detection accuracy.

The eighth embodiment achieves the same advantageous effects as those achieved by the first embodiment.

Ninth Embodiment

Figure 24:
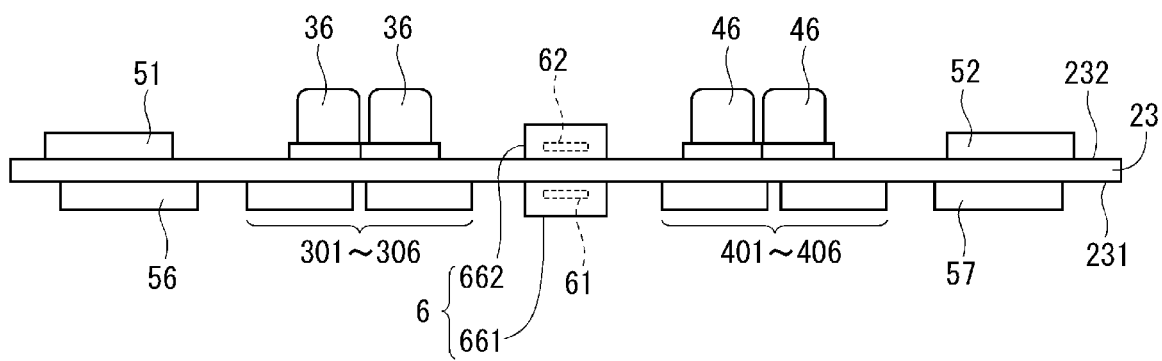
FIG. 24 is a side view of a circuit board according to the ninth embodiment of the present disclosure.

The following describes the ninth embodiment of the present disclosure with reference to FIG. 24. In FIG. 24, some components, such as spring terminals, are omitted.

In each of the embodiments, the SW elements 301 to 306 and 401 to 406, capacitors 36 and 46, and the rotation detecting apparatus 1 are for example mounted to the first circuit board 21, and the first and second microcomputers 51 and 52 and the integrated circuits 56 and 57 are for example mounted to the second circuit board 22.

In contrast, as illustrated in FIG. 24, the ninth embodiment is configured such that the SW elements 301 to 306, capacitors 36 and 46, the first and second microcomputers 51 and 52, the integrated circuits 56 and 57, and the rotation detecting apparatus 6 are mounted to a single circuit board 23. Specifically, the SW elements 301 to 306 and 401 to 406, the integrated circuits 56 and 56, and the package 661 of the rotation detecting apparatus 6 are for example mounted on the first major surface 231 of the circuit board 23. The capacitors 36 and 46, the first and second microcomputers 51 and 52, and the package 662 of the rotation detecting apparatus 6 are for example mounted on the second major surface 232, which is opposite to the motor unit 10 of the circuit board 23.

Referring to FIG. 24, the packages 661 and 662 are provided for the respective sensors 61 and 62, and mounted on the respective first and second major surfaces 231 and 232 of the circuit board 23, but the packages 661 and 662 can be mounted on one of the first and second major surfaces 231 and 232 of the circuit board 23. The first and second sensors 61 and 62 can be installed in a single package. If the first and second sensors 61 and 62 can be installed in a single package, the rotation detecting apparatus 6 is preferably mounted on the first manor surface 231 of the circuit board 23 for the sake of higher detection accuracy.

Mounting the components associated with control of the drive apparatus 8 to the single circuit board 23 results in reduction of the number of the components of the rotation detecting apparatus. As compared with the configuration in which plural circuit boards are stacked in the axial direction, the configuration of the ninth embodiment results in downsizing of the size of the rotation detecting apparatus in the axial direction.

The ninth embodiment also achieves the same advantageous effects as those achieved by the first embodiment.

Tenth Embodiment

The following describes the tenth embodiment of the present disclosure with reference to FIGS. 25 to 28.

The following mainly describes how the two sensor elements 601 and 607, which are provided for the circuit module 612 (see FIG. 16), are arranged according to the tenth embodiment. Although, in FIG. 16, the sensor elements 601 and 607 and the circuit module 612 are installed to the same chip 641, but the sensor elements 601 and 607 according to the tenth embodiment are installed respectively in separate chips. Hereinafter, the chips of the respective sensor elements 601 and 607 will be referred to simply as the sensor elements 601 and 607. Note that, in each of FIGS. 25, 26, and 28, the descriptions of the structures other than the structures of the sensor elements 601 and 607 are omitted.

As described above, each of the sensor elements 601 and 607 is a magnetic sensor element for measuring magnetic change based on rotation of the magnet 16 (see FIG. 4), and therefore has a directivity with respect to magnetic sensitivity. For example, FIG. 25 illustrates the sensor elements 601 and 607 having an identical structure, and the sensor elements 601 and 607 have respective magnetic sensing directions illustrated by respective arrows. The magnetic sensing direction of a sensor element represents a direction determined based on the arrangement direction of Hall elements if a Hall IC is used as the sensor element, or the magnetized direction of the pin layer if a TMR sensor device is used as the sensor element.

FIG. 25A shows that the sensor elements 601 and 607 are arranged such that their magnetic sensing directions are parallel to each other. The magnetic sensing directions that are parallel to each other will be described as the magnetic sensing directions are matched with each other. If the sensor elements 601 and 607 are arranged such that their magnetic sensing directions are matched with each other, the measurement values Ap of the sensor element 601 are identical to the measurement values Aq of the sensor element 607 (see FIG. 25B). Note that each measurement value Ap can be obtained by transforming a corresponding value of each of a sine signal and a cosine signal output from the sensor element 601 into an angle based on a predetermined transformation function, such as the arctangent function. Similarly, each measurement value Aq can be obtained by transforming a corresponding value of each of a sine signal and a cosine signal output from the sensor element 607 into an angle based on the predetermined transformation function, such as the arctangent function.

Similarly, if the sensor elements 601 and 607 are arranged such that their magnetic sensing directions are matched with each other, values of a digital equivalent Dp of the measurement values Ap of the sensor element 601 are identical to values of a digital equivalent Dq of the measurement values Aq of the sensor element 607. For example, if each of the digital equivalent Dp and the digital equivalent Dq can be represented as a value of 14 bits, a value of the digital equivalent Dp and a value of the digital equivalent Dq when the mechanical angle of the motor unit 10 is 0 degrees are each expressed as (00000000000000). The number of bits can be suitably set.

If there is a zero-freeze failure so that each of the digital equivalent Dp and the digital equivalent Dq freezes at (00000000000000), it is difficult to determine whether the motor unit 10 is stopped at the mechanical angle of 0 degrees or there is a zero-freeze failure of each of the digital equivalent Dp and the digital equivalent Dq. Note that the tenth embodiment describes an example where there is a zero-freeze failure of each of the digital equivalent Dp and the digital equivalent Dq, but the tenth embodiment can be applied to another example where there is a failure of each of the digital equivalent Dp and the digital equivalent Dq freezing at another value.

From this viewpoint, the tenth embodiment is configured such that the position of the sensor element 601 and the position of the sensor element 607 in the rotational direction are shifted from each other to thereby shift the phase of change of the measurement values Ap and the phase of change of the measurement values Aq from each other. Shifting one of the position of the sensor element 601 and the position of the sensor element 607 from the other thereof in the rotational direction enables the magnetic sensing direction of the sensor element 601 to shift from the magnetic sensing direction of the sensor element 607 along the rotational direction of the motor unit 10.

The feature that the two sensor elements 601 and 607 are arranged such that their magnetic sensing directions shift from each other shows that the two sensor elements 601 and 607 are arranged while an angle formed between their magnetic sensing directions is set to be unequal to 0 degrees. The term "shift quantity between the sensor elements" represents an angular shift between the magnetic sensing directions of the sensor elements.

FIG. 26A illustrates that the sensor elements 601 and 607 are arranged such that their positions shift by 180 degrees from each other in the rotational direction, resulting in the magnetic sensing directions of the respective sensor elements 601 and 607 deviating by 180 degrees from each other.

Arranging the sensor elements 601 and 607 such that their magnetic sensing directions shift by 180 degrees from each other enables the phase of change of the measurement values Ap and the phase of change of the measurement values Aq to shift by 180 degrees from each other. This results in, when the mechanical angle of the motor unit 10 is 0 degrees, the value of the digital equivalent Dp being expressed as (00000000000000) and the value of the digital equivalent Dq being expressed as (10000000000000), which are different from each other.

In contrast, if there is a zero-freeze failure of each of the digital equivalent Dp and the digital equivalent Dq, each of the digital equivalent Dp and the digital equivalent Dq freezes at (00000000000000).

That is, arranging the sensor elements 601 and 607 such that their magnetic sensing directions shift from each other enables a value of the digital equivalent Dp and a value of the digital equivalent Dq to be different from each other in normal state. For this reason, the first microcomputer 51 is capable of determining that there is a freeze failure upon determining that a value of the digital equivalent Dp is identical to a value of the digital equivalent Dq.

Shifting the magnetic sensing directions of the respective sensor elements 601 and 607 from each other by at least an angle d corresponding to a resolution based on the number of bits of each of the digital equivalents Dp and Dq enables a value of the digital equivalent Dp to be different from a value of the digital equivalent Dq in normal state, making it possible to determine whether there is a freeze failure.

Figure 27:
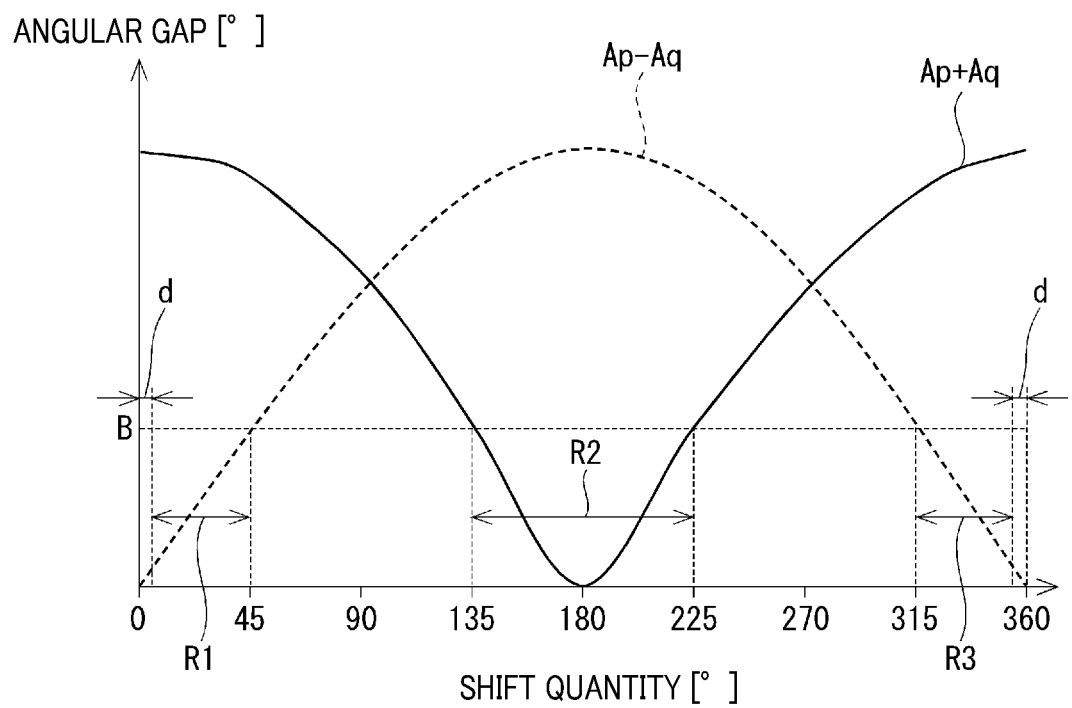
FIG. 27 is a graph illustrating a relationship between shift quantities between the sensor elements and measurement errors according to the tenth embodiment of the present disclosure.

The following describes an angular deviation between the measurement values Ap of the sensor element 601 and the measurement values Aq of the sensor element 607 with reference to FIG. 27. In FIG. 27, the angular deviation based on the sum of each measurement value Ap and the corresponding measurement value Aq is illustrated by a solid curve, and the subtraction angular deviation based on the subtraction of each measurement value Aq from the corresponding measurement value Ap is illustrated by a dashed curve.

For example, if the shift quantity between the magnetic sensing directions of the respective sensor elements 601 and 607 is set to 180 degrees, the sum of each measurement value Ap and the corresponding measurement value Aq results in the angular gap being cancelled. If the shift quantity between the magnetic sensing directions of the respective sensor elements 601 and 607 is set to 0 degrees, the subtraction of each measurement value Aq from the corresponding measurement value Ap results in the angular gap being cancelled.

The shift quantity range, which enables the angular gap to be equal to or less than a reference value B based on the sum or subtraction of the measurement values is defined from 315°, which is equal to −45° to 45° inclusive, and from 135° to 225°. Note that the negative sign "-" represents a shift quantity in the direction opposite to the rotational direction of the motor unit 10.

Note that, as described above, if the shift quantity between the magnetic sensing directions is set to 0° corresponding to 360°, each value of the digital equivalent Dp and the corresponding value of the digital equivalent Dq are identical to one another, resulting in difficulty in determination of whether there is a freeze-failure. For this reason, the range of (0±d) degrees is eliminated from the shift quantity range; this elimination enables each value of the digital equivalent Dp to shift from the corresponding value of the digital equivalent Dq by at least one bit.

It is therefore preferable that the sensor elements 601 and 607 are arranged such that the shift quantity between the magnetic sensing directions of the respective sensor elements 601 and 607 is located within any one of (1) A range R1 from (0+d°) to 45° inclusive
(2) A range R2 from 135° to 225° inclusive
(3) A range R3 from 315° to (360−d°) inclusive Reference character (A) in FIG. 28 illustrates that the shift quantity between the magnetic sensing directions of the respective sensor elements 601 and 607 is set to 45°, and reference character (B) in FIG. 28 illustrates that the shift quantity between the magnetic sensing directions of the respective sensor elements 601 and 607 is set to 135°. Similarly, reference character (C) in FIG. 28 illustrates that the shift quantity between the magnetic sensing directions of the respective sensor elements 601 and 607 is set to 225°, and reference character (D) in FIG. 28 illustrates that the shift quantity between the magnetic sensing directions of the respective sensor elements 601 and 607 is set to 315°.

Setting the shift quantity between the magnetic sensing directions of the respective sensor elements 601 and 607 to any one of 45°, 135°, 225°, and 315° enables the angle formed between the sensor elements 601 and 607 to become 45. The arrangement of the sensor elements 601 and 607 whose magnetic sensing directions are shifted from each other is therefore easily visibly recognizable in an assemble procedure.

If the first and second sensors 461 and 462 are provided as illustrated in FIG. 16, the sensor elements 601 and 607 provided for the common circuit module 612 can be arranged such that their magnetic sensing directions are shifted from each other. The magnetic sensing direction of each of the sensor elements 601 and 607 of the first sensor 461 can be identical to or different form the magnetic sensing direction of each of the sensor elements of the second sensor 467. This can be applied to a case where the respective first and second sensors 461 and 462 are encapsulated respectively in separate packages.

The two sensor elements 601 and 607 according to the tenth embodiment are arranged such that their magnetic sensing directions are shifted from each other in the rotational direction. Causing change of the measurement values Ap of the first sensor 601 and change of the measurement values Aq of the second sensor 607 to have a phase shift therebetween results in each value of the digital equivalent Dp being different from a corresponding value of the digital equivalent Dq in normal state. This makes it easier to detect a failure, such as a freeze-failure in the digital outputs.

In particular, arranging the sensor elements 601 and 607 such that their magnetic sensing directions shift by 180 degrees from each other enables the sum of each measurement value Ap and the corresponding measurement value Aq to cancel the angular gap.

If the angle corresponding to the resolution based on the number of bits of each rotational angle signal is expressed by d set forth above, the shift quantity between the magnetic sensing directions of the respective sensor elements 601 and 607 is located within any one of (1) The range R1 from (0+d°) to 45° inclusive
(2) The range R2 from 135° to 225° inclusive
(3) The range R3 from 315° to (360−d°) inclusive This maintains the angular gap to be relatively smaller.

The first microcomputer 51 is configured to determine that there is a failure upon determining that a value of the digital equivalent Dp of a measurement value Ap of the sensor element 601 is matched with a corresponding value of the digital equivalent Dq of a corresponding measurement value Aq of the sensor element 607 whose magnetic sensing directions are shifted from each other in the rotational direction. This configuration enables a failure in the digital outputs to be efficiently detected.

Modifications

The rotation detecting apparatus according to each of the above embodiments includes the first sensor and the second sensor, but can include three or more sensors.

The rotation information calculator according to some of the embodiments includes one or two rotation information calculators provided for each of the sensors, but can include three or more rotation information calculators provided for each of the sensors.

Each the above embodiments uses Hall devices as the respective sensor elements. Other sensor elements, which are capable of measuring rotation of the detection target, such as MR sensor devices, can be used as the respective sensor elements.

Each of the above embodiments includes one or more sensor elements provided for each of the circuit modules, but three or more sensor elements can be provided for each of the circuit modules.

In the above embodiments, the first and second sensor elements and the first and second circuit modules are not limited to only two sensor elements and only two circuit modules. That is, the expression "first and second sensor elements" means "at least first and second sensor elements", and the expression "first and second circuit modules" means "at least first and second circuit modules".

For shifting the magnetic sensing directions of respective plural sensor elements provided for a common circuit module from each other in the rotational direction, the positions of the chips incorporating therein the respective sensor elements in the rotational direction are shifted from each other. Using first and second sensor elements whose internal structures are different from each other to thereby shift a measurement-value change of the first sensor element is shifted in phase from a measurement-value change of the second sensor element can shift the magnetic sensing direction of the first sensor element from the magnetic sensing direction of the second sensor element.

Each of the above embodiments is configured such that the command signals sent from each microcomputer and the output signals sent from the corresponding sensor are communicated therebetween via the respective different communication lines, but can be communicated therebetween via a single communication line.

Each of the above embodiments is configured such that each sensor and the corresponding microcomputer communicate with each other in accordance with the SPI, but can communicate with each other in accordance with predetermined types of communication interfaces, such as a single edge nibble transmission (SENT) interface as long as each type of the communication interfaces can include a series of, i.e. a set of, the rotational angle signal and the rotation number signal as the output signal. A modification of each of the above embodiments can be configured to output the rotational angle signal and the rotation number signal separately to each microcomputer.

Each of the above embodiments is configured to detect rotation of the motor unit as its detection target, but can be configured to detect rotation of another detection target.

Each of the above embodiments uses a three-phase brushless motor as the motor unit, but can use another type of motors, a power generator, or a motor-generator serves as both a motor and a power generator.

At least the first embodiment is configured such that the rotation detecting apparatus and the components for driving the motor unit 10 are mounted to the first circuit board, and the components for controlling how the motor unit is driven are mounted to the second circuit board. A modification of each of the above embodiments can be configured such that at least part of the components, which will be referred to as control components, for controlling how the motor unit is driven can be mounted to the first substrate, and at least part of the components, which will be referred to as drive components, for driving the motor unit can be mounted to the second circuit board.

For example, the driving components and the control components, which are included in the first motor drive system, can be mounted to the first circuit board, and the driving components and the control components, which are included in the second motor drive system, can be mounted to the second circuit board. This enables, even if one of the first and second circuit boards has malfunctioned, the drive components and the control components, which are mounted to the other of the first and second circuit boards, to continuously controllably drive the power steering apparatus.

If each of the above embodiments uses a plurality of circuit boards, heatsinks can be each disposed between a corresponding at least one adjacent pair of the circuit boards.

That is, each heatsink enables one or more of the components, from which head needs to be dissipated, mounted to the corresponding one adjacent pair of the circuit boards to dissipate heat from the one or more components.

The drive apparatus of each of the above embodiments is applied to the electronic power steering apparatus, but can be applied to another apparatus.

The present disclosure is not limited to the embodiments described herein, but can be implemented as various modifications within the scope of the present disclosure.

REFERENCE SIGN LIST 1 to 6 Rotation detecting apparatus
10 Motor unit (detection target)
51, 52 Microcomputer (Controller)
601 to 607 Sensor element
610 to 612, 620 to 622 Circuit module
615, 625, 635 Rotational angle calculator
616, 626, 636 Rotation number calculator
617, 627 Communicator
65, 661, 662 Package

The invention claimed is:

1. A rotation detecting apparatus comprising:
at least first and second sensor elements each configured to measure rotation of a detection target;
a circuit module comprising:
first and second rotational angle calculators each configured to calculate, based on a corresponding one of a first measurement value of the first sensor element and a second measurement value of the second sensor element, a rotational angle of the detection target;
first and second rotation number calculators each configured to calculate, based on the corresponding one of the first measurement value of the first sensor element and the second measurement value of the second sensor element, a rotation number of the detection target; and
first and second communicators each configured to output, to a controller, a rotational angle signal based on the rotational angle and a rotation number signal based on the rotation number; and
a package configured to package the first and second sensor elements and the circuit module, the package being mounted to a circuit board separately from the controller, wherein:
the circuit module comprises a first circuit module and a second circuit module;
the first circuit module includes the first rotational angle calculator, the first rotation number calculator, and the first communicator; and
the second circuit module includes the second rotational angle calculator, the second rotation number calculator, and the second communicator,
the rotation detecting apparatus further comprising:
at least first to fourth chips,
wherein the first sensor element and the first circuit module are installed in the respective first and second chips, and the second sensor element and the second circuit module are installed in the respective third and fourth chips.

2. The rotation detecting apparatus according to claim 1, wherein:
the package comprises a single package; and
all the first sensor element, the second sensor element, and the circuit module are installed in the single package.

3. The rotation detecting apparatus according to claim 1, wherein:
the circuit module comprises a first circuit module and a second circuit module;
the first circuit module includes the first rotational angle calculator, the first rotation number calculator, and the first communicator;
the second circuit module includes the second rotational angle calculator, the second rotation number calculator, and the second communicator; and
the package comprises at least first and second packages, the first sensor element and the first circuit module being installed in the first package, the second sensor element and the second circuit module being installed in the second package.

4. The rotation detecting apparatus according to claim 3, wherein:
the circuit board has a first surface and a second surface opposite to the first surface, and is arranged such that the first surface faces the detection target;
the first package is mounted on the first surface of the circuit board; and
the second package is mounted on the second surface of the circuit board.

5. The rotation detecting apparatus according to claim 1, wherein:
the first and second sensor elements are disposed on a rotation center line of the detection target.

6. The rotation detecting apparatus according to claim 1, wherein:
the first and second sensor elements are arranged to be symmetric with respect to a rotation center line of the detection target.

7. The rotation detecting apparatus according to claim 1, wherein:
the first circuit module is mounted on an upper surface of the second chip;
the first chip, to which the first sensor element is installed, is arranged on the upper surface of the second chip;
the second circuit module is mounted on an upper surface of the fourth chip; and
the third chip, to which the second sensor element is installed, is arranged on the upper surface of the fourth chip.

8. The rotation detecting apparatus according to claim 1, wherein:
the first chip, to which the first sensor element is installed, is arranged to be closer to a rotation center line of the detection target than the second chip, to which the first circuit module is installed, to the rotation center line; and
the third chip, to which the second sensor element is installed, is arranged to be closer to the rotation center line of the detection target than the fourth chip, to which the second circuit module is installed, to the rotation center line.

9. The rotation detecting apparatus according to claim 1, wherein:
each of the first and second communicators is configured to transmit, to the controller, an output signal via a corresponding single communication line, the output signal comprising a series of the corresponding rotational angle signal and the corresponding rotation number signal.

10. A rotation detecting apparatus comprising:
at least first and second sensor elements each configured to measure rotation of a detection target;

a circuit module comprising:
first and second rotational angle calculators each configured to calculate, based on a corresponding one of a first measurement value of the first sensor element and a second measurement value of the second sensor element, a rotational angle of the detection target;
first and second rotation number calculators each configured to calculate, based on the corresponding one of the first measurement value of the first sensor element and the second measurement value of the second sensor element, a rotation number of the detection target; and
first and second communicators each configured to output, to a controller, a rotational angle signal based on the rotational angle and a rotation number signal based on the rotation number; and
a package configured to package the first and second sensor elements and the circuit module, the package being mounted to a circuit board separately from the controller, wherein:
the first and second sensor elements have respective first and second magnetic sensing directions; and
the first and second sensor elements are arranged such that an angle formed between the first and second magnetic sensing directions has a predetermined angle.

11. The rotation detecting apparatus according to claim 10, wherein:
the first and second sensor elements are arranged such that the angle formed between the first and second magnetic sensing directions has 180 degrees.

12. The rotation detecting apparatus according to claim 10, wherein:
the rotational angle signal based on the rotational angle is comprised of a digital signal having a predetermined number of bits; and
the angle formed between the first and second magnetic sensing directions is set to be within at least one of:
a first range from (0+d) degrees to 45 degrees inclusive;
a second range from 135 degrees to 225 degrees inclusive; and
a third range from 315 degrees to (360−d) degrees,
d representing an angle corresponding to a resolution based on the number of bits of the digital signal.

13. The rotation detecting apparatus according to claim 10, wherein:
each of the first and second sensor elements is configured to measure rotation of the detection target to thereby output the corresponding one of the first and second sensor measurement values; and
the controller is configured to determine that there is a failure in the rotation detecting apparatus upon determining that a first digital value and a second digital value are identical to each other,
the first digital value being a digital equivalent of the first measurement value of the first sensor element,
the second digital value being a digital equivalent of the second measurement value of the second sensor element.

14. The rotation detecting apparatus according to claim 10, wherein:
the package comprises a single package; and
all the first sensor element, the second sensor element, and the circuit module are installed in the single package.

15. The rotation detecting apparatus according to claim 10, wherein:

the circuit module comprises a first circuit module and a second circuit module;
the first circuit module includes the first rotational angle calculator, the first rotation number calculator, and the first communicator;
the second circuit module includes the second rotational angle calculator, the second rotation number calculator, and the second communicator; and
the package comprises at least first and second packages, the first sensor element and the first circuit module being installed in the first package, the second sensor element and the second circuit module being installed in the second package.

16. The rotation detecting apparatus according to claim 15, wherein:
the circuit board has a first surface and a second surface opposite to the first surface, and is arranged such that the first surface faces the detection target;
the first package is mounted on the first surface of the circuit board; and
the second package is mounted on the second surface of the circuit board.

17. The rotation detecting apparatus according to claim 10, wherein:
the first and second sensor elements are disposed on a rotation center line of the detection target.

18. The rotation detecting apparatus according to claim 10, wherein:
the first and second sensor elements are arranged to be symmetric with respect to a rotation center line of the detection target.

19. The rotation detecting apparatus according to claim 10, wherein:
the circuit module comprises a first circuit module and a second circuit module;
the first circuit module includes the first rotational angle calculator, the first rotation number calculator, and the first communicator; and
the second circuit module includes the second rotational angle calculator, the second rotation number calculator, and the second communicator,
the rotation detecting apparatus further comprising:
at least first and second chips,
wherein the first sensor element and the first circuit module are installed in the first chip, and the second sensor element and the second circuit module are installed in the second chip.

20. The rotation detecting apparatus according to claim 10, wherein:
each of the first and second communicators is configured to transmit, to the controller, an output signal via a corresponding single communication line, the output signal comprising a series of the corresponding rotational angle signal and the corresponding rotation number signal.

21. A rotation detecting apparatus comprising:
at least first and second sensor elements each configured to measure rotation of a detection target;
a circuit module comprising:
first and second rotational angle calculators each configured to calculate, based on a corresponding one of a first measurement value of the first sensor element and a second measurement value of the second sensor element, a rotational angle of the detection target;
first and second rotation number calculators each configured to calculate, based on the corresponding one of the first measurement value of the first sensor element and the second measurement value of the second sensor element, a rotation number of the detection target; and first and second communicators each configured to output, to a controller, a rotational angle signal based on the rotational angle and a rotation number signal based on the rotation number; and a package configured to package the first and second sensor elements and the circuit module, the package being mounted to a circuit board separately from the controller, the circuit board to which the package is mounted, the circuit board being a first circuit board; and a second circuit board to which the controller is mounted, wherein:

the second circuit board is located across the first circuit board from the detection target;

the first circuit board and the second circuit board are communicably connected to each other via internal connection terminals; and the rotational signal and the rotation number signal output from each of the first and second communicators are transmitted to the controller via the internal connection terminals.

22. An electric power steering apparatus comprising:
a motor unit configured to provide assist torque for assisting a driver's operation of a steering shaft; and
a rotation detecting apparatus comprising:
at least first and second sensor elements each configured to measure rotation of a detection target;
a circuit module comprising:
first and second rotational angle calculators each configured to calculate, based on a corresponding one of a first measurement value of the first sensor element and a second measurement value of the second sensor element, a rotational angle of the detection target;
first and second rotation number calculators each configured to calculate, based on the corresponding one of the first measurement value of the first sensor element and the second measurement value of the second sensor element, a rotation number of the detection target; and
first and second communicators each configured to output, to a controller, a rotational angle signal based on the rotational angle and a rotation number signal based on the rotation number; and
a package configured to package the first and second sensor elements and the circuit module, the package being mounted to a circuit board separately from the controller,
wherein the controller configured to control the motor unit based on the rotational angle signal and the rotation number signal,
wherein each of the first and second sensor elements is configured to measure rotation of the motor unit as the detection target,
wherein:
the controller comprises at least first and second controllers; and
the circuit module comprises at least first and second circuit modules provided for the respective first and second controllers, and
wherein
each of the first and second circuit modules is configured to output the rotational angle signal and the rotation number signal to the corresponding one of the first and second controllers.

23. The electric power steering apparatus according to claim 22, wherein:
the controller is configured to calculate, based on the rotational angle and the rotation number, a steering angle of the steering shaft.

24. An electric power steering apparatus comprising:
a motor unit configured to provide assist torque for assisting a driver's operation of a steering shaft; and
a rotation detecting apparatus comprising:
at least first and second sensor elements each configured to measure rotation of a detection target;
a circuit module comprising:
first and second rotational angle calculators each configured to calculate, based on a corresponding one of a first measurement value of the first sensor element and a second measurement value of the second sensor element, a rotational angle of the detection target;
first and second rotation number calculators each configured to calculate, based on the corresponding one of the first measurement value of the first sensor element and the second measurement value of the second sensor element, a rotation number of the detection target; and
first and second communicators each configured to output, to a controller, a rotational angle signal based on the rotational angle and a rotation number signal based on the rotation number; and
a package configured to package the first and second sensor elements and the circuit module, the package being mounted to a circuit board separately from the controller,
wherein the controller configured to control the motor unit based on the rotational angle signal and the rotation number signal,
wherein each of the first and second sensor elements is configured to measure rotation of the motor unit as the detection target,
wherein:
the circuit module comprises a first circuit module and a second circuit module;
the first circuit module includes the first rotational angle calculator, the first rotation number calculator, and the first communicator; and
the second circuit module includes the second rotational angle calculator, the second rotation number calculator, and the second communicator,
the rotation detecting apparatus further comprising:
at least first to fourth chips,
wherein the first sensor element and the first circuit module are installed in the respective first and second chips, and the second sensor element and the second circuit module are installed in the respective third and fourth chips.

25. An electric power steering apparatus comprising:
a motor unit configured to provide assist torque for assisting a driver's operation of a steering shaft; and
a rotation detecting apparatus comprising:
at least first and second sensor elements each configured to measure rotation of a detection target;
a circuit module comprising:
first and second rotational angle calculators each configured to calculate, based on a corresponding one of a first measurement value of the first sensor element and a second measurement value of the second sensor element, a rotational angle of the detection target;

first and second rotation number calculators each configured to calculate, based on the corresponding one of the first measurement value of the first sensor element and the second measurement value of the second sensor element, a rotation number of the detection target; and first and second communicators each configured to output, to a controller, a rotational angle signal based on the rotational angle and a rotation number signal based on the rotation number; and a package configured to package the first and second sensor elements and the circuit module, the package being mounted to a circuit board separately from the controller, wherein the controller configured to control the motor unit based on the rotational angle signal and the rotation number signal, wherein each of the first and second sensor elements is configured to measure rotation of the motor unit as the detection target, wherein:

the first and second sensor elements have respective first and second magnetic sensing directions; and the first and second sensor elements are arranged such that an angle formed between the first and second magnetic sensing directions has a predetermined angle.

* * * * *